(12) United States Patent
Inagaki et al.

(10) Patent No.: US 7,550,182 B2
(45) Date of Patent: *Jun. 23, 2009

(54) POLARIZING PLATE AND DISPLAY DEVICE

(75) Inventors: Shinji Inagaki, Hachioji (JP); Noriyasu Kuzuhara, Kunitachi (JP); Hiroki Umeda, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 11/453,589

(22) Filed: Jun. 15, 2006

(65) Prior Publication Data

US 2006/0292315 A1 Dec. 28, 2006

(30) Foreign Application Priority Data

Jun. 23, 2005 (JP) .............................. 2005-183082

(51) Int. Cl.
*G02F 1/1335* (2006.01)
*G02F 1/13363* (2006.01)

(52) U.S. Cl. ........................ 428/1.33; 428/1.54; 349/96; 349/118; 106/181.1

(58) Field of Classification Search ................ 428/1.33, 428/1.54; 106/181.1, 182.1, 184.3, 186.2; 264/191, 200, 207–208, 211; 349/117–118, 349/96

See application file for complete search history.

(56) References Cited

U.S. PATENT DOCUMENTS

| | | | |
|---|---|---|---|
| 2,689,799 A * | 9/1954 | Albus et al. ............. | 106/169.39 |
| 2003/0001988 A1* | 1/2003 | Maeda et al. ................. | 349/96 |
| 2003/0037703 A1* | 2/2003 | Saito ..................... | 106/169.33 |
| 2003/0156235 A1* | 8/2003 | Kuzuhara et al. ............. | 349/96 |
| 2003/0170482 A1* | 9/2003 | Murakami .................. | 428/615 |

OTHER PUBLICATIONS

JPO Website Machine English Translation of JP 2004-198904, Murakami, Jul. 15, 2004.*

* cited by examiner

*Primary Examiner*—Keith D Hendricks
*Assistant Examiner*—Sophie Hon
(74) *Attorney, Agent, or Firm*—Frishauf, Holtz, Goodman & Chick, P.C.

(57) ABSTRACT

A polarization plate comprising a polarizer and polarizing plate protective films A and B provided on both surfaces of the polarizer, wherein (i) a thickness of each of the polarizing plate protective films A and B is 30 to 60 μm; (ii) in-plate retardation value Ro of the polarizing plate protective film B is 20 to 100 nm; (iii) retardation value Rt in the thickness direction of the polarizing plate protective film B is 10 to 300 nm; (iv) a thickness of the polarizing plate is 80 to 160 μm; (v) a stiffness of the polarizing plate of the polarizing plate under a condition of 23° C. and 55% RH is 20 to 80 g.

6 Claims, 1 Drawing Sheet

POLARIZING PLATE AND DISPLAY DEVICE

This application is based on Japanese Patent Application No. 2005-183082 filed on Jun. 23, 2005, in Japanese Patent Office, the entire content of which is hereby incorporated by reference.

TECHNICAL FIELD

The present invention relates to a polarizing plate and a display device, and in more detail, to a polarizing plate which minimizes leakage of light and defects during adhesion of a polarizing plate to a display panel, and a display device using the same.

BACKGROUND

In order to decrease the weight of electronic devices and to ease an increase in weight due to enlarged liquid crystal display devices, it has been demanded to decrease the thickness of polarizing plates. However, when a liquid crystal display device is enlarged, it becomes difficult to have the polarizing plate to properly adhere onto the liquid crystal cells due to curling and deformation.

For example, in Patent Document 1, proposed is a polarizing plate employing a thin, layered polarizer, whereby a decrease in curling and deformation is described. However, since this method significantly differs from the conventional polarizing plate production process, problems of poor productivity have been exhibited. Further, when a thin, layered polarizing plate is adhered onto a liquid crystal panel, employing a polarizing plate protective film provided with a retardation film function, problems have tended to occur.

Still further, in Patent Document 2, proposed as a polarizing plate protective film, provided with a retardation film function, is an optical compensation sheet at a layer thickness of 10-70 μm. It has been recognized that light leakage is markedly minimized by decreasing the photoelastic modulus of the optical compensation sheet and distortion due to variation of ambient conditions. However, even though the described polarizing plate employs an 80 μm thick polarizing plate protective film on the surface side, the decrease in weight is still insufficient since a thinner layer is employed only on the compensation sheet side. Further, problems have occurred in which curling tends to result due to the significant difference in thickness between the front and rear layers.

In Patent Document 3, proposed is a cellulose ester film of which breakage elongation is controlled within the range of 40-100% by the addition of polyester urethane. However, when the described method is employed, it is necessary to increase the thickness to achieve the desired birefringence value, whereby it has been difficult to decrease the weight by reducing the thickness of the polarizing plate.

In these described methods, it has clearly been seen that when a thin, layered polarizing plate, the total layer of which thickness is decreased by reducing the thickness of a polarizing plate protective film and a polarizer, is adhered onto a large-sized liquid crystal panel, problems tend to occur in which air bubbles tend to be included due to curling and deformation, and positioning tends to shift during adhesion.

Namely, an object of the present invention is to overcome the above problems during adhesion of a thin-layer polarizing plate onto a liquid crystal panel.

(Patent Document 1) Japanese Patent Publication for Public Inspection (hereinafter referred to as JP-A) No. 2000-338329

(Patent Document 2) JP-A No. 2002-139621

(Patent Document 3) JP-A No. 2002-267846

SUMMARY

Accordingly, an object of the present invention is to provide a polarizing plate which minimizes problems such as leakage of light, ease of air bubble inclusion during adhesion of a polarizing plate onto a display panel, or positional shifting during adhesion, but still a display device with excellent visibility, employed the same.

One of the aspects of the present invention is a polarizing plate comprising a polarizer and polarizing plate protective films A and B provided on both surfaces of the polarizer, wherein
(i) a thickness of each of the polarizing plate protective films A and B is 30 to 60 μm;
(ii) retardation value Ro of the polarizing plate protective film B is 20 to 100 nm;
(iii) retardation value Rt of the polarizing plate protective film B is 10 to 300 nm;
(iv) a thickness of the polarizing plate is 80 to 160 μm; and
(v) a stiffness of the polarizing plate of the polarizing plate under a condition of 23° C. and 55% RH is 20 to 80 g, wherein Ro and Rt are defined by the following equations:

$$Ro = (nx-ny) \times d$$

$$Rt = ((nx+ny)/2 - nz) \times d$$

wherein nx, ny, and nz represent refractive indexes in x, y, and z directions, respectively, x, y, and z representing three principal axes of a refractive index ellipsoid; nx and ny each represent an in-plane refractive index, while nx>ny; nz represents a refractive index in a thickness direction; and d represents a thickness (in nm) of polarizing plate protective film B.

DESCRIPTION OF THE PREFERRED EMBODIMENTS

Figure 1:
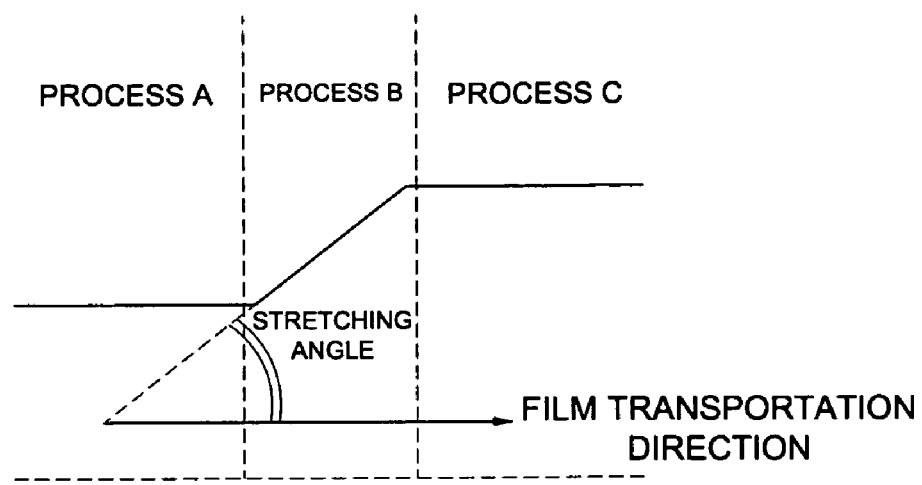
FIG. 1 illustrates the stretching angle in a stretching process.

The above object of the present invention is achieved by the following structures.

(1) A polarizing plate comprising a polarizer and polarizing plate protective films A and B provided on both surfaces of the polarizer, wherein
(i) a thickness of each of the polarizing plate protective films A and B is 30 to 60 μm;
(ii) retardation value Ro of the polarizing plate protective film B is 20 to 100 nm;
(iii) retardation value Rt of the polarizing plate protective film B is 10 to 300 nm;
(iv) a thickness of the polarizing plate is 80 to 160 μm; and
(v) a stiffness of the polarizing plate of the polarizing plate under a condition of 23° C. and 55% RH is 20 to 80 g, wherein Ro and Rt are defined by the following equations:

$$Ro = (nx-ny) \times d$$

$$Rt = ((nx+ny)/2 - nz) \times d$$

wherein nx, ny, and nz represent refractive indexes in x, y, and z directions, respectively, x, y, and z representing three principal axes of a refractive index ellipsoid; nx and ny each represent an in-plane refractive index, while nx>ny; nz represents a refractive index in a thickness direction; and d represents a thickness (in nm) of polarizing plate protective film B.

(2) The polarizing plate of Item (1), wherein polarizing plate protective films A and B each comprise a cellulose ester.

(3) The polarizing plate of Item (1) or (2), wherein polarizing plate protective film B comprises a cellulose ester having a total acyl substitution degree of 2.10 to 2.65.

(4) The polarizing plate of Item (3), wherein the cellulose ester has the total acyl substitution degree of 2.10 to 2.65 and a propionyl substitution degree of 0.7 to 1.5.

(5) The polarizing plate of any one of Items (1) to (4), wherein polarizing plate protective film A or B comprises a polyester plasticizer containing an aromatic group represented by Formula (1):

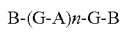  Formula (1)

wherein B represents a benzene monocarboxylic acid residue; G represents an alkylene glycol residue having 2-12 carbon atoms, an aryl glycol residue having 6-12 carbon atoms, or an oxyalkylene glycol residue having 4-12 carbon atoms; A represents an alkylene dicarboxylic acid residue having 4-12 carbon atoms or an aryldicarboxylic acid residue having 6-12 carbon atoms; and n represents an integer of 1 or more.

(6) The polarizing plate of any one of Items (1) to (5), wherein the polarizer comprises ethylene-modified polyvinyl alcohol and the layer thickness of the polarizer is 5-20 μm.

(7) A display device comprising the polarizing plate of any one of Items (1) to (6).

(8) The display device of Item (7), wherein the display device is a vertically aligned mode liquid crystal display device.

According to the present invention, it is possible to provide a polarizing plate which minimizes problems such as leakage of light, ease of air bubble inclusion during adhesion of a polarizing plate onto a display panel, or positional shifting during adhesion, and to provide a display device exhibiting excellent visibility, employing the polarizing plate.

The preferred embodiments to realize the present invention will now be detailed, however the present invention is not limited thereto.

The polarizing plate of the present invention exhibits a thickness of 80-160 μm in which a polarizer is sandwiched between Polarizing Plate Protective Film A having a thickness of 30-60 μm and Polarizing Plate Protective Film B having a thickness of 30-60 μm which also functions as a retardation plate, and is characterized in that stiffness (ST) of the aforesaid polarizing plate at 23° C. and 55% RH is in the range of 20-80 g.

Thickness of the polarizing plate, as described herein, refers to the total thickness of Polarizing Plate Protective Film A, the polarizer, and Polarizing Plate Protective Film B, but does not include an adhesion layer. When Polarizing Plate Protective Film A includes a hard coat layer, its thickness is included.

Namely, the inventors of the present invention discovered that problems such as ease of air bubble inclusion and positional shifting during adhesion of the polarizing plate onto the liquid crystal cell due to a decrease in the thickness of the polarizing plate and an increase in the size of the liquid crystal display device, were overcome by controlling the thickness and the stiffness of the polarizing plate within the specified range, whereby the present invention was realized.

The inventors also discovered that in order to control the stiffness of the polarizing plate, at 23° C. and 55% RH, to the range of 20-80 g, it was preferable that the polarizing plate protective film incorporated cellulose ester at the specified composition, as well as polyester plasticizers incorporating the aromatic compounds represented by above Formula (1).

The stiffness of the polarizing plate at 23° C. and 55% RH is determined employing the following method.

<<Determination of Stiffness>>

A polarizing plate was cut to a 35 mm wide and 105 mm long sheet. Subsequently, a loop was prepared with a 100 mm long portion of the plate by allowing both edges to adhere employing a 5 mm wide double-sided adhesive tape. The portion with both edge adhered was positioned as the bottom and fixed onto a stand. A load was then applied to the top of the loop so that the loop was pulled down vertically. When the loop was pulled down by 10 mm, the load (in g) was recorded employing a load cell, and the recorded value was designated as stiffness. During the measurements, the ambience was maintained at 23° C. and 55% RH.

Each of the components of the present invention will now be detailed.

Polarizing Plate Protective Film A at a thickness of 30-60 μm and Polarizing Plate Protective Film B at a thickness of 30-60 μm, which also functions as a retardation plate of the present invention, are preferably polymer films. Further listed as preferred factors are the ease of production, the desired adhesion to functional thin layers, and sufficient optical transparency. Transparency, as described in the present invention, refers to transmittance for visible light of at least 60%, preferably at least 80%, but most preferably at least 90%.

Films are not particularly limited as long as they exhibit the above characteristics. For example, listed may be polyester based film, polycarbonate based film, polyacrylate based film, polysulfone (including polyethersulfone) based film, polyester film such as polyethylene terephthalate or polyethylene naphthalene, polyethylene film, polypropylene film, cellophane, cellulose ester based film such as cellulose diacetate film, cellulose triacetate, cellulose acetate butyrate, or cellulose acetate propionate film, polyvinylidene chloride film, polyvinyl alcohol film, ethylene vinyl alcohol film, cyndiotactic polystyrene based film, polycarbonate film, cycloolefin polymer film (ARTON, produced by JSR Co., and ZEONEX and ZEONOA, produced by Nihon Zeon Co.), polymethylpentene film, polyether ketone film, polyether ketonimide film, polyamide film, fluorinated resinous film, nylon film, polymethyl methacrylate film, acryl film, or glass plates. Of these, preferred are cellulose ester based film, polycarbonate based film, and polysulfone (including polyethersulfone). In the present invention, in terms of production, cost, transparency, and adhesion properties, cellulose ester based film is most preferably employed. These films may be produced employing either melt extrusion casting or solution extrusion casting.

(Cellulose Ester)

It is preferable that Polarizing Plate Protective Film A and Polarizing Plate Protective Film B employed in the polarizing plate of the present invention are cellulose ester films composed of cellulose ester as a major component (hereinafter, polarizing plate protective films A and B may occasionally referred to as cellulose ester films). Cellulose esters employed in the present invention are not particularly limited, but a degree of substitution (also referred to as a substitution degree) and compositions of cellulose esters are important factors. Cellulose molecules are composed of many linkages of glucose units, each of which has three hydroxyl groups. The degree of substitution refers to the number of acyl groups introduced to these three hydroxyl groups. For example, in cellulose triacetate, all the three hydroxyl groups of the glucose unit bond to an acetyl group.

Cellulose esters employed in the present invention are carboxylic acid esters having about 2-about 22 carbon atoms, and may be esters of aromatic carboxylic acids, but most preferably lower fatty acid esters of cellulose. Lower fatty acids in the lower fatty acid esters of cellulose, as described herein, refer to fatty acids having at most 6 carbon atoms. The acyl group which bonds to the hydroxyl group may be in the form of a straight chain, or a branched chain, or may form a ring. Further, another substituent may be introduced. In the case of the same substation degree, since the increase in the number of carbon atoms results in lowering the birefringence, it is preferable to select the acyl group from those having 2-4 carbon atoms, and it is more preferable to select the acyl group from those having 2-3 carbon atoms.

For example, it is preferable to employ cellulose acetate, cellulose propionate, cellulose butyrate, as well as mixed fatty acid esters such as cellulose acetate propionate, cellulose acetate butyrate, or cellulose acetate phthalate, described, for example, in JP-A Nos. 10-45804 and 8-231761, and U.S. Pat. No. 2,319,052. Of the above, most preferably employed cellulose fatty acid esters include cellulose triacetate and cellulose acetate propionate. These cellulose esters may be employed individually or in combination.

Specifically, it is preferable that aforesaid Polarizing Plate Protective Film B is composed of cellulose acetate propionate in which the acyl substitution degree is 2.10-2.65, while the propionyl substitution degree is 0.7-1.5. It is possible to synthesize these cellulose esters employing the methods known in the art.

It is possible to determine the acy substitution degree employing the method specified in ASTM-D817-96.

Cellulose, which is a raw material of the cellulose esters of the present invention, is not specifically limited, and includes cotton linter, wood pulp (derived from conifer and broadleaf trees), and kenaf. Cellulose esters which are prepared from the above may be employed upon being blended in an optional ratio. It is possible to prepare these cellulose esters in such a manner that when acylation agents are acid anhydrides (such as acetic anhydride, propionic anhydride, or butyric anhydride), cellulose raw materials undergo reaction employing organic acids such as acetic acid, organic solvents such as methylene chloride, and protic catalysts.

When the acylation agents are acid chlorides (such as $CH_3COCl$, $C_2H_5COCl$ or $C_3H_7COCl$), the reaction is performed employing basic compounds such as amine as a catalyst. In practice, it is possible to synthesize cellulose esters with reference to the method described in JP-A No. 10-45804.

As the molecular weight of cellulose esters increases, the variation ratio of elastic modulus due to heat decreases. An excessive increase in the molecular weight results in an excessive increase in viscosity to lower productivity. The molecular weight of cellulose esters is preferably 30,000-200,000 in terms of number average molecular weight (Mn), but is more preferably 40,000-170,000.

When one g of cellulose ester is charged into 20 ml of pure water (at an electric conductivity of less than or equal to 0.1 μS/cm and a pH of 6.8), and stirred at 25° C. for one hour under an ambience of nitrogen, it is preferable that the resulting pH is 6-7 and the resulting electric conductivity is 1-100 μS/cm.

(Plasticizers)

Polarizing Plate Protective Film A or Polarizing Plate Protective Film B incorporates plasticizers. To control the stiffness to the specified range, it is particularly preferable that the above plasticizers are aromatic terminal ester based plasticizers represented by following Formula (1).

B-(G-A)$n$-G-B                    Formula (1)

wherein B represents a benzene monocarboxylic acid residue; G represents an alkylene glycol residue having 2-12 carbon atoms, an aryl glycol residue having 6-12 carbon atoms, or an oxyalkylene glycol residue having 4-12 carbon atoms; A represents an alkylene dicarboxylic acid residue having 4-12 carbon atoms or an aryldicarboxylic acid residue having 6-12 carbon atoms; and n represents an integer of at least 1.

In Formula (1), constitution is performed employing the benzene monocarboxylic acid residue represented by B, the alkylene glycol residue, the oxyalkylene glycol residue, or the aryl glycol residue represented by G, and the alkylene dicarboxylic acid residue or the aryl dicarboxylic acid reside represented by A, and preparation is performed employing the same reactions as for common polyester based plasticizers.

Examples of a benzene monocarboxylic acid component of the aromatic terminal ester plasticizer of the present invention include: benzoic acid, p-tert-butyl benzoic acid, o-toluic acid, m-toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2-12 carbon atoms of the aromatic terminal ester plasticizer of the present invention include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (also known as neopentylglycol), 2,2-diethyl-1,3-propanediol (also known as 3,3-dimethylol pentane), 2-n-butyl-2-ethyl-1,3-propanediol (also known as 3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Examples of an oxyalkylene glycol component having 4-12 carbon atoms of the aromatic terminal ester of the present invention include: diethylene glycol, triethylene glycol, tetraethylene glycol, dipropylene glycol and triropylene glycol, which may be used alone or in combination of two or more glycols.

Examples of an aryl glycol component having 6-12 carbon atoms of the aromatic terminal ester of the present invention include: hydroquinone, resorcin, bisphenol A, bisphenol F and bisphenol, which may be used alone or in combination of two or more glycols.

Examples of an alkylene dicarboxylic acid component having 4-12 carbon atoms of the aromatic terminal ester of the present invention include: succinic acid, maleic acid, the fumaric acid, glutaric acid, adipic acid, azelaic acid, sebacic acid and dodecane dicarboxylic acid, which may be used alone or in combination of two or more acids.

The number average molecular weight of the aromatic terminal ester plasticizer used in the present invention is preferably 300-2000, and more preferably 500-1500. The acid value of the aromatic terminal ester plasticizer used in the present invention is preferably not more than 0.5 mgKOH/g and more preferably not more than 0.3 mgKOH/g. The hydroxyl value of the aromatic terminal ester plasticizer used in the present invention is preferably not more than 25 mgKOH/g and more preferably not more than 15 mgKOH/g.

(Acid Value and Hydroxyl Value of Aromatic Terminal Ester)

"Acid value" means the milligrams of potassium hydroxide required to neutralize the acid (carboxyl group existing in a specimen) included in 1 g of sample. Alternatively, "hydroxyl value" means the milligrams of potassium hydroxide required to neutralize the acetic acid bonded to the hydroxyl groups after acetylation of 1 g of sample. The acid value and the hydroxyl value are measured based on JIS K0070.

Examples of a synthetic method of an aromatic terminal ester plasticizer are shown below:

<Sample No.1 (Aromatic Terminal Ester Sample)>

In a container, 820 weight parts (5 moles) of phthalic acid, 608 weight parts (8 moles) of 1,2-propylene glycol, 610 weight parts (5 moles) of benzoic acid and 0.30 weight part of tetra-isopropyl titanate (as a catalyst) were loaded at a time, and, while stirring under a nitrogen atmosphere, the mixture was heated at 130-250° C. until the acid value decreased to 2 or less. The excess monovalent alcohol was refluxed using a reflux condenser and produced water was continuously removed. Then, the container was evacuated to $6.65 \times 10^3$ Pa and, finally, to $4 \times 10^2$ Pa at 200-230° C., while the distillate was removed. The product was filtered to obtain an aromatic terminal ester having the following features:

| Viscosity (25° C.): | 19815 mPa·s |
|---|---|
| Acid value: | 0.4 |

<Sample No.2 (Aromatic Terminal Ester Sample)>

An aromatic terminal ester having the following features was prepared in the same manner as Sample No. 1 except that 500 weight parts (3.5 moles) of adipic acid, 305 weight parts (2.5 moles) of benzoic acid, 583 weight parts (5.5 moles) of diethylene glycol and 0.45 weight part of tetra-isopropyl titanate (as a catalyst) were used.

| Viscosity (25° C.): | 90 mPa·s |
|---|---|
| Acid value: | 0.05 |

<Sample No.3 (Aromatic Terminal Ester Sample)>

An aromatic terminal ester having the following features was prepared in the same manner as Sample No. 1 except that 410 weight parts (2.5 moles) of phthalic acid, 610 weight parts (5 moles) of benzoic acid, 737 weight parts (5.5 moles) of dipropylene glycol and 0.40 weight part of tetra-isopropyl titanate (as a catalyst) were used.

| Viscosity (25° C.): | 43400 mPa·s |
|---|---|
| Acid value: | 0.2 |

Specific examples of an aromatic terminal ester plasticizer of the present invention will be shown below, however, the present invention is not limited thereto.

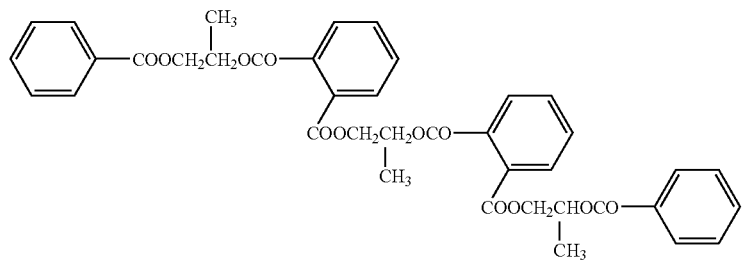

(1)

Mw: 696

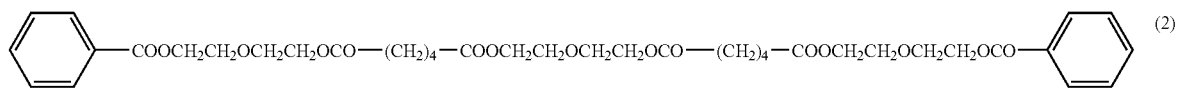

(2)

Mw: 746

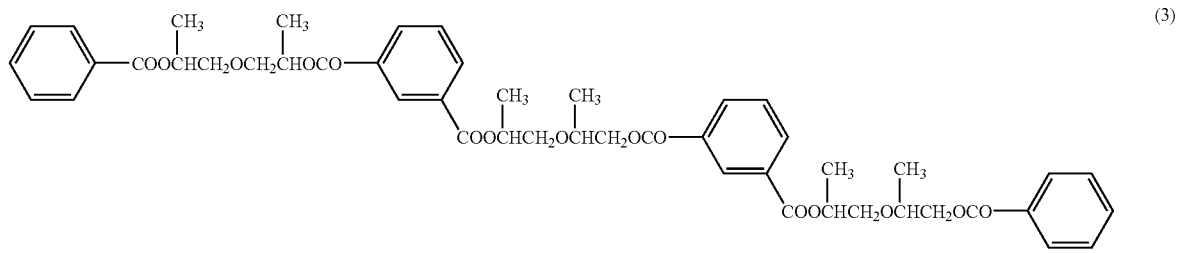

(3)

Mw: 830

-continued
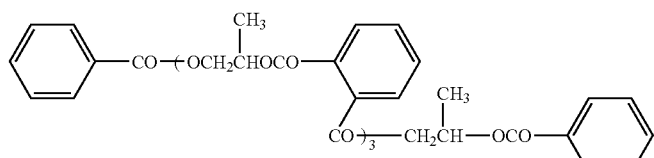
Mw: 886
(4)
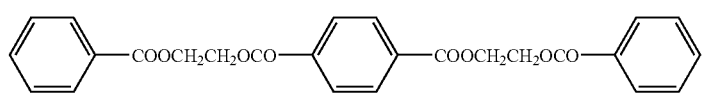
Mw: 462
(5)
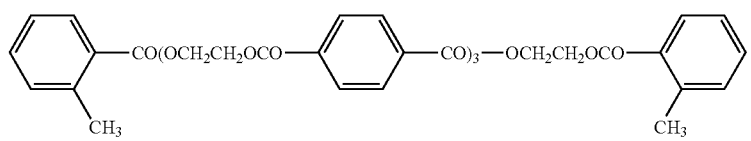
Mw: 874
(6)
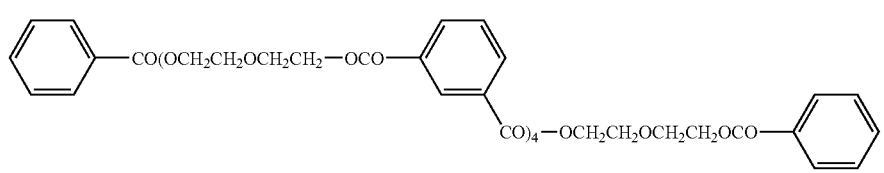
Mw: 1258
(7)
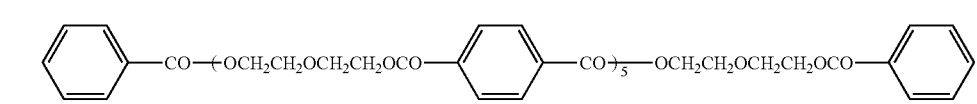
Mw: 1494
(8)
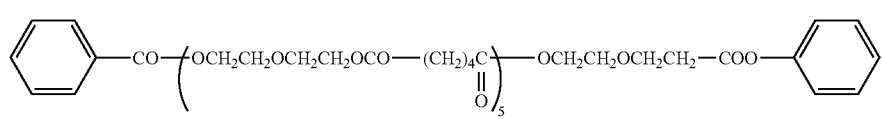
Mw: 1394
(9)
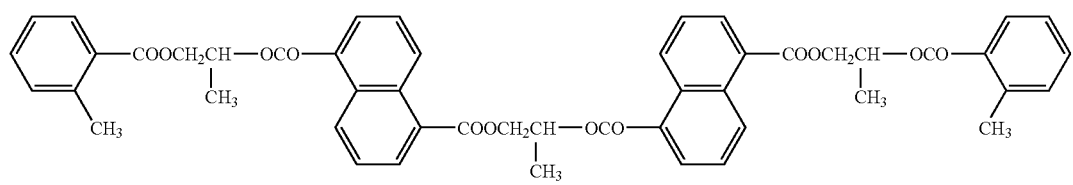
Mw: 852
(10)
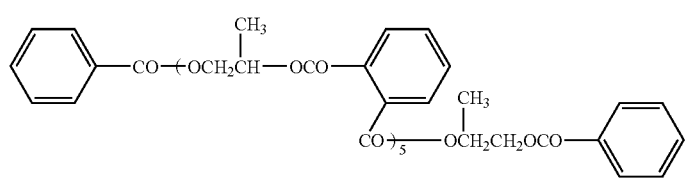
Mw: 1314
(11)

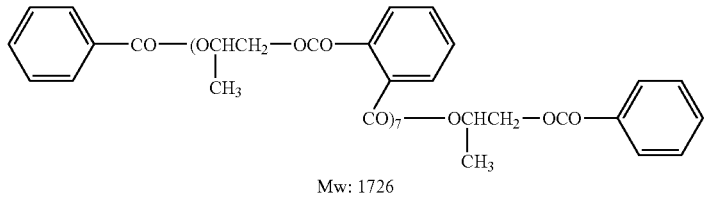

(12)

Mw: 1726

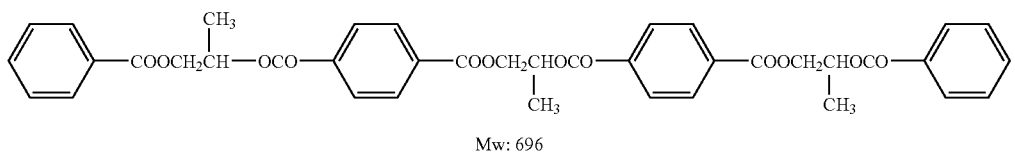

(13)

Mw: 696

The content of the aromatic terminal ester plasticizer of the present invention is preferably 1-20% by weight and more preferably 3-11% by weight based on the weight of the cellulose ester film.

Further, the following plasticizers may also be usable in the polarizing plate protective film of the present invention.

Specific examples of the phosphoric acid ester based plasticizer include phosphoric acid alkyl esters such as triacetyl phosphate and tributyl phosphate; phosphoric acid cycloalkyl esters such as tricyclopentyl phosphate and cyclohexyl phosphate; and phosphoric acid aryl esters such as triphenyl phosphate, tricresyl phosphate, cresylphenyl phosphate, octyldiphenyl phosphate, diphenylbiphenyl phosphate, trioctyl phosphate, tributyl phosphate, trinaphtyl phosphate, trixylyl phosphate, trisortho-biphenyl phosphate. The substituent groups for these may be the same or different, and may be further substituted. The substituent groups may be a mix of an alkyl group, a cycloalkyl group and an aryl group, and the substituent groups may be bonded to each other via covalent bond.

Examples of the phosphoric acid ester also include phosphate esters, for example: alkylenebis(dialkylphosphate) such as ethylenebis(dimethylphosphate) or butylenebis(diethylphosphate); alkylenebis(diarylphosphate) such as ethylenebis(diphenylphosphate) or propylenebis(dinaphtylphosphate); arylenebis(dialkylphosphate) such as phenylenebis(dibutylphosphate) or biphenylenebis(dioctylphosphate); and arylenebis(diarylphosphates) such as phenylenebis(diphenylphosphate) or naphtylenebis(ditriylphosphate). These substituent groups may be the same or different, and may be further substituted. The substituent groups may be a mixture of an alkyl group, cycloalkyl groups and aryl groups, and the substituent groups may be bonded to each other via covalent bond.

Furthermore, a part of the structure of the phosphate ester may be a part of the polymer or may be systematically included as a pendant. It may also be introduced into a part of the molecular structure of the additive such as the antioxidant, the acid scavenger, the ultraviolet light absorber. Of the compounds listed above, aryl phosphate ester and arylenebis(diarylphosphate) are preferable, and more specifically, triphenyl phosphate and phenylenebis(diphenylphosphate) are preferable.

Ethylene glycol ester based plasticizer: Specific examples of an ethylene glycol ester based plasticizer include: ethylene glycol alkyl ester based plasticizers such as ethylene glycol diacetate and ethylene glycol dibutyrate; ethylene glycol cycloalkyl ester based plasticizers such as ethylene glycol dicyclopropyl carboxylate and ethylene glycol dicyclohexyl carboxylate; and ethylene glycol aryl ester based plasticizers such as ethylene glycol dibenzoate and ethylene glycol di-4-methyl benzoate. These alkylate groups, cycloalkylate groups and arylate groups may be the same or different and may further be substituted. The substituent groups may be a mixture of alkylate groups, cycloalkylate groups and arylate groups, and the substituent groups may be bonded to each other by covalent linkage. Further, the ethylene glycol portions may be substituted and the ethylene glycol ester part of the structure may be part of the polymer or may be systematically included as a pendant. It may also be introduced into a part of the molecular structure of the additives such as an antioxidant, an acid scavenger, and an ultraviolet light absorber.

Glycerin ester based plasticizers: Examples of a glycerin ester based plasticizer include: glycerin alky esters such as triacetin, tributylin, glycerin diacetate caprylate and glycerin oleate propionate; glycerin cycloalkyl esters such as glycerin tricyclopropyl carboxylate, and glycerin tricyclohexyl carboxylate; glycerin aryl esters such as glycerin tribenzoate and glycerin 4-methylbenzoate; diglycerin alkyl esters such as diglycerin tetraacetylate, diglycerin tetrapropionate, digylcerin acetate tri caprylate and diglycerin tetralaurate; diglycerin cycloalkyl esters such as diglycerin tetracylobutyl carboxylate and diglycerin tetracylopentyl carboxylate; and diglycerin aryl esters such as diglycerin tetrabenzoate and diglycerin 3-methyl benzoate. These alkylate groups, cycloalkyl carboxylate groups and arylate groups may be same or different and may further be substituted. The substituent groups may be a mixture of an alkylate group, a cycloalky carboxylate group and an arylate groups, and the substituent groups may be bonded to each other via covalent bond. Further, the glycerin and diglycerin portions may be substituted and a partial structure of the glycerin ester or diglycerin ester may be a part of the polymer or may be systematically included as a pendant. It may also be introduced into a part of the molecular structure of the additive such as an antioxidant, an acid scavenger, and an ultraviolet light absorber.

Polyhdric alcohol ester based plasticizers: Specific examples of polyhdric alcohol ester based plasticizers include the polyhdric alcohol ester based plasticizers disclosed in JP-A 2003-12823, paragraphs 30-33.

These alkylate groups, cycloalkyl carboxylate groups and arylate groups may be the same or different and may be further be substituted. The alkylate groups, cycloalky carboxylate groups and arylate groups may be mixed, and the substituent groups may be bonded to each other via covalent bond. Furthermore, the polyhydric alcohol portion may be substituted and a partial structure of the polyhydric alcohol may be a part of the polymer or may be systematically included as a pendant. It may also be introduced into a part of the molecular structure of the additives such as an antioxidant, an acid scavenger or an ultraviolet light absorber.

Dicarboxylic acid ester based plasticizer: Specific examples of a dicarboxylic acid ester based plasticizer include: alkyl dicarboxylic acid cycloalkyl ester based plasticizers such as didodecyl malonate (C1), dioctyl adipate (C4) and dibutyl cebacate (C8); alkyl dicarboxylic acid cycloalkyl ester based plasticizers such as dicyclopentyl succinate and dicyclohexyl adipate; alkyl dicarboxylic acid aryl ester based plasticizers such as diphenyl succinate and di-4-methyl phenyl glutarate; cycloalkyl dicarboxylic acid alkyl ester based plasticizers such as dihexyl-1,4-cyclohexane dicarboxylate and didecyl bicyclo[2.2.1]heptane-2,3-dicarboxylate; cycloalkyl dicarboxylic acid cycloalkyl ester based plasticizers such as dicyclohexyl-1, 2-cyclobutane dicarboxylate and dicyclopropyl-1,2-cyclohexyl dicarboxylate; cycloalkyl dicarboxylic acid aryl ester based plasticizers such as diphenyl-1,1-cyclopropyl dicarboxylate and di-2-naphthyl-1,4-cyclohexane dicarboxylate; aryl dicarboxylic acid alkyl ester based plasticizers such as diethyl phthalate, dimethyl phthalate, dioctyl phthalate, dibutyl phthalate and di-2-ethylhexyl phthalate; aryl dicarboxylic acid cycloalkyl ester based plasticizers such as dicyclopropyl phthalate and dicyclohexyl phthalate; and aryl dicarboxylic acid aryl ester based plasticizers such as diphenyl phthalate and di-4-methylphenyl phthalate. These alkoxy groups and cycloalkoxy groups may be the same or different, and may also be monosubstituted and the substitution groups may be further substituted. The alkyl groups and the cycloalkyl groups may be mixed, and the substituent groups may be bonded to each other via covalent bond. Furthermore, the aromatic ring of the phthalic acid may be substituted and may be a multimer such as a dimer, a trimer or a tetramer. The phthalic acid ester part of the structure may be a part of the polymer or may be systematically included as a pendant. It may also be introduced into a part of the molecular structure of the additives such as an antioxidant, an acid scavenger and an ultraviolet light absorber.

Polyhydric carboxylic acid ester plasticizers: Specific examples of polyhydric carboxylic acid ester plasticizers include: alkyl polyhydric carboxylic acid alkyl ester based plasticizers such as tridodecyl tricarbalate and tributyl-mesobutane-1,2,3,4,-tetracarboxylate; alkyl polyhydric carboxylic acid cycloalkyl ester based plasticizers such as tricyclohexyl tricarbalate and tricyclopopyl-2-hydroxy-1,2,3-propane tricarboxylate; alkyl polyhydric carboxylic acid aryl ester based plasticizers such as triphenyl-2-hydroxyl-1,2,3-propane tricarboxylate, tetra-3-methylphenyl tetrahydrofuran-2,3,4,5-tetracarboxylate; cycloalkyl polyhydric carboxylic acid alkyl ester based plasticizers such as tetrahexyl-1,2,3,4-cyclobutane tetracarboxylate and tetrabutyl-1,2,3,4,-dicyclopentane tetracarboxylate; cycloalkyl polyhydric carboxylic acid cycloalkyl ester based plasticizers such as tetracyclopropyl-1,2,3,4-cyclobutane tetracarboxylate and tricyclohexyl-1,3,5-cyclohexyl tricarboxylate; cycloalkyl polyhydric carboxylic acid aryl ester based plasticizers such as triphenyl-1,3,5-cyclohexyl tricarboxylate, hexa-4-methylphenyl-1,2,3,4,5,6-cyclohexyl hexacarboxylate; aryl polyhdric carboxylic acid alkyl ester based plasticizers such as tridodecyl benzene-1,2,4-tricarboxylate and tetraoctylbenzene-1,2,4,5-tetracarboxylate; aryl polyhdric carboxylic acid cycloalkyl ester based plasticizers such as tricyclopentyl benzene-1,3,5-tricarboxylate and tetracyclohexyl benzene-1,2,3,5 tetracarboxylate; and aryl polyhdric carboxylic acid aryl ester based plasticizers such as triphenyl benzene-1,3,5-tetracarboxylate and hexa-4-methylphenyl benzene-1,2,3,4,5,6-hexacarboxylate. These alkoxy groups and cycloalkoxy groups may be the same or different, and may also be substituted and the substitution groups may be further substituted. The alkyl groups and the cycloalkyl groups may be mixed, and the substituent groups may be bonded to each other by common bonds. Furthermore, the aromatic ring of the phthalic acid may be substituted and may be a polymer such as a dimer, trimer, tetramer and the like. The phthalic acid ester part of the structure may be a part of the polymer or may be systematically included as a pendant. It may also be introduced into a part of the molecular structure of the additive such as an antioxidant, an acid scavenger and an ultraviolet light absorber.

(UV Absorber)

Films used in a liquid crystal display, for example, a polarizing plate protective film, preferably contain a UV (referred to as ultraviolet rays) absorber which prevents deterioration of the liquid crystal cell or the polarizer when used in outdoor. Also in polarizing plate protective films A and B of the present invention, a UV absorber is preferably used. Specifically, polarizing plate protective film A preferably to contains a UV absorber, and it is more preferable to contain a polymer UV absorber which will be described later, in order to adjust the stiffness of the present invention.

A UV absorber preferably has an excellent ability to absorb UV rays of which wavelength is not more than 370 nm, while the absorbance for visible rays with a wavelength of 400 nm or more is as small as possible, and the transmittance is preferably 50% or more. Specifically, the transmittance at the wavelength of 370 nm is preferably 10% or less and more preferably 5% or less. Examples of a UV absorber usable in the present invention include: oxybenzophenone, benzotriazole, salicylate ester, benzophenone, cyanoacrylate, triazine and a nickel complex. Of these, preferable compounds include benzotriazole because of little coloring. Examples of preferably usable UV absorber include: TINUVIN 109, TINUVIN 171, TINUVIN 326, TINUVIN 327 and TINUVIN 328 produced by Ciba Specialty Chemicals Inc. Since a low molecular weight UV absorber tends to deposit on the web or evaporate while the film is produced, like a plasticizer, the content is preferably 1-10% by weight.

In the present invention, a polymer UV absorber is preferably incorporated in the cellulose ester film since the polymer UV absorber is more difficult to deposit than the above mentioned low molecular weight. UV absorber, whereby UV rays are thoroughly blocked without losing dimensional stability, retention of the UV absorber, anti-permeability, while preventing phase separation of the UV absorber in the film. As a polymer UV absorber usable in the present invention, the polymer VV absorbers disclosed in JP-A No. 6-148430 and polymers containing a UV absorbing monomer can be used without limitation.

It is preferable in the present invention that a UV absorbing copolymer (also referred to as a polymer UV absorber) obtained from a UV absorbing monomer represented by Formula (2) is incorporated in the cellulose ester film.

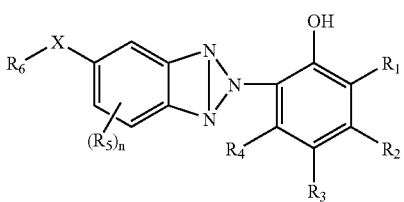

Formula (2)

wherein n represents an integer of 0-3, $R_1$-$R_5$ each represent a hydrogen atom, a halogen atom or a substituent, X represents —COO—, CONR$_7$—, —OCO— or —NR$_7$CO—, $R_6$ represents a hydrogen atom, an alkyl group, a cycloalkyl group, an alkenyl group or an alkynyl group, $R_7$ represents a hydrogen atom, an alkyl group or an cycloalkyl group, provided that the group represented by $R_6$ has a polymerizable group as a substructure.

In Formula (2), n represents an integer of 0-3. When n is 2 or more, plural $R_5$ may be the same or may be different to each other and may be combined to form a 5-7 membered ring.

$R_1$-$R_5$ each represent a hydrogen atom, a halogen atom or a substituent. Examples of a halogenatom include: a fluorine atom, a chlorine atom, a bromine atom and an iodine atom. Of these, preferable are, for example, a fluorine atom or a chlorine atom. Examples of a substituent include: alkyl groups (for example, a methyl group, an ethyl group, an isopropyl group, a hydroxyethyl group, a methoxymethyl group, a trifluoromethyl group and a t-butyl group), alkenyl groups (for example, a vinyl group, an allyl group and a 3-butene-1-yl group), aryl groups (for example, a phenyl group, a naphthyl group, a p-tolyl group and a p-chlorophenyl group), heterocycle groups (for example, a pyridyl group, a benzimidazolyl group, a benzthiazolyl group and a benzoxazolyl group), alkoxy groups (for example, a methoxy group, an ethoxy group, an isopropoxy group and a n-butoxy group), aryloxy groups, (for example, a phenoxy group), heterocycleoxy groups (for example, a 1-phenyltetrazole-5-oxy group and a 2-tetrahydropyranyloxy group), acyloxy groups (for example, an acetoxy group, a pivaloyloxy group and a benzoyloxy group), acyl groups (for example, an acetyl group, a propanoyl group and a butyroyl group), alkoxycarbonyl groups (for example, a methoxycarbonyl group and an ethoxycarbonyl group), aryloxycarbonyl groups (for example, a phenoxycarbonyl group), carbamoyl groups (for example, a methylcarbamoyl group, an ethylcarbamoyl group and a dimethylcarbamoyl group), amino groups, alkylamino groups (for example, a methylamino group, an ethylamino group and a diethylamino group), anilino groups (for example, an anilino group and a N-methylanilino group), acylamino groups (for example, an acetylamino group and a propionylamino group), a hydroxyl group, cyano groups, nitro groups, sulfonamide groups (for example, a methanesulfonamide group and a benzenesulfonamide group), sulfamoylamino groups (for example, a dimethylsulfamoylamino group), sulfonyl groups (for example, a methanesulfonyl group, a butanesulfonyl group and a phenylsulfonyl group), sulfamoyl groups (for example, an ethylsulfamoyl group and a dimethylsulfamoyl group), sulfonylamino groups (for example, a methanesulfonylamino group and a benzenesulfonylamino group), ureido groups (for example, a 3-methylureido group, a 3,3-dimethylureido group and a 1,3-dimethylureido group), imide groups (for example, a phthalimide group), silyl groups (for example, a trimethylsilyl group, a triethylsilyl group and a t-butyldimethylsilyl group), alkylthio groups (for example, a methylthio group, an ethylthio group and an n-butylthio group), and arylthio groups (for example, a phenylthio group) Of these, preferable are, for example, alkyl groups and an aryl groups.

In Formula (2), the groups represented by $R_1$-$R_5$ each may be further substituted, if possible and neighboring groups of $R_1$-$R_4$ may be combined to form a 5-7 membered ring.

$R_6$ represents a hydrogen atom, an alkyl group, a cycloalkyl group, an alkenyl group or an alkynyl group. Examples of an alkyl group include: a methyl group, an ethyl group, a propyl group, an isopropyl group, an n-butyl group, an isobutyl group, a t-butyl group, an amyl group, an isoamyl group and a hexyl group. The above alkyl groups may further have a halogen atom or a substituent. Examples of a halogen atom include: a fluorine atom, a chlorine atom, a bromine atom and an iodine atom. Examples of a substituent include: acyl groups (for example, an acetyl group, a propanoyl group and a butyroyl group), alkoxy groups (for example, a methoxy group, an ethoxy group, an isopropoxy group and a n-butoxy group), amino groups, alkylamino groups (for example, a methylamino group, an ethylamino group and a diethylamino group), acylamino groups (for example, an acetylamino group and a propionylamino group), a hydroxyl group, cyano groups, carbamoyl groups (for example, a methylcarbamoyl group, an ethylcarbamoyl group and a dimethylcarbamoyl group), acyloxy groups (for example, an acetoxy group and a pivaloyloxy group) and alkoxycarbonyl groups (for example, a methoxycarbonyl group and an ethoxycarbonyl group).

Examples of a cycloalkyl group include: saturated cyclohydrocarbon groups such as a cyclopentyl group, a cyclohexyl group, a norbornyl group and an adamantyl group, which may be further substituted or may not be substituted.

Examples of an alkenyl group include: an ethynyl group, a butadiyl group, a propargyl group, a 1-methyl-2-propynyl group, a 2-butyny group and a 1,1-dimethyl-2-propynyl group. Of these preferaanle are, for example, an ethynyl group and a propargyl group.

Examples of an alkynyl group include: an ethynyl group, butadiyl group, a propargyl group, 1-methyl-2-propynyl group, 2-butyny group, 1,1-dimethyl-2-propynyl group. Of these, preferable are, for example, an ethynyl group and a propargyl group.

In Formula (2), X represents —COO—, CONR$_7$—, —OCO— or —NR$_7$CO—.

$R_7$ represents a hydrogen atom, an alkyl group and a cycloalkyl group. Examples of an alkyl group include: a methyl group, an ethyl group, a propyl group, an isopropyl group, a n-butyl group, an isobutyl group, a t-butyl group, an amyl group, an isoamyl group and a hexyl group. Each of these alkyl groups may further have a halogen atom or a substituent. Examples of a halogen atom include: a fluorine atom, a chlorine atom, a bromine atom and an iodine atom. Examples of a substituent include: acyl groups (for example, an acetyl group, a propanoyl group and a butyroyl group), alkoxy groups (for example, a methoxy group, an ethoxy group, an isopropoxy group and a n-butoxy group), amino groups, alkylamino groups (for example, a methylamino group, an ethylamino group and a diethylamino group), anilino groups (for example, an anilino group and an N-methyl anilino group), acylamino groups (for example, an acetylamino group and a propionylamino group), a hydroxyl group, cyano groups, carbamoyl groups (for example, a methylcarbamoyl group, an ethylcarbamoyl group and a dimethylcarbamoyl group), acyloxy groups (for example, an acetoxy group and a pivaloyloxy group) and alkoxycarbonyl groups (for example, a methoxycarbonyl group and an ethoxycarbonyl group).

Examples of a cycloalkyl group include saturated cyclic hydrocarbons, such as a cyclopentyl group, a cyclohexyl group, a norbornyl group, and an adamantyl group, which may be further substituted or may not be substituted.

In the present invention, the polymerizable group includes an unsaturated ethylenic polymerizable group or a di-functional condensation-polymerizable group, and preferably an unsaturated ethylenic polymerizable group. Concrete examples of the unsaturated ethylenic polymerizable group include a vinyl group, an allyl group, an acryloyl group, a methacryloyl group, a styryl group, an acrylamido group, a methacrylamido group, a vinyl cyanide group, a 2-cyanoacryloxy group, a 1,2-epoxy group and a vinyl ether group and preferably the vinyl group, the acryloyl group, the methacryloyl group, the acrylamido group and the methacrylamido group. To have a polymerizable group as a partial structure means that the polymerizable groups are bonded directly or through a linking group of divalent or more. Examples of a linking group of divalent or more include: alkylene groups (such as a methylene group, a 1,2-ethylene group, a 1,3-propylene group, a 1,4-butylene group and a cyclohexane-1,4-diyl group); alkenylene groups (such as an ethene-1,2-diyl group and a butadiene-1,4-diyl group); alkynylene groups (such as an ethyne-1,2-diyl group, a butane-1,3-diyl-1,4-diyl); and hetero atom linking groups (an oxygen atom, a sulfur atom, a nitrogen atom, a silicon atom and a phosphor atom). Of these, preferable are, for example, an alkylene group and a hetero atom linking group. These groups may be combined to form a composite bonding group. The weight average molecular weight of the polymer derived from the UV absorbing monomer is 2,000-30,000, and preferably 5,000-20,000.

The weight average molecular weight of the UV absorbing copolymer can be controlled by known molecular weight controlling methods. For controlling the molecular weight, for example, a method can be applied in which a chain transfer agent such as carbon terachloride, laurylmercptane or octyl thioglycolate is employed. The polymerization is usually performed at a temperature of from a room temperature to 130° C., and preferably 50-100° C.

The UV absorbing polymer employed in the present invention may be a homopolymer derived from a UV absorbing monomer or may be a copolymer derived from the UV absorbing monomer and another polymerizable monomer. Examples of the other monomer capable of polymerizing include unsaturated compounds, for example, styrene derivatives (such as styrene, α-methylstyrene, o-methylstyrene, m-methylstyrene, p-methylstyrene and vinylnephthalene); acrylate derivatives (such as methyl acrylate, ethyl acrylate, propyl acrylate, butyl acrylate, i-butyl acrylate, t-butyl acrylate, octyl acrylate, cyclohexyl acrylate and benzyl acrylate); methacrylate derivatives (such as methyl methacrylate, ethyl methacrylate, propyl methacrylate, butyl methacrylate, i-butyl methacrylate, t-butyl methacrylate, octyl methacrylate and cyclohexyl methacrylate); alkyl vinyl ethers (such as methyl vinyl ether, ethyl vinyl ether and butyl vinyl ether); alkyl vinyl esters (such as vinyl formate, vinyl acetate, vinyl butyrate, vinyl capronate and vinyl stearate); crotonic acid; maleic acid; fumaric acid; itaconic acid; acrylonitrile; methacrylonitrile; vinyl chloride; vinylidene chloride; acrylamide; and methacrylamide. Of these, for example, methyl acrylate, methyl methacrylate and vinyl acetate are preferred.

It is also preferable that the component other than the UV absorbing monomer in the polymer derived from the UV absorbing monomer contains a hydrophilic ethylenic unsaturated monomer.

As the hydrophilic ethylenic unsaturated monomer, a hydrophilic compound having a polymerizable unsaturated double bond in the molecular thereof is employable without any limitation. For example, a unsaturated carboxylic acid such as acrylic acid and methacrylic acid, an acrylate and methacrylate each having a hydroxyl group or an ether bond such as 2-hydroxyethyl methaceylate, 2-hydroxypropyl methacrylate, tetrahydrfurfuryl methacrylate, 2-hydroxyethyl acrylate, 2-ydroxypropyl acrylate, 2,3-dihydroxy-2-methylpropyl methacrylate, tetrahydrofurfuryl acrylate, 2-ethoxyethyl acrylate, diethylene glycol ethoxylate acrylate and 3-methoxybutylbutyl acrylate, acrylamide, an N-substituted (meth)acrylamido such as N,N-dimethyl(meth)acrylate, N-vinylpyrrolidone and N-vinyloxazolidone are employable.

As the hydrophilic ethylenic unsaturated monomer, a (meth)acrylate having a hydroxyl group or a carboxyl group in the molecule thereof is preferable, and 2-hydroxyethyl methacrylate, 20hydroxypropyl methacrylate, 2-hydroxyethyl acrylate and 2-hydroxypropyl acrylate are particularly preferable.

These polymerizable monomers can be copolymerized solely or in combination of two or more kinds together with the UV absorbing monomer.

In the present invention, the method for polymerizing the UV absorbing copolymer is not specifically limited and known methods such as radical polymerization, anion polymerization and cation polymerization can be widely applied. As the initiator for the radical polymerization, an azo compound and a peroxide compound such as azobisisobutylnitrile (AIBN), a diester of azobisisobutylic acid, benzoyl peroxide and hydrogen peroxide are employable. The solvent for polymerization is not specifically limited, and examples of usable solvent include an aromatic hydrocarbon type solvent such as toluene and chlorobenzene, a halogenized hydrocarbon type solvent such as dichloroethane and chloroform, a an ether type solvent such as tetrahydrofuran and dioxane, an amide type solvent such as dimethylformamide, an alcohol type solvent such as methanol, an ester type solvent such as methyl acetate and ethyl acetate, a ketone type solvent such as acetone, cyclohexanone and methyl ethyl ketone, and an aqueous solvent. Solution polymerization in which the polymerization is carried out in a uniform system, precipitation polymerization in which the formed polymer is precipitated, emulsion polymerization in which the polymerization is carried out in a micelle state and suspension polymerization carried out in a suspended state can be performed according to selection of the solvent. However, UV absorbing latex obtained via emulsion polymerization is not preferable to be used as an optical film.

The mixing ratio of the UV absorbing monomer, the polymerizable monomer capable of polymerizing with the UV absorbing monomer and the hydrophilic unsaturated monomer is suitably determined considering the compatibility of the obtained UV absorbing copolymer with the other transparent polymer and the influence on the transparency and the mechanical strength of the optical compensating film.

The content of the UV absorbing monomer in the polymer derived from the UV absorbing monomer is preferably 1-70%, and more preferably 5-60%, by weight. When the content of the UV absorbent monomer in the UV absorbing polymer is less than 1%, addition of a large amount of the UV absorbing polymer is necessary for satisfying the desired UV absorbing ability so that increasing in the haze or lowering in the transparency and the mechanical strength by the precipitation is caused. On the other hand, when the content of the UV absorbing monomer in the UV absorbing polymer exceeds 70% by weight, the transparent optical compensating film is difficultly obtained sometimes since the compatibility of the polymer with another polymer is lowered. Also, the workability in the film forming process and productivity are reduced due to the decrease in solubility in the solvent.

The hydrophilic ethylenic unsaturated monomer is preferably contained in the UV absorbing copolymer in a ratio of from 0.1 to 50% by weight. When the content is less than 0.1%, the improvement effect on the compatibility of the hydrophilic ethylenic unsaturated monomer cannot be obtained and when the content is more than 50% by weight, the isolation and purification of the copolymer becomes impossible. More preferable content of the hydrophilic ethylenic unsaturated monomer is from 0.5 to 20% by weight. When the hydrophilic group is substituted to the UV absorbing monomer itself, it is preferable that the total content of the hydrophilic UV absorbing monomer and the hydrophilic ethylenic unsaturated monomer is within the above-mentioned range.

For satisfying the content of the UV absorbing monomer and the hydrophilic monomer, it is preferable that the an ethylenic unsaturated monomer having no hydrophilicity is further copolymerized additionally to the above two monomers.

Two or more kinds of each of the UV absorbing monomer and hydrophilic or non-hydrophilic ethylenic unsaturated monomer may be mixed and copolymerized.

Typical examples of the UV absorbing monomer to be preferably employed in the present invention are listed below, but the monomer is not limited thereto.

MUV-1

MUV-2

MUV-3

MUV-4

-continued

MUV-5
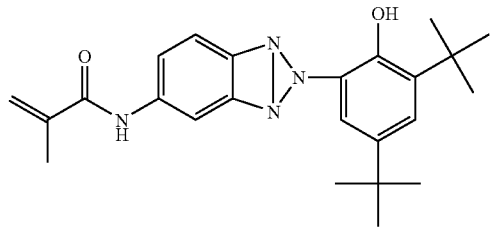

MUV-6
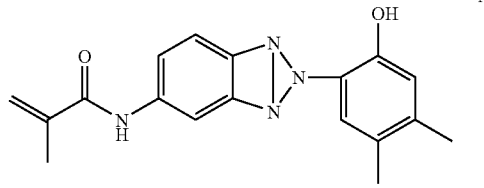

MUV-7
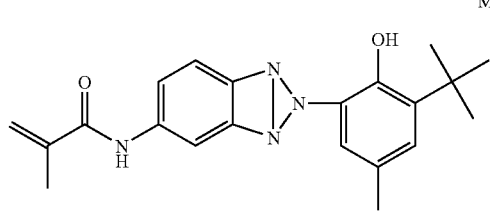

MUV-8
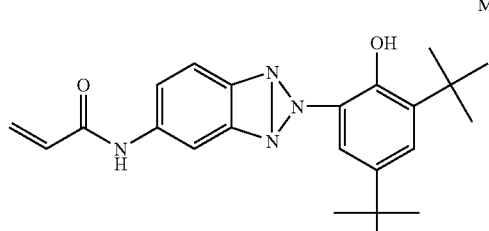

MUV-9
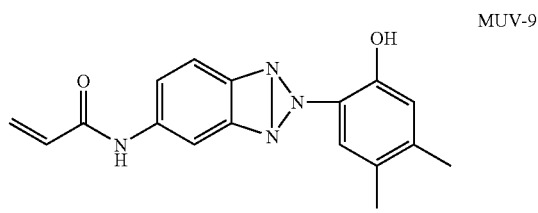

MUV-10
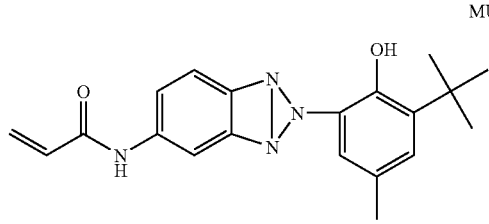

MUV-11
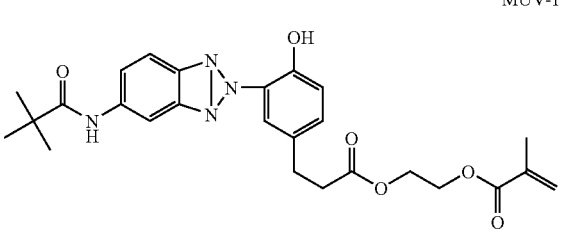

MUV-12
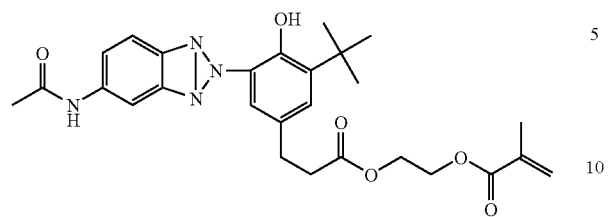
MUV-13
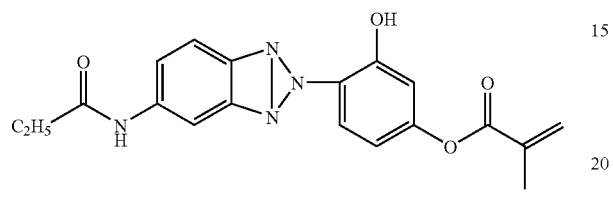
MUV-14
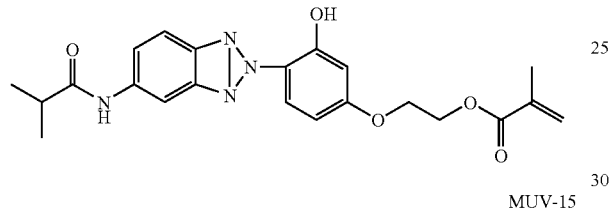
MUV-15
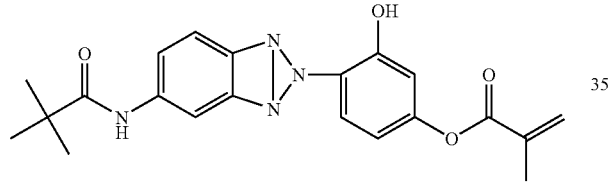
MUV-16
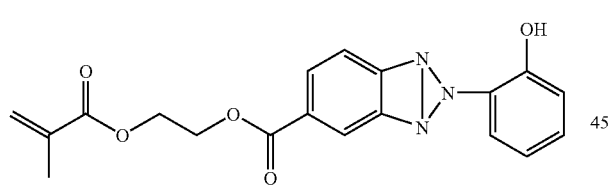
MUV-17
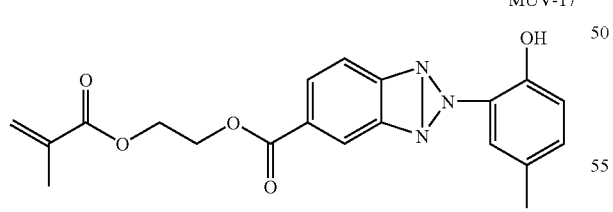
MUV-18
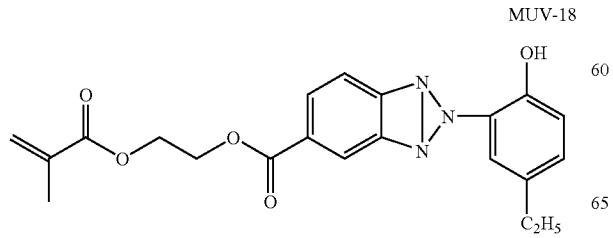
MUV-19
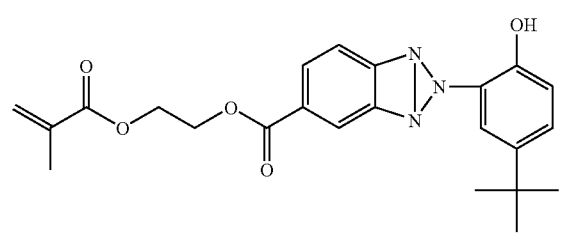
MUV-20
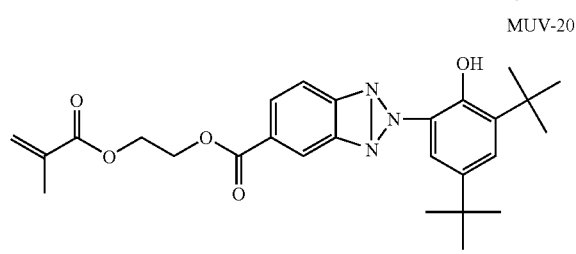
MUV-21
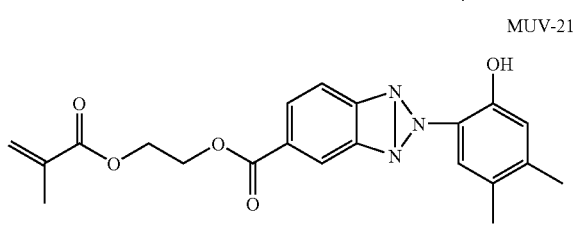
MUV-22
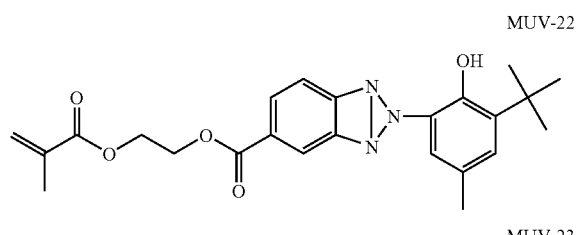
MUV-23
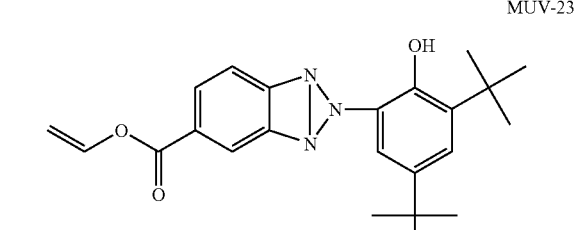
MUV-24
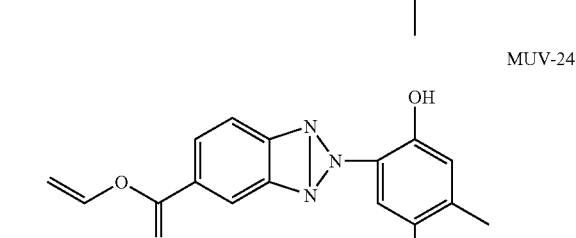
MUV-25
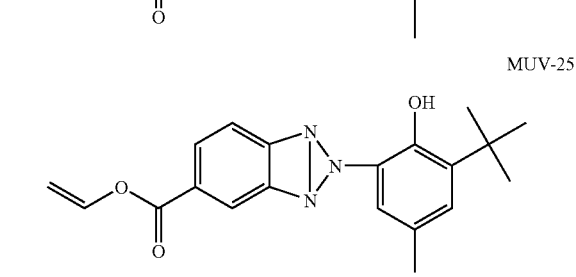

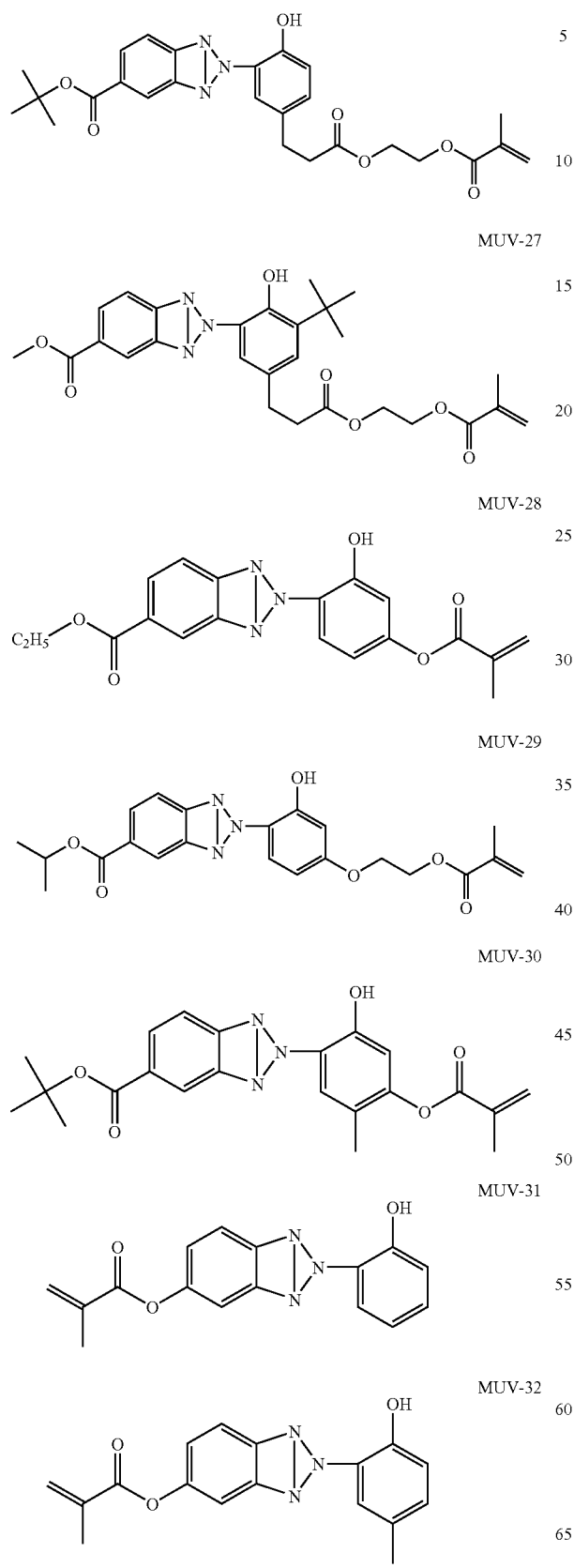
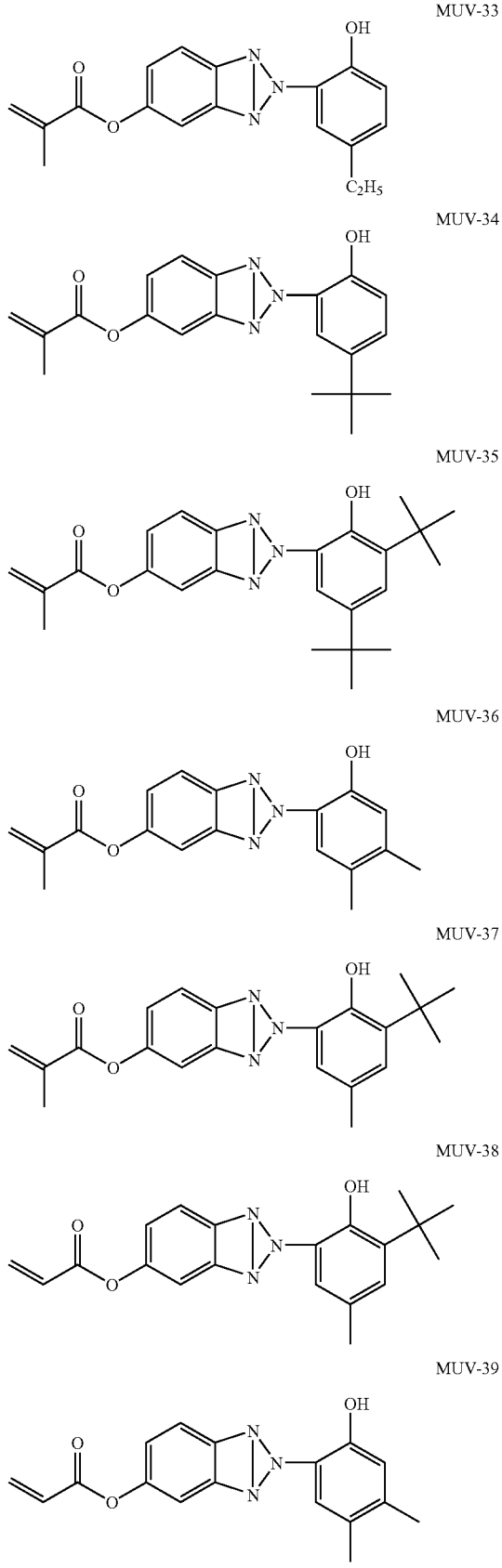

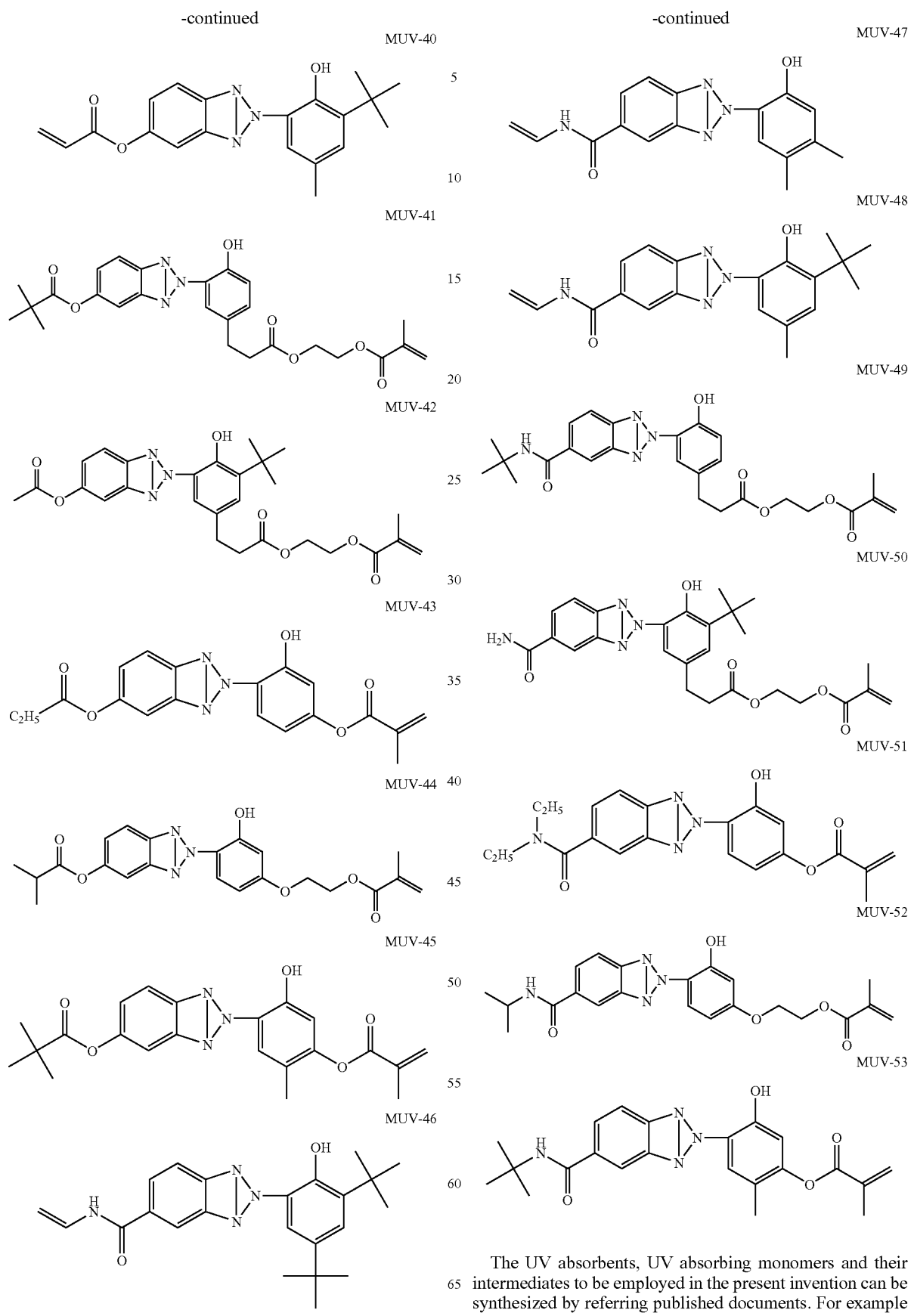
The UV absorbents, UV absorbing monomers and their intermediates to be employed in the present invention can be synthesized by referring published documents. For example U.S. Pat. Nos. 3,072,585, 3,159,646, 3,399,173, 3,761,373, 4,028,331 and 5,683,861, European Patent No. 86,300,416, Japanese Patent O.P.I. Publication Nos. 63-227575 and 63-185969, "Polymer Bulletin" V. 20 (2), 169-176, and "Chemical Abstracts V. 109, No. 191389 can be referred for synthesizing.

The UV absorbent and the UV absorbing polymer to be used in the present invention can be employed together with a low or high molecular weight compound or an inorganic compound according to necessity on the occasion of mixing with the other transparent polymer. For example, it is one of preferable embodiments that the UV absorbent polymer and another relatively low molecular weight UV absorbent are simultaneously mixed with the other transparent polymer. Moreover, simultaneously mixing of an additive such as an antioxidant, a plasticizer and a flame retardant is also one of preferable embodiments.

The ultraviolet light absorber and the ultraviolet light absorbing polymer used in this invention may be added to a cellulose ester film by being included in the optical film or by being coated on the cellulose ester film. In the case of inclusion in the cellulose ester film, direct addition and in-line addition are favorable. The in-line addition is a method in which the ultraviolet light absorber and the ultraviolet light absorbing polymer are dissolved beforehand in an organic solvent (such as methanol, ethanol, methylene chloride) and dissolved, and then added to the dope composition using an in-line mixer or the like.

The amount of the ultraviolet light absorber and the ultraviolet light absorbing polymer used in this invention is not fixed and depends of type of compound and the conditions for use. However, in the case of the ultraviolet light absorber, for 1 $m^2$ of optical film, the amount is preferably in the range of 0.2-3.0 g, more preferably 0.4-2.0 g and 0.5-1.5 g is particularly preferable. In the case of the ultraviolet light absorbing polymer, for 1 $m^2$ of optical film, it is preferably in the range of 0.6-9.0 g, more preferably 1.2-6.0 g and even more preferably 1.5-3.0 g.

From the viewpoint of preventing deterioration of the liquid crystal, a substance in which absorbance of ultraviolet light having a wavelength of no more than 380 nm is excellent, and from the viewpoint of favorable liquid crystal display properties a substance with little absorbance of visible light below 400 nm is preferable. In this invention, it is preferable that at a wavelength of 380 nm, transparency is not more than 8%, and preferably not more than 4% and transparency of not more than 1% is particularly preferable.

As UV absorbent monomers available on the market, 1-(2-bezotriazole)-2-hydroxy-5-(vinyloxycarbonylethyl)-benzene UVM-1 and a reactive type UV absorbent 1-(2-benzotriazole)-2-hydroxy-5-(2-methacryloyloxyethyl)-benzene UVA 93, each manufactured by Ootsuka Chemical Co., Ltd., and similar compounds are employable in the present invention. They are preferably employed solely or in a state of polymer or copolymer but not limited thereto. For example, a polymer UV absorbent available on the market PUVA-30M, manufactured by Ootsuka Chemical Co., Ltd., is preferably employed. The UV absorbent may be used in combination of two or more kinds thereof. The method for adding the ultraviolet light absorber to the dope may be by dissolving the ultraviolet light absorber in an organic solvent such as alcohol, methyl chloride, dioxolane or methyl acetate, and then adding it to the dope, or alternatively the ultraviolet light absorber may be directly added to the dope composition.

An antioxidant may be included in the cellulose ester film of this invention. For example as described in Japanese Patent Application Laid-Open No. 5-197073, a peroxide decomposing agent, a radical chain-linking agent, or metal deactivator or an acid trapping agent may also be included. The amount in which these compounds are added is preferably in a weight ratio of 1 ppm-1.0%, and more preferably 10-1,000 ppm to the cellulose ester.

In the present invention, it is preferable that a fine particle matting agent is included in the cellulose ester film, and examples of the fine particle matting agent include fine particles of inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked fine particles of high molecular weigh polymers Of these, silicon dioxide is preferable in view of reduced haze in the film. The average particle diameter of the secondary particles from among the fine particles is preferably in the range of 0.01-1.0 μm and the amount of these particles included is preferably in the range of 0.005-0.3 percent by weight of the cellulose ester. The particles such as the silicon dioxide particles are often surface treated using an organic substance, and this is preferable because it reduces haze in the film. Examples of the organic compound used in the surface treatment include halogens, alkoxysilanes (particularly alkoxysilanes having a methyl group), silazanes, and siloxanes. Particles having a larger average particle diameter have a greater matting effect, while particles having a smaller average particle diameter have excellent transparency. Thus among the particles, the primary particles preferably have an average primary particle size of 5-50 nm, and more preferably 7-16 nm. These particles are usually present in the cellulose ester film as an aggregate, and preferably form unevenness of 0.01-1.0 μm in the plane of the cellulose ester film. Examples of the silicon dioxide particles include Aerosil 200, 200V, 300, R972, R972V, R974, R202, R812, OX50, or TT600 (each manufactured by Aerosil Co., Ltd.), and of these, Aerosil 200V, R972, R972V, R974, R202, and R812, are preferred. Two or more of these matting agents may be combined and used. In the case where 2 or more matting agents are used, they may be mixed in a suitably selected proportion. In this case, matting agents which have different particle size and quality such as Aerosil 200V and R927V may be used in weight proportions in the range from 0.1:99.9 to 99.9:0.1

The method to produce the polarizing plate protective film of the present invention will now be described.

The method for preparing the cellulose ester dope of the present invention will be described. Flakes of cellulose ester are stirred into the dissolution vessel with an organic solvent, which is the main good solvent for the cellulose ester, and thereby dissolved and the dope is formed. Examples of the dissolution method include a method which is performed at normal pressure; a method which is performed below the boiling point of the main solvent; a method which is performed by applying pressure below the boiling point of the main solvent; a method which is performed by cold dissolution as described in Japanese Patent Application Laid-Open No. 9-95544, No. 9-95557, or No. 9-95538; and various dissolution methods performed under high pressure as disclosed in Japanese Patent Application Laid-Open No. 11-21379. After dissolution, the dope is filtered with a filtering material and then defoamed and sent to the next step. The cellulose ester concentration in the dope is between 10 and 35 percent by weight, and more preferably between 15 and 25 percent. In order to include the polymer useful in the present invention in a cellulose ester dope, the polymer is dissolved beforehand in an organic solvent and then added to the cellulose ester dope, and the method for addition, such as direct addition and the like is not limited. In this case the addition is done such that there is no cloudiness or phase separation of the polymer in the dope. The amount to be added is as described above.

Examples of good solvents of the cellulose ester include organic solvents such as, methyl acetate, ethyl acetate, amyl acetate, ethyl formate, acetone, cyclohexanone, methyl acetoacetata, tetrahydrofuran, 1,3-dioxolane, 4-methyl-1,3-dioxolane, 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone and methylene chloride are preferably used. However, there is a tendency for non-chlorine organic solvents to be more preferable based on recent environmental issues. Low grade alcohols such as methanol, ethanol, butanol and the like can be favorably used along with these organic solvents, since they can improve the solubility of the cellulose ester in the organic solvent and reduce the viscosity of the dope. Ethanol in particular is favorable because of its low boiling point and it low toxicity. It is preferable that organic solvent used with the dope of the present invention is a mixture of a good solvent and a poor solvent for cellulose ester in view of production efficiency, and a favorable range of proportion for mixing the good solvent and the poor solvent is 70-98 percent by weight of the good solvent and 2-30 percent by weight of the poor solvent. A good solvent in the present invention is defined as a solvent that will dissolve the cellulose ester that is used on its own while a poor solvent is one that does not dissolve the cellulose ester on its own. The poor solvent used with the dope of the present invention is not particularly limited, but examples of the solvent that is preferably used include methanol, ethanol, n-butanol, cyclohexane, acetone, cyclohexanone and the like. Selection of the organic solvent for the polymer used in the present invention is also preferably a good solvent for cellulose ester. As described above, in the case where the low molecular weight plasticizer is used, conventional method for addition may be used and the plasticizer may be added directly to the dope or dissolved in an organic solvent beforehand and then poured into the dope.

When the various additives described above are added to the cellulose ester dope, it is preferable that a solution in which the cellulose ester dope and the various additives are dissolved in a small amount of the cellulose ester is blended by in-line addition. For example, an in-line mixer such as static mixer SWJ (Toray static in-line mixer, Hi-Mixer, manufactured by Toray Engineering) is preferably used. In the case where the in-line mixer is used, it is preferably applied to a dope in which the cellulose ester is subjected to concentrated dissolution under high pressure and in this case, a specific type of pressurizing container may be used, which is capable of withstanding a prescribed pressure, and which can be heated under pressure and in which stirring can be performed.

In the present invention, by filtering the cellulose ester dope, foreign matter, particularly foreign matter that can be mistakenly identified as images in the liquid crystal image display device, are removed. It can be said that the quality of the polarizing plate protective film is determined by this filtration. It is preferable that the absolute filtration accuracy of the filtering material used in this filtration is small, but if the absolute filtration accuracy is too small, there is clogging of the filtration material is likely to occur, and thus the filtering material must be replaced frequently and this causes the problem of reduced productivity. As a result, the absolute filtration accuracy of filtering material for the cellulose ester dope of the present invention is preferably in the range not mote than 0.008 mm, more preferably in the range of 0.001-0.008 mm, and still more preferably in the range of 0.003-0.006 mm. The quality of the filtering material is not particularly limited, and conventional filtering materials may be used. However, filtering material made from plastic fibers such as polypropylene, Teflon (registered trademark) and the like or filtering material made of metals such as stainless steel are preferable in the view of the fact that there is no falling out of the fibers. Filtration of the cellulose ester dope of the present invention can be performed using conventional methods, but a method in which filtration is performed while heating under reduced pressure at a temperature which is less that the boiling point of the solvent at atmospheric pressure, and which is within a range in which the solvent does not boil is preferred in view of the fact that increase in differential pressure after filtration (referred to as filtration pressure hereinafter) is small. The preferable temperature range is 45-120° C., more preferably 45-70° C., and still more preferably 45-55° C. The filtration pressure is preferably small. The filtration pressure is preferably no greater than $1.6 \times 10^6$ Pa, more preferably no greater than $1.2 \times 10^6$ Pa, and still more preferably, no greater than $1.0 \times 10^6$ Pa. Including an unsubstituted acyl group or a cellulose ester with a low degree of acetylation in raw material for the cellulose ester, sometimes causes foreign material obstruction (sometimes called luminance point hereinafter). A polarizer was placed between two cellulose ester film samples arranged in a crossed state (crossed Nicol state). The luminance point is a phenomenon which occurs when light was irradiated from one side and observed from the other side using an optical microscope (50 magnification) and if the cellulose ester film is a normal one, light is blocked and there is darkness and nothing can be seen, while if foreign material is present, light leaks from that area and luminance appears as spots. Actual damage when the cellulose ester film is used as a liquid crystal image display device is large to the extent that that the diameter of the luminance point is large, and the diameter of the luminance point should be no greater than 50 µm, preferably no greater than 10 µm, and still more preferably no greater than 8 µm. It is to be noted that the diameter of the luminance point is the diameter that is measured when the luminance point is approximated to a perfect circle. If the diameter of the luminance point defined here is $400/cm^2$ or less, there are no problems in terms of practical use, the diameter is preferably $300/cm^2$ or less, and more preferably $200/cm^2$ or less. In order to reduce the amount and size of these luminance spots, it is necessary to properly filter fine foreign material. Also, as described in Japan Patent Application Laid-Open No. 2000-137115, the method in which a crushed cellulose ester film which has been formed are added again in the proportion of the dope and used as the materials for the cellulose ester and the additives is preferably used as the luminance spots are reduced.

Next, the process for casting the cellulose ester dope on a metal support, the drying process for drying on the metal support, and the peeling process for peeling the web from the metal support will be described. The metal support body is an endless metal belt which can move infinitely or a rotating metal drum with the surface thereof being a mirror surface. The casting process is one in which a dope is pumped to a pressure die through a pressure type metering gear pump, and cast from the pressure die onto a metal support at a casting position. Another casting process is a doctor blade method in which the thickness of the cast dope film is adjusted with a blade or a method using reverse roll coater in which the dope thickness of the cast dope is adjusted with a reverse roller coater rotating reversely. A pressure die is preferred in view of the fact that the slit shape at the opening portion can be regulated and the film thickness is readily regulated to be uniform. Examples of the pressure die include a coat hanger die, a "T" die, and the like, and any of these maybe favorably employed. In order to increase the casting speed, two or more pressure dies may be provided on the metal support and dopes divided into two or more may be cast on the metal support and the dope amount may be divided and layered. The thickness of the film may be controlled to a desired thickness by controlling the dope concentration, the amount of dope pumped, the space of the slit in the die opening, the push-out pressure of the die, the speed of the metal support body and the like.

The drying process performed on the metal support is one in which a web (a dope film which is formed after a dope is cast on a metal support is called a web) is heated on a support and solvents are evaporated. Methods for evaporating solvents, include a method in which hot air is blown from the web side and the backside of the support, a method in which heating is carried out from the back surface of the support using heat transfer by liquid, and a method in which heating is carried out from the surface as well as the back surface using heat radiation. Further, these methods are preferably combined. If the web is thin, drying is quick. The temperature of the support may be the same along the entire support or may be different depending on the position.

The method for performing drying on the metal support which is used in the present invention, is preferably a method in which casting is done on the metal support at a temperature of 0-40° C., and more preferably at a temperature of 5-30° C. The air for drying the web is preferably 30-45° C., but is not limited thereto.

The peeling process is one in which a web, in which the organic solvents have been evaporated on the support, is peeled prior to conveying of the metal support. The peeled web is sent to the drying process. The position at which the web is peeled from the metal support is called the peeling point, and the rollers which aid in the peeling are called peeling rollers. This phenomenon depends on the thickness of the web, but when the residual solvent amount (represented by the formula described below) is too large, it may be difficult to peel the web. On the contrary, when peeling is carried out after fully drying the web on the support, a part of the web may peel before the peeling position. It is generally preferable that web peeling is performed when the residual solvent amount is 20 to 180 percent by weight. The residual solvent amount in the present invention when the film is peeled is preferably 20-40 percent by weight or 60-150 percent by weight, and 80-140 percent by weight is particularly preferable. One method for increasing the speed of film production (the film production speed can be increased because the peeling is performed when the residual solvent amount is a much as possible) is a gel casting method in which peeling can be done even when the residual solvent amount is high. The gel casting methods include a method in which poor solvents with respect to the cellulose ester are added to a dope and gelling is carried out after casting the dope, and also a method in which gelling is carried out by decreasing the temperature of a support, and the like. There is further a method in which metal salts are added to the dope. By strengthening the web film through gelling the dope on the support, it is possible to carry out earlier peeling and to increase the film formation speed. When the peeling is carried out at the time when the residual solvent amount is still great, the web may be too soft, and during peeling, the flatness of the web is compromised, and formation of wrinkles and longitudinal streaks due to the peeling tension become likely. Accordingly, the residual solvent amount is determined such that economic operation and quality are balanced.

The residual solvent amount used in the present invention is expressed by the formula below.

$$\text{Residual solvent amount (percent by weight)} = \{(M-N)/N\} \times 100$$

In the formula, M represents the weight of the web at a suitably selected point and N represents the weight when M is dried for 3 hours at 110° C.

Furthermore, it is preferable that in the process for drying the cellulose ester film, the film that has been peeled from the support is further dried to cause the residual solvent amount to 2.0 percent by weight or less, and more preferably 1.0 percent by weight or less, and still more preferably 0.5 percent by weight or less.

In the drying process, the web is dried by employing a method in which the web is conveyed through rolls placed in a staggered way and drying device or a tenter drying device in which the web is conveyed while holding both edges of the web using clips and maintaining web width or slightly stretching the web in the width direction. In the present invention, it is particularly favorable to maintain or stretch the web width in a suitably selected process subsequent to peeling of the web by the tenter drying device and at a suitably selected point where the residual solvent amount is great, since humidity stability of the optical properties are favorable. The means for drying the web is not particularly limited and the drying is generally carried out by hot air, infrared rays, heat rolling or microwaves. It is preferable that the drying is performed by hot air in view of simplicity. The drying temperature is preferably gradually increased in the range from 40 to 180° C. and more preferably in the range from 50 to 160° C.

The cellulose ester film of the present invention is preferably stretched by 1% both in MD (the film transport direction) and TD (the transverse direction orthogonal to MD), in order to obtain sufficient flatness of the film. For obtaining a film having little difference in in-plane retardation values, the stretching ratios in MD and in TD are preferably similar.

It is to be noted that the stretching operation may be performed in a number of stages and the web is preferable stretched biaxially in the casting direction and the width direction. Furthermore, biaxial stretching may be performed simultaneously or stepwise. In this case stepwise means that, for example, stretching in different directions can be performed sequentially, or stretching in the same direction can be performed in many stages and then the stretching in the different direction is added at the end of any of those stages.

It is preferable that the cellulose ester film is thin, because the resulting polarizing plate is also thin, and this causes a thin liquid crystal display film to be readily achieved. However if the film is too thin, transparency and tear strength deteriorate. The thickness of the cellulose ester film that achieves a balance between the two is preferably 30-60 μm which is the preferable range of the present invention.

The width of the cellulose ester film is preferably not less than 1.4 m, and more preferably in the range of 1.4-4 m in view of productivity in that a large liquid crystal display device is obtained.

Polarizing plate protective film A of the present invention is a film provided on the viewer side, and preferably has a functional layer described below at least on one surface of the film.

(Hard Coat Layer)

In the present invention, it is preferred that a hard coat layer is provided on polarizing plate protective film A a functional layer.

The hard coat layer of the present invention is provided at least on one surface of polarizing plate protective film A. Polarizing plate protective film A of the present invention preferably has an antireflection layer (for example, a high refractive index layer and a low refractive index layer) to form an antireflection film.

An actinic ray curable resin layer is preferably employed as a hard coat layer.

The actinic ray curable resin layer refers to a layer which contains, as a main component, a resin cured through a crosslinking reaction when exposed to actinic rays such as UV light or electron beams. The actinic ray curable resin layer preferably contains an ethylenically unsaturated monomer, which is exposed to actinic rays such as UV light or electron beams and cured to form a hard coat layer. Listed as representative actinic ray curable resins are UV curable resins as well as electron beam curable resins. The actinic ray curable resin is preferably a UV curable resin.

Listed as UV curable resins may be, for example, UV curable urethane acrylate resins, UV curable polyester acrylate resins, UV curable epoxy acrylate resins, UV curable polyol acrylate resins, or UV curable epoxy resins.

The UV curable urethane acrylate resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The UV ray curable polyesteracrylate resins include those prepared easily by reacting a polyesterpolyol with 2-hydroxyethylacrylate or 2-hydroxypropylacrylate, disclosed for example, in Japanese Patent O.P.I. Publication No. 59-151112.

Examples of the UV ray curable epoxyacrylate resin include those prepared by reacting an epoxyacrylate oligomer in the presence of a reactive diluting agent and a photoinitiator, disclosed for example, in Japanese Patent O.P.I. Publication No. 1-105738.

Examples of the UV ray curable polyol acrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the UV ray curable resins include benzoine or its derivative, or acetophenones, benzophenones, hydroxy benzophenones, Michler's ketone, α-amyloxime esters, thioxanthones or their derivatives an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the UV ray curable resin layer is 0.1 to 15 parts by weight, and preferably 1 to 10 parts by weight, based on the 100 parts by weight of the UV ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No.340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetraacrylate, pentaerythritol triacrylate, pentaerythritol tetracrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. An air cooling or a water cooling light source is preferably used. The preferable irradiation quantity of light may be changed depending on the type of lamp, however, it is preferably from 5 to 150 mJ/cm$^2$, and more preferably from 20 to 100 mJ/cm$^2$.

The oxygen content at the irradiation area is preferably decreased to 0.01-2% by purging with nitrogen.

Irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used: (i) a method of providing tension while the film is being transported over back rolls, and (ii) a method using a tenter to give tension in the lateral direction or in biaxial directions. A cellulose ester film exhibiting a superior flatness can be obtained using these methods.

An organic solvent used for a coating solution of a UV curable-resin can be selected from, for example, the hydrocarbon series (toluene and xylene), the alcohol series (methanol, ethanol, isopropanol, butanol and cyclohexanol), the ketone series (acetone, methyl ethyl ketone and isobutyl ketone), the ester series (methyl acetate, ethyl acetate and methyl lactate), the glycol ether series and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

In a coating solution of a UV ray-curable resin, a silicon compound such as a polyether modified silicone oil, is preferably added. The number average molecular weight of the polyether modified silicone oil is preferably from 1,000 to 100,000 and more preferably from 2,000 to 50,000. Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of a coating solution onto a substrate or an under coat layer. These compounds used in the top layer of film may contribute to improvement of scratch resistance of the film as well as water-resistance, oil-resistance and anti-stain properties of the film. The content of the silicon compound is preferably from 0.01 to 3% by weight based on the solid components in the coating solution.

The aforementioned coating methods are also used as coating method of a UV ray-curable resin layer coating solution. The wet thickness of the coated UV-curable resin layer is preferably from 0.1 to 30 μm and more preferably from 0.5 to 15 μm. The dry thickness of the coated UV-curable resin layer is preferably from 0.1 to 20 μm and more preferably from 1 to 10 μm.

When a thickness of polarinzg plate protective film A is from 20 to 60 μm and a (d/H) ratio is from 4 to 10, it may exhibit a superior flatness as well as a sufficient hardness and scratch resistance, wherein H represents a thickness of a UV curable resin layer (hard coat layer) and d represents a thickness of a long roll film. This is because, a thinner hard coat layer compared to that of the long roll film (giving a larger (d/H) value) may result in giving insufficient hardness and scratch resistance, while a thicker hard coat layer compared to the same (giving a smaller (d/H) value) may result in forming a film lacking in flatness.

The UV ray-curable resin layer is preferably irradiated with UV rays during or after drying. The duration of UV ray irradiation is preferably from 0.1 seconds to 5 minutes in order to secure the exposure amount from 5 to 100 mJ/cm$^2$ as mentioned above. In view of working efficiency and hardening efficiency of the UV-curable resin layer, the duration is more preferably from 0.1 to 10 seconds.

Intensity of the actinic ray is preferably from 50 to 150 mW/cm$^2$ on the irradiated surface.

The UV-cured resin layer thus obtained may preferably contain inorganic or organic microparticles in order to attain the following characteristics: (i) preventing blocking, (ii) improving scratch resistance, (iii) providing an antiglare property and (iv) optimizing the reflective index.

The hard coat layer of the present invention preferably contains inorganic microparticles, examples of which include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic microparticles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic microparticles include, for example: microparticles of cross-linked polystylene (such as SX-130H, SX-200H and SX-350H manufactured by Soken Chemical & Engineering Co., Ltd.) and polymethyl methacrylate (such as MX150 and MX300 manufactured by Soken Chemical & Engineering Co., Ltd.).

The average particle diameter of the microparticles is preferably from 0.005 to 5 μm and specifically preferably from 0.01 to 1 μm. The microparticle content of the hard coat layer is preferably from 0.1 to 30 weight parts per 100 weight parts of the UV-curable resin composition.

It is preferred that the UV curable resin layer is a clear hard coat layer having a center-line average roughness (Ra prescribed by JIS B 0601) of 1 to 50 nm or an anti-glare layer Having an Ra value of from 0.1 to 1 μm. The center-line average roughness (Ra) is preferably measured by means of a surface roughness meter using interference of light, for example, RST/PLUS manufactured by WYKO Co., Ltd.

The hard coat layer of the present invention may preferably contain an antistatic agent. For example, preferable are an electrically conductive material containing as a main ingredient at least one of the element selected from the group of Sn, Ti, In, Al, Zn, Si, Mg, Ba, Mo, W and V, and having a volume resistivity of not more than $10^7$ ohm·cm.

Examples of the antistatic agent also include: oxides and complex oxides of the above described elements.

Examples of a metal oxide include: $ZnO$, $TiO_2$, $SnO_2$, $Al_2O_3$, $In_2O_3$, $SiO_2$, $MgO$, $BaO$, $MoO_2$, $V_2O_5$ and complex metal oxides thereof. Of these, specifically preferable are, for example, $ZnO$, $In_2O_3$, $TiO_2$, and $SnO_2$. As examples of introduction of foreign element, effective are, (i) introduction of, for example, Al or In in $ZnO$; (ii) introduction of, for example, Nb or Ta in $TiO_2$; and (iii) introduction of, for example, Sb, Nb or a halogen atom in $SnO_2$. The amount of the foreign element is preferably 0.01-25 mol % and specifically preferably 0.1-15 mol %. The volume resistivity of these conductive metal oxide powder is preferably $10^7$ ohm·cm or less and specifically preferably $10^5$ ohm·cm or less.

(Antireflection Layer)

Polarizing plate protective film A of the present invention is preferably further provided with an antireflection layer as a functional layer on the hard coat layer. The antireflection layer preferably has a low refractive index layer containing hollow particles.

The low refractive index layer of the present invention preferably contain hollow particles <Hollow Particles>

In the low refractive index layer, hollow particles described below are preferably incorporated.

The hollow particles can be classified into (1) the composite particles made of porous particle and the coated layer arranged on this porous particle surface; and (2) the hollow particles that have a hollow interior filled with solvent, gas or porous substances. The low-refractive index layer coating solution may contain (1) composite particles and/or (2) hollow particles.

The hollow particles have a hollow interior which is surrounded with particle walls. The cavity is filled with the solvent used at the time of preparation, gas or porous substances. The average particle diameter of such inorganic particles is preferably 5-300 nm, more preferably 10-200 nm. The inorganic particles to be used is properly selected according to the thickness of the transparent coating layer to be formed. The diameter is preferably ⅔-1/10 that of the transparent coating layer such as low-refractive index layer to be formed. For formation of the low-refractive index layer, these hollow particles are preferably used as they are dispersed in a proper medium. The preferred dispersion medium includes water, alcohol (e.g. methanol, ethanol, isopropyl alcohol) and ketone (e.g. methyl ethyl ketone and methyl isobutyl ketone) and ketone alcohol (e.g. diacetone alcohol).

The thickness of the coated layer of the composite particle or hollow particle wall is preferably 1-20 nm and more preferably, 2-15 nm. In the case of the composite particle, if the thickness of the coated layer is less than 1 nm, the particles may not completely be covered, resulting in reducing the effect of the low-refractive index layer. If the thickness of the coated layer exceeds 20 nm, the porosity (porous volume) of the composite particle may be reduced, resulting in reducing the effect of the low-refractive index layer. In the case of hollow particles, if the thickness of the particle wall is less than 1 nm, the shape of the particle may not be maintained. If the thickness exceeds 20 nm, a sufficient effect of low-refractive index may not be obtained.

The coated layer of the composite particle or hollow particle wall is preferably made of silica as a main component. A component other than silica may be contained, of which specific examples include: $Al_2O_3$, $B_2O_3$, $TiO_2$, $ZrO_2$, $SnO_2$, $CeO_2$, $P_2O_3$, $Sb_2O_3$, $MoO_3$, $ZnO$ and $WO_3$. The porous particles constituting composite particle include: (i) those composed of silica; (ii) those composed of silica and inorganic compound other than silica; and (iii) those composed of $CaF_2$, $NaF$, $NaAlF_6$, or $MgF_2$. Of these, the porous particles made of composite oxide of silica and inorganic compound other than silica are preferably used. The inorganic compound other than silica can be exemplified by the compound made of one or two of: $Al_2O_3$, $B_2O_3$, $TiO_2$, $ZrO_2$, $SnO_2$, $CeO_2$, $P_2O_3$, $Sb_2O_3$, $MoO_3$, $ZnO$ and $WO_3$. In such porous particles, silica is expressed by $SiO_2$ and the inorganic compound other than silica is represented by the equivalent oxide (MOx). In this case, the mole ratio $MOx/SiO_2$ is preferably within the range of 0.0001-1.0, more preferably 0.001-0.3. Particles cannot be easily obtained if the mole ratio $MOx/SiO_2$ of the porous particle is less than 0.0001. Even if it can be obtained, the pore volume will be small, and the particle of small refractive index cannot be obtained. If the mole ratio $MOx/SiO_2$ of the porous particle exceeds 1.0, the content of silica is reduced, hence the pore volume will be increased. This may make it all the more difficult to get the particles giving a low refractive index.

The pore volume of such porous particles is preferably 0.1-1.5 ml/g, more preferably 0.2-1.5 ml/g. If the pore volume is less than 0.1 ml/g, the particles of sufficiently reduced refractive index cannot be ensured. If it exceeds 1.5 ml/g, the strength of the particles will be reduced, hence the strength of the produced film may be reduced.

The pore volume of such porous particle can be determined by the method of mercury penetration. The contents inside the hollow particle can be exemplified by the solvent, gas and porous substance used at the time of preparing the particles. The solvent may contain the unreacted substances of the particle precursor and the catalysts used at the time of preparing the hollow particle. The porous substances includes the compounds listed with reference to the aforementioned porous particle. These contents may be made of a single compound or a mixture of a plurality of compounds.

To produce such inorganic particles, the composite oxide colloid particle preparation methods disclosed in the paragraph numbers [0010] through [0033] of JP-A No. 7-133105 are preferably employed. To put it more specifically, when the composite particle is made of silica and inorganic compound other than silica, the hollow particles are manufactured according to the first through third Steps given below:

1st Step: Preparation of Porous Particle Precursor

In the first Step, aqueous alkaline solutions of silica material and inorganic compound material other than silica are prepared separately in advance or, the aqueous solution of a mixture of silica material and inorganic compound material other than silica is prepared. In response to the percentage of the composite of the intended composite oxide, this aqueous solution is added, with stirring, gradually into the alkaline solution having a pH greater than 10, whereby the porous particle precursor is prepared.

The silicate of alkali metal, ammonium or organic base is used as a silica material. Sodium silicate (water glass) or potassium silicate is utilized as the silicate of alkali metal. The organic base can be exemplified by quaternary ammonium salts such as tetraethyl ammonium salts, and amines such as monoethanol amine, diethanol amine and triethanol amine. The silicates of the ammonium or silicates of the organic salts also includes alkaline solution obtained by adding ammonia, quaternary ammonium hydroxide and amine compound to the silica solution.

As the inorganic compound material other than silica, alkali soluble conductive materials described above are used.

The pH value of the aqueous mixture solution undergoes changes with addition of these aqueous solution. However, it is not necessary to control this pH value within the predetermined range. In the final phase, the aqueous solution has the pH value determined by the type of the inorganic oxide and its bending ratio. There is no restriction to the speed of adding the aqueous solution in this case. Further, when the composite oxide particle is manufactured, the aqueous dispersion of the seed particle can be used as the starting material. There is no particular restriction on this seed particle. The particles made of inorganic oxide such as $SiO_2$, $Al_2O_3$, $TiO_2$ or $ZrO_2$ or the composite oxide thereof are utilized. Normally, the sol thereof can be used. Further, the porous particle precursor aqueous dispersion obtained according to the aforementioned production method can be used as seed particle aqueous dispersion. When the seed particle aqueous dispersion is used, the pH value of seed particle aqueous dispersion is adjusted to 10 or more. After that, the aqueous solution of the aforementioned compound is added to this seed particle aqueous dispersion, being stirred in aqueous alkaline solution. In this case, the pH value of the aqueous dispersion need not necessarily be controlled. Use of the seed particles are used in this manner, ensures easy control of the diameter of the porous particle to be prepared, and provides uniform particle sizes.

The aforementioned silica material and inorganic compound material exhibit a high degree of solubility on the alkali side. However, if they are mixed in the pH region where the solubility is high, the solubility of the oxo acid such as silica ion and aluminic acid ion will be reduced. Their composites will be deposited to grow into particles. Alternatively, they will be deposited on the seed particle to cause particle growth. This being the case, pH control is not always necessary at the time of deposition and growth of the particles, as in the conventional method.

The ratio of composition of silica and inorganic compound other than silica in the first Step is determined as follows: The inorganic compound with respect to silica is converted into the equivalent oxide ($MO_x$), and the mole ratio of the $MO_x/SiO_2$ is kept preferably within the range of 0.05-2.0, more preferably 0.2-2.0. The small the ratio of silica within this range, the greater the pore volume of the porous particle. However, even if the mole ratio is over 2.0, the pore volume of the porous particle hardly increases. If the mole ratio is less than 0.05, the pore volume reduces. When the hollow particle is prepared, the mole ratio of the $MOx/SiO_2$ is preferably 0.25-2.0.

2nd Step: Removal of the Inorganic Compound Other than Silica from the Porous Particle In the second Step, at least part of the inorganic compound other than silica (elements other than silicon and oxygen) is removed on a selective basis from the porous particle precursor having been obtained in the aforementioned first Step. To put it more specifically, the inorganic compound in the porous particle precursor is dissolved and removed by mineral acid and organic acid. Alternatively, it is brought in contact with a positive ion exchange resin and is removed by ion exchange.

The porous particle precursors obtained in the first Step are the particle of a network structure composed of a silicon and inorganic compound constituent element bonded together through oxygen. As described above, the porous particles characterized by one layer of porous structure and greater pore volume are provided by removing the inorganic compound (elements other than silicon and oxygen) from the porous particle precursor. Hollow particles can be prepared by increasing the amount of the inorganic compound (elements other than silicon and oxygen) removed from the porous particle precursor.

Before removing the inorganic compound (elements other than silicon and oxygen) from the porous particle precursor, silica solution or hydrolytic organic silicon compound, obtained by dealkalization of the alkali metal salt of silica, is preferably added to the porous particle precursor aqueous dispersion obtained in the first Step, whereby a silica protective film is formed. It is sufficient only if silica protective film has a thickness of 0.5-15 nm. Even if a silica protective film is formed, the protective film in this Step is porous and is less thick. Such being the case, the aforementioned inorganic compound other than silica can be removed from the porous particle precursor.

By forming such a silica protective film, the aforementioned inorganic compound other than silica can be removed from the porous particle precursor, with the shape of the particle kept unchanged. When forming the silica coated layer to be described later, porous particle pores are not blocked by the coated layer. This makes it possible to form the silica coated layer (to be described later) without the pore volume being reduced. When a small amount of inorganic compound is removed, the particles are not damaged. Accordingly, formation of a protective film is not imperative.

When hollow particles are prepared, this silica protective film is preferably formed. If the inorganic compound is removed in preparing hollow particles, a hollow particle precursor is obtained, wherein this hollow particle precursor is made of silica protective film, solvent inside this silica protective film and undissolved porous solid. If the coated layer to be described later is formed on this hollow particle precursor, the coated layer having been formed becomes a particle wall and hollow particles are formed.

The amount of the silica source added to form the aforementioned silica protective film is preferably as small as possible without damaging the particle shape. If the amount of silica source is excessive, the silica protective film will be too thick. This may make it difficult to remove the inorganic compound other than silica from the porous particle precursor. The alkoxy silane expressed by the formula $R_nSi(OR')_{4-n}$ [R,R': hydrocarbon group such as alkyl group, aryl group, vinyl group and acryl group; n=0, 1, 2 or 3] can be used as a hydrolytic organic silicon compound used to form the silica protective film. Specifically, tetraalkoxy silane such as tetramethoxysilane, tetraethoxysilane and tetraisoprophoxysilane is preferably utilized.

The following procedure is used for addition: The solution prepared by adding a small quantity of alkali or acid as the catalyst to the mixture solution of the alkoxy silane, demineralized water and alcohol is added to the aqueous dispersion of the aforementioned porous particle. The silica polymer generated by hydrolysis of the alkoxy silane is deposited on the surface of the inorganic oxide particle. In this case, the alkoxy silane, alcohol, catalyst can be added simultaneously in the aqueous dispersion. Ammonia, hydroxide of alkali metal and amines can be used as the alkali catalyst. Varieties of inorganic and organic acids can be used as acid catalyst.

When the dispersion medium of the porous particle precursor is water alone or contains a high proportion of water with respect to the organic solvent, silica solution can be used to form a silica protective film. When the silica solution is used, a predetermined amount of silica solution is added to the aqueous dispersion. At the same time, alkali is added so that silica solution is deposited on the porous particle surface. A silica protective film can be produced by a combined use of the silica solution and the aforementioned alkoxy silane.

3rd Step: Formation of Silica Coated Layer

In the third step, the hydrolytic organic silicon compound or silica solution is added to the porous particle aqueous dispersion (hollow particle precursor aqueous dispersion in the case of the hollow particle) prepared in the second Step. This procedure ensures that the particle surface is covered with the polymer such as the hydrolytic organic silicon compound or silica solution, whereby a silica coated layer is formed.

The alkoxy silane expressed by the aforementioned formula $R_nSi(OR')_{4-n}$ [R,R': hydrocarbon group such as alkyl group, aryl group, vinyl group and acryl group; n=0, 1, 2 or 3] can be used as the hydrolytic organic silicon compound used for forming the silica coated layer. Especially, the tetraalkoxy silane such as tetramethoxysilane, tetraethoxysilane and tetraisoprophoxysilane is preferably used.

The following procedure is taken for addition: The solution prepared by adding a small quantity of alkali or acid as the catalyst to the mixture solution of the alkoxy silane, demineralalized water and alcohol is added to the aqueous dispersion of the aforementioned porous particle (hollow particle precursor in this case of the hollow particle). The silica polymer generated by hydrolysis of the alkoxy silane is deposited on the surface of the porous particle (hollow particle precursor in this case of the hollow particle). In this case, the alkoxy silane, alcohol, catalyst can be added simultaneously in the aqueous dispersion. Ammonia, hydroxide of alkali metal and amines can be used as the alkali catalyst. Varieties of inorganic and organic acids can be used as acid catalyst.

When the dispersion medium of the porous particle (hollow particle precursor in this case of the hollow particle) is water alone or the solution of mixture with the organic solvent wherein the proportion of water is high with respect to the organic solvent, then silica solution can be used to form a silica protective film. The silica solution refers to the aqueous solution of the low polymer of silica obtained by dealkalization of aqueous solution of alkali metal silicate such as water glass through ion exchange treatment.

The silica solution is added to the porous particle (hollow particle precursor in this case of the hollow particle) aqueous dispersion. At the same time, alkali is added so that the silica low-polymer is deposited on the surfaced of the porous particle (hollow particle precursor in this case of the hollow particle). The silica solution can be used in combination with the aforementioned alkoxy silane so that a coated layer is formed. The amount of organic silicon compound or silica solution added to form the coated layer should be such that the surface of the colloid particle is sufficiently covered. The organic silicon compound or silica solution is added in the dispersion of the porous particle (hollow particle precursor in this case of the hollow particle), in such an amount that the silica coated layer obtained in the final phase has a thickness of 1-20 nm. When the aforementioned silica protective film has been formed, the organic silicon compound or silica solution is added in such an amount that the total of the thicknesses of the silica protective film and silica coated layer is within the range of 1-20 nm.

Then the aqueous dispersion of the particles of which the coated layer is formed is subjected to heating. In the case of porous particles, the silica coated layer covering the porous particle surface is made compact by heating, thereby producing the dispersion of composite particles wherein porous particles are covered with the silica coated layer. In the case of hollow particle precursor, the coated layer having been formed is made compact and becomes a hollow particle wall, thereby producing the dispersion of hollow particles having a cavity filled with solvent, gas or porous solid.

There is no particular restriction to the heating temperature in this case, if the microscopic pore of the silica coated layer can be blocked. The heating temperature is preferably within the range of 80-300° C. If the heating temperature is less than 80° C., the microscopic pore of the silica coated layer may be completely blocked and may not be made compact. Alternatively, a longer time will be required in some cases. If the heating temperature is over 300° C., compact particles may be produced and the advantages of low-refractive index cannot be ensured in some cases.

The refractive index of the inorganic particles obtained in this manner is as low as less than 1.44. In such inorganic particles, the porosity inside the porous particle or the interior is void. This is estimated to cause low refractive index.

It is preferable that other than minute hollow particles, the low refractive index layer incorporates hydrolyzed products of alkoxysilicon compounds and condensation products which are formed via the following condensation reaction. It is particularly preferable to incorporate a $SiO_2$ sol prepared employing the alkoxysilicon compounds represented by following Formula (3) and/or (4) or hydrolyzed products thereof.

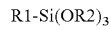  Formula (3)

  Formula (4)

wherein R1 represents a methyl group, an ethyl group, a vinyl group, or an organic group incorporating an acryloyl group, a methacryloyl group, an amino group, or an epoxy group, and $R_2$ represents an methyl group or an ethyl group.

Hydrolysis of silicon alkoxide and silane coupling agents is performed by dissolving the above in suitable solvents. Examples of used solvents include ketones such as methyl ethyl ketone, alcohols such as methanol, ethanol, isopropyl alcohol, or butanol, esters such as ethyl acetate, or mixtures thereof.

Water in a slightly larger amount for hydrolysis is added to a solution prepared by dissolving the above silicon alkoxide or silane coupling agents in solvents, and the resulting mixture is stirred at 15-35° C. but preferably 20-30° C. for 1-48 hours but preferably 3-36 hours.

It is preferable to employ catalysts during the above hydrolysis. Preferably employed as such catalysts are acids such as hydrochloric acid, nitric acid, or sulfuric acid. These acids are employed in the form of an aqueous solution at a concentration of 0.001-20.0 N, but preferably 0.005-5.0 N. It is possible to employ water in the above aqueous catalyst solution as water for hydrolysis.

Alkoxysilicon compounds undergo hydrolysis over the specified period of time, and the hydrolyzed alkoxysilicon solution is diluted with solvents, followed by the addition of other necessary additives, whereby a low refractive index layer liquid coating composition is prepared. It is possible to form a low refractive index layer on a substrate by applying the above liquid coating composition onto a substrate such as a film followed by drying.

<Alkoxysilicon Compounds>

In the present invention, preferred as alkoxysilicon compounds (hereinafter also referred to as alkoxysilanes) employed to prepare the low refractive index layer liquid coating composition are those represented by following Formula (5).

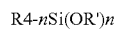  Formula (5)

wherein R' represents an alkyl group; R represents a hydrogen atom or a univalent substituent; and n represents 3 or 4.

The alkyl groups represented by R' include groups such as a methyl group, an ethyl group, a propyl group, or a butyl group, which may have a substituent. The substituents are not particularly limited as long as characteristics as an alkoxysilane are maintained. Examples of such substituents include a halogen atom such as fluorine and an alkoxy group, but unsubstituted alkyl groups are more preferred. Particularly preferred are a methyl group and an ethyl group.

The univalent substituents represented by R are not particularly limited, and examples include an alkyl group, a cycloalkyl group, an alkenyl group, an aryl group, an aromatic heterocyclyl group, and a silyl group. Of these, preferred are an alkyl group, a cycloalkyl group, and an alkenyl group. These may be further substituted. Cited as substituents of R are a halogen atom such as a fluorine atom or a chlorine atom, an amino group, an epoxy group, a mercapto group, a hydroxyl group, and an acetoxy group.

Specific preferable examples of the alkoxysilane represented by the above formula include tetramethoxysilane, tetraethoxysilane (TEOS), tetra-n-propoxysilane, tetraisopropoxysilane, tetra-n-butoxysilane, tetra-t-butoxysilane, tetrakis(methoxyethoxy)silane, tetrakis(methoxypropoxy) silane, methyltrimethoxysilane, methyltriethoxysilane, ethyltrimethoxysilane, ethyltriethoxysilane, n-propyltrimethoxysilane, n-propyltriethoxysilane, n-butyltrimethoxysilane, i-butyltrimethoxysilane, n-hexyltrimethoxysilane, 3-glycydoxyproyltrimethoxysilane, 3-aminopropyltriethoxysilane, 2-(3,4-epoxycyclohexyl)ethyltrimethoxysilane, 3-chloropropyltrimethoxysilane, 3-mercaptopropyltrimethoxysilane, acetoxytriethoxysilane, (heptadecafluoro-1,1,2,2-tetrahydrodecyl)trimethoxysilane, (3,3,3-trifluoropropyl)trimethoxysilane, (3,3,3-trifluoropropyl)trimethoxysilane, pentafluorophenylpropyltrimethoxysilane, further vinyltrimethoxysilane, vinyltriethoxysilane, phenyltrimethoxysilane, vinyltrimethoxysilane, and vinyltriethoxysilane.

Further, included may be silicon compounds in the form of oligomers such as SILICATE 40, SILICATE 45, SILICATE 48, and M SILICATE 51, produced by Tamagawa Chemical Co., which are partial condensation products of the above compounds.

Since the above alkoxysilanes incorporate silicon alkoxide group capable of undergoing hydrolysis polycondensation, the network structure of polymer compounds is formed in such a manner that these alkoxysilanes undergo hydrolysis, condensation and crosslinking. The resulting composition is employed as a low refractive index layer liquid coating composition which is applied onto a substrate and dried, whereby a layer uniformly incorporating silicon oxide is formed on the substrate.

It is possible to perform a hydrolysis reaction employing the method known in the art. Hydrophilic alkoxysilanes are dissolved in a mixture of water of the specified amount and hydrophilic organic solvents such as methanol, ethanol, or acetonitrile so that alkoxysilanes are compatible with solvents. After the addition of hydrolysis catalysts, alkoxysilanes undergo hydrolysis and condensation. By performing the hydrolysis and condensation reaction commonly at 10-100° C., silicate oligomers in a liquid state, having at least two hydroxyl groups, are formed, whereby a hydrolyzed liquid composition is prepared. It is possible to appropriately control the degree of hydrolysis varying the amount of employed water.

In the present invention, preferred as solvents added to alkoxysilanes together with water are methanol and ethanol since they are less expensive and form a layer exhibiting excellent characteristics and desired hardness. It is possible to employ isopropanol, n-butanol, isobutanol, and octanol, while the hardness of the resulting layer tends to decrease. The amount of solvents is commonly 50-400 parts by weight with respect to 100 parts by weight of tetraalkoxysilanes prior to hydrolysis, but is preferably 100-250 parts by weight.

The hydrolyzed liquid composition is prepared as described above. The above composition is diluted with solvents, and if desired, added with additives. Subsequently, components required to form a low refractive index layer liquid coating composition are mixed, whereby a low refractive index layer liquid coating composition is prepared.

Cited as hydrolysis catalysts may be acids, alkalis, organic metals, and metal alkoxides. In the present invention, preferred are inorganic acids such as sulfuric acid, hydrochloric acid, nitric acid, hypochlorous acid, or boric acid, or organic acids. Of these, particularly preferred are nitric acid, carboxylic acids such as acetic acid, polyacrylic acid, benzenesulfonic acid, paratoluenesulfonic acid, and methylsulfonic acid. Of these, most preferably employed are nitric acid, acetic acid, citric acid, and tartaric acid. Other than above citric acid and tartaric acid, also preferably employed are levulinic acid, formic acid, propionic acid, malic acid, succinic acid, methylsuccinic acid, fumaric acid, oxalacetic acid, pyruvic acid, 2-oxoglutaric acid, glycolic acid, D-glyceric acid, D-gluconic acid, malonic acid, maleic acid, oxalic acid, isocitric acid, and lactic acid.

Of the above catalysts, preferred are those which do not remain in the layer via evaporation during drying and also exhibit a low boiling point. Accordingly, acetic acid and nitric acid are most preferred.

The added amount is commonly 0.001-10 parts by weight with respect to 100 parts by weight of the employed alkoxysilicon compounds (for example, tetraalkoxysilane), but is preferably 0.005-5 parts by weight. Further, the added amount of water is to be at least the amount capable of performing theoretically 100% hydrolysis of the compound to be hydrolyzed. It is recommended to add water in an equivalent amount of 100-300%, but preferably of 100-200%.

During the hydrolysis of the above alkoxysilanes, it is preferable to blend the following minute inorganic particles.

After initiation of hydrolysis, a hydrolyzed liquid composition is allowed to stand over the specified period of time. After the hydrolysis reaches the specified degree, the above catalysts are employed. The standing period refers to the sufficient period during which the above hydrolyses and crosslinking due to condensation are progressed to result in desired layer characteristics. The specific period varies depending on the type of acid catalysts, but when acetic acid is employed, the period is at least 15 hours at room temperature, while when nitric acid is employed, the period is preferably at least two hours. Ripening temperature affects ripening temperature. Generally, at a higher temperature, ripening is more promoted. However, since gelling occurs at more than or equal to 100° C., it is appropriate to raise and maintain the temperature between 20-60° C.

The silicate oligomer solution prepared by performing hydrolysis and condensation as described above is added with the above minute hollow particles and additives, and the resulting mixture is diluted as required, whereby a low refractive index layer liquid coating composition is prepared. Subsequently, the resulting coating composition is applied onto the above film, whereby it is possible to form a layer as a low refractive index layer composed of an excellent silicon oxide layer.

Further, in the present invention, other than the above alkoxysilanes, employed may be the compounds which are prepared by modifying silane compounds (being monomers, oligomers, or polymers) having a functional group such as an epoxy group, an amino group, an isocyanate group, or a carboxyl group, and may be employed individually or in combination.

(Fluorine Compounds)

It is preferable that the low refractive index layer employed in the present invention incorporates minute hollow particles and fluorine compounds, and also incorporates fluorine containing resins (hereinafter also referred to as "pre-crosslinking fluorine containing resins"), which undergo crosslinking via heat or ionizing radiation. By incorporating the above fluorine containing resins, it is possible to provide a desired stain resistant antireflection film.

Preferably listed as such fluorine containing resins prior crosslinking may be fluorine containing copolymers which are formed employing fluorine containing vinyl monomers and monomers to provide a crosslinking group. Specific examples of the above fluorine containing vinyl monomer units include fluoroolefins (for example, fluoroethylene, vinylidene fluoride, tetrafluoroethylene, hexafluoroethylene, hexafluoropropylene, or perfluoro-2,2-dimethyl-1,3-dioxonol), and alkylester derivatives in which (meth)acrylic acid is partially or completely fluorinated (for example, VISCOAT 6FM (produced by Osaka Yuki Kagaku Co.), or M-2020 (produced by Daikin Co.), completely or partially fluorinated vinyl ethers. Cited as monomers to provide a crosslinking group are vinyl monomers which previously incorporate a crosslinking functional group in the molecule such as glycidyl methacrylate, vinyltrimethoxysilane, γ-methacryloyloxypropyltrimethoxysilane, vinyl glycidyl ether, and in addition, vinyl monomers having a carboxyl group, a hydroxyl group, an amino group, or a sulfone group (for example, (meth)acrylic acid, methylol (meth)acrylate, hydroxyalkyl (meth)acrylate, allyl acrylate, hydroxyalkyl vinyl ether, or hydroxyalkyl allyl ether). JP-A Nos. 10-25388 and 10-147739 describe that it is possible to introduce, after copolymerization, a crosslinking structure to the latter via the addition of compounds having a group capable of reacting with a functional group in the polymers and at least one reactive group. Examples of such crosslinking groups include an acryloyl, methacryloyl, isocyanate, epoxy, aziridine, oxazolidine, aldehyde, carbonyl, hydrazine, carboxyl, methylol, or active methylene group. Cases, in which fluorine containing polymers react with a crosslinking group upon being heated, or undergo crosslinking upon being heated via combinations such as an ethylenic unsaturated group and a thermally radical generating agent, or an epoxy group and a thermally acid generating agents, are designated as a thermal curing type. On the other hand, cases in which crosslinking is performed via combination of an ethylenic unsaturated group and a photolytically radical generating agent or an epoxy group and a photolytically acid generating agent upon being exposed to radiation (preferably ultraviolet radiation or electron beams), is designated as an ionizing radiation curing type.

In addition to the above monomers, employed as pre-crosslinking fluorine containing resins may be fluorine containing copolymers which are prepared simultaneously employing monomers other than the fluorine containing vinyl monomers and monomers to provide a crosslinking group. Simultaneously usable monomers are not particularly limited and may include olefins (such as ethylene, propylene, isoprene, vinyl chloride, or vinylidene chloride); acrylic acid esters (such as methyl acrylate, ethyl acrylate, or 2-etylhexyl acrylate); methacrylic acid esters (such as methyl methacrylate, ethyl methacrylate, butyl methacrylate, or ethylene glycol dimethacrylate); styrene derivatives (such as styrene, divinylbenzene, vinyltoluene, or α-methylstyrene); vinyl ethers (such as methyl vinyl ether); vinyl esters (such as vinyl acetate, vinyl propionate, or vinyl cinnamate); acrylamides (such as N-tert-butyl acrylamide or N-cyclohexyl acrylamide); methacrylamides; and acrylonitrile derivatives. Further, in order to provide lubrication and stain resistance, it is preferable to introduce a polyorganosiloxane skeleton and a perfluoropolyether skeleton into the fluorine containing copolymers. Such skeletons are formed via polymerization of polyorganosiloxane having a terminal group such as an acryl group, a methacryl group, a vinyl ether group, or a styryl group with the above monomers, polymerization of the above monomers with polyorgsanosiloxane having a radical generating group at the terminal or perfluoropolyether, or reaction of polyorganosiloxane having a functional group at the terminal or perfluoropolyether.

The used ratio of each of the above monomers employed to from the fluorine containing copolymers prior to crosslinking is preferably 20-70 mol % with respect to the fluorine containing vinyl monomers, but is more preferably 40-70 mol % and the used ratio of monomers to provide a crosslinking group is preferably 1-20 mil %, but is more preferably 5-20 mol %, while the ratio of simultaneously employed other monomers is preferably 10-70 mol %, but is more preferably 10-50 mol %.

It is possible to prepare fluorine containing copolymers via polymerization in the presence of radical polymerization initiators, employing methods such as solution polymerization, bulk polymerization, emulsion polymerization, or suspension polymerization.

Pre-crosslinking fluorine containing resins are commercially available. Examples of commercially available pre-crosslinking fluorine containing resins include SAITOP (produced by Asahi Glass Co.), TEFLON (registered trade name) AF (produced by DuPont), polyvinylidene fluoride, RUMIFRON (produced by Asahi Glass Co.), and OPSTAR (produced by JSR).

The Dynamic friction coefficient and the contact angle to water of the low refractive index layer composed of crosslinked fluorine containing resins are preferably in the range of 0.03-0.15 and 90-120 degrees, respectively.

<Additives>

If desired, it is possible to incorporate additives such as silane coupling agents or hardening agents in the low refractive index liquid coating composition. The silane coupling agents are the compounds represented by above Formula (2).

Specific examples include vinyltriethoxysilane, γ-methacryloxypropyltrimethoxysilane, γ-glycidoxypropyltrimethoxysilane, and 3-(2-aminoethylaminopropyl)trimethoxysilane.

Cited as hardening agents are organic acid metal salts such as sodium acetate or lithium acetate, of which sodium acetate is particularly preferred. The added amount to the silicon-alkoxysilane hydrolyzed solution is preferably in the range of about 0.1-about 1 part by weight with respect to 100 parts by weight of solids in the hydrolyzed solution.

Further, it is preferable to add, to the low refractive index layer employed in the present invention, various leveling agents, surface active agents, and low surface tension substances such as silicone oil.

Specific commercially available silicone oils include L-45, L-9300, FZ-3704, FZ-3703, FZ-3720, FZ-3786, FZ-3501, FZ-3504, FZ-3508, FZ-3805, FZ-3707, FZ-3710, FZ-3750, FZ-3760, FZ-3785, FZ-3785, and Y-7400 of Nippon Unicar Co., Ltd., as well as KF96L, KF96, KF96H, KF99, KF54, KF965, KF968, KF56, KF995, KF351, KF352, KF353, KF354, KF355, KF615, KF618, KF945, KF6004, and FL100 of Shin-Etsu Chemical Co., Ltd.

These components enhance coatability onto a substrate or a lower layer. When incorporated in the uppermost layer of the multicoated layers, water- and oil-repellency, and anti-staining are enhanced and in addition, abrasion resistance of the surface is also enhanced. Since the excessive addition of these components results in repellency during coating, the added amount is preferably in the range of 0.01-3% by weight with respect to the solids in the liquid coating composition.

<Solvents>

Solvents employed in the liquid coating composition during coating the low refractive index layer include alcohols such as methanol, ethanol, 1-propanol, 2-propanol, or butanol; ketones such as acetone, methyl ethyl ketone, or cyclohexanone; aromatic hydrocarbons such as benzene, toluene, or xylene; glycols such as ethylene glycol, propylene glycol, or hexylene glycol; glycol ethers such as ethyl cellosolve, butyl cellosolve, ethyl CARBITOL, butyl CARBITOL, diethyl cellosolve, diethyl CARBITOL, or propylene glycol monomethyl ether; N-methylpyrrolidone, dimethylformamide, methyl lactate, ethyl lactate, methyl acetate, and water. These may be employed individually or in combinations of at least two types.

<Coating Methods>

The low refractive index layer is coated employing the methods known in the art, such as dipping, spin coating, knife coating, bar coating, air doctor coating, curtain coating, spray costing, or die coating, as well as ink-jet methods known in the art. Coating methods which enable continuous coating and thin layer coating are preferably employed. The coated amount is commonly 0.1-30 μm in term of wet thickness, but is preferably 0.5-15 μm. The coating rate is preferably 10-80 m/minute.

When the composition of the present invention is applied onto a substrate, it is possible to control layer thickness and coating uniformity by regulating the solid concentration in the liquid coating composition and the coated amount.

In the present invention, it is also preferable to form an antireflection layer composed of a plurality of layers in such a manner that the medium refractive index layer and high refractive index layer, described below, are provided.

The configuration example of the antireflection layer usable in the present invention is described below, however the antireflection layer is not limited thereto.

Cellulose ester film/hard coat layer/low refractive index layer

Cellulose ester film/hard coat layer/medium refractive index layer/low refractive index layer Cellulose ester film/hard coat layer/high refractive index layer/low refractive index layer Cellulose ester film/hard coat layer/medium refractive index layer/high refractive index layer/low refractive index layer Cellulose ester film/antistatic layer/hard coat layer/medium refractive index layer/high refractive index layer/low refractive index layer Cellulose ester film/hard coat layer/antistatic layer/medium refractive index layer/high refractive index layer/low refractive index layer Antistatic layer/cellulose ester film/hard coat layer/medium refractive index layer/high refractive index layer/low refractive index layer Cellulose ester film/hard coat layer/high refractive index layer/low refractive index layer/high refractive index layer/low refractive index layer (Medium Refractive Index Layer and High Refractive Index Layer)

The constituting components of the medium and high refractive index layers are not particularly limited as long as the specified refractive index layer is prepared. However, it is preferable that the above layer is composed of the following minute metal oxide particles at a high refractive index, and binders. Other additives may be incorporated. The refractive index of the medium refractive index layer is preferably 1.55-1.75, while that of the high refractive index layer is preferably 1.75-2.20. The thickness of the high and medium refractive index layers is preferably 5 nm-1 μm, is more preferably 10 nm-0.2 μm, but is most preferably 30 nm-0.1 μm. It is possible to coat those layers employing the same coating method as that of the above low refractive index layer.

<Minute Metal Oxide Particles>

Minute metal oxide particles are not particularly limited. For example, employed as a main component may be titanium dioxide, aluminum oxide (alumina), zirconium oxide (zirconia), zinc oxide, antimony-doped tin oxide (ATO), antimony pentaoxide, indium-tin oxide (ITO), and iron oxide, which may be blended. In the case of use of titanium dioxide, in term of retardation of activity of photocatalysts, it is preferably to employ core/shell structured minute metal oxide particles which are prepared in such a manner that titanium oxide is employed as a core and the core is covered with a shell composed of alumina, silica, zirconia, ATO, ITO, or antimony pentaoxide.

The refractive index of minute metal oxide particles is preferably 1.80-2.60, but is more preferably 1.90-2.50. The average diameter of the primary particles of the minute metal oxide particles is preferably 5 nm-200 nm, but is more preferably 10-150 nm. When the particle diameter is excessively small, minute metal oxide particles tend to aggregate to degrade dispersibility, while when it is excessively large, haze is undesirably increased. Minute inorganic particles are preferably in the form of rice grain, needle, sphere, cube, or spindle, or amorphous.

Minute metal oxide particles may be surface-treated with organic compounds. Examples of such organic compounds include polyol, alkanolamine, stearic acid, silane coupling agents, and titanate coupling agents. Of these, most preferred are silane coupling agents, described below. At least two types of surface treatments may be combined.

It is possible to prepare high and medium refractive index layers exhibiting desired refractive indices via appropriate selection of the type of metal oxides and the addition ratio thereof.

<Binders>

Binders are incorporated to improve film forming properties and physical properties of a coating. Employed as such binders may, for example, be the aforesaid ionizing radiation curing type resins, acrylamide derivatives, multifunctional acrylates, acrylic resins, and methacrylic resins.

(Metal Compounds and Silane Coupling Agents)

Incorporated as other additives may be metal compounds and silane coupling agents, which may be employed as a binder.

Employed as the metal compounds may be the compounds represented by Formula (6) or chelate compounds thereof.

$$A_n M B_{x-n} \qquad \text{Formula (6)}$$

wherein M represents a metal atom; A represents a hydrolysable functional group or a hydrocarbon group having a hydrolysable functional group; B represents a group of atoms, which covalently or ionically bonds metal M; x represent valence of metal atom M; and n represents an integer of 2-x.

Examples of hydrolysable functional group A include an alkoxyl group, a halogen atom such as a chorine atom, an ester group, and an amido group. Preferred as the compounds represented by above Formula (6) are alkoxides having at least two alkoxyl groups bonding a metal atom, or chelate compounds thereof. In view of refractive index, reinforcing effects of coating strength, and ease of handling, cited as preferred metal compounds are titanium alkoxides, zirconium alkoxides, and silicon alkoxides, or chelate compounds thereof. Titanium alkoxides exhibits a high reaction rate, a high refractive index, and ease of handling. However, its excessive addition degrades lightfastness due to its photocatalytic action. Zirconium akloxides exhibit a high refractive index, but tends to result in cloudiness, whereby careful dew point management is required during coating. On the other hand, silicon alkoxides exhibit a low reaction rate and a low refractive index, but ease of excellent handling and excellent lightfastness. Silane coupling agents can react with both minute inorganic particles and organic polymers, whereby it is possible to prepare a strong coating. Further, titanium aloxides enhance reaction with ultraviolet radiation curing resins and metal alkoxides, whereby it is possible to enhance physical characteristics of a coating even by a small amount of their addition.

Examples of titanium alkoxides include tetramethoxytitaium, tetraethoxytitanium, tetra-iso-propoxytitanium, tetra-n-propoxytitanium, tetr-n-butoxytitanium, tetra-sec-butoxytitanium, and tetra-tert-butoxytitanium.

Examples of zirconium alkoxides include tetramethoxyzirconium, tetraethoxyzirconium, tetra-iso-propoxyzirconium, tetra-n-proxyzirconium, tetra-n-butoxyzirconium, tetra-sec-butoxyzirconium, and tetra-tert-butoxyzirconium.

Silicon alkoxides and silane coupling agents are the compounds represented by following Formula (7).

$$RmSi(OR')n \qquad \text{Formula (7)}$$

wherein R represents a reactive group such as an alkyl group (preferably an alkyl group having 1-10 carbon atoms), a vinyl group, a (meth)acryloyl group, an epoxy group, an amido group, a sulfonyl group, a hydroxyl group, a carboxyl group, or an alkoxyl group, R' represents an alkyl group (preferably an alkyl group having 1-10 carbon atoms), and m+n is 4.

Specifically cited are tetramethoxysilane, tetraethoxysilane, tetra-iso-propoxysilane, tetra-n-propoxysilane, tetra-n-butoxysilane, tetra-sec-butoxysilane, tetra-tert-butoxysilane, terapentaethoxysilane, methyltrimethoxysilane, methyltriethoxysilane, methyltriproxysilane, methyltributoxysilane, dimethyldimethoxysilane, dimethyldiethoxysilane, hexyltrimethoxysilane, vinyltriethoxysilane, γ-methacryloxypropyltrimethoxysilane, γ-glycidoxypropyltrimethoxysilane, and 3-(2-aminoethylaminopropyl)trimethoxysilane.

Cited as preferred chelating agents which are allowed to coordinate with a free metal compound to form a chelate compound may be alkanolamines such as diethanolamine or triethanolamine; glycols such acetylene glycol, diethylene glycol, or propylene glycol; and acetylacetone, ethyl acetacetate, having a molecular weight of at most 100,000. By employing such chelating agents, it is possible to prepare chelate compounds which are stable for water mixing and exhibit excellent coating strengthening effects.

In the medium refractive index composition, the added amount of the metal compounds is preferably less than 5% by weight in terms of metal oxides, while in the high refractive index composition, the same is preferably less than 20% by weight in terms of metal oxides.

(Polarizing Plate Protective Film B)

Polarizing Plate Protective Film B is featured to be a polarizing protective film which also functions as a retardation plate.

Since a liquid crystal display employs anisotropic liquid crystal materials, problems of viewing angle occur in which the front view results in excellent display, while oblique view results in degradation of display performance. Consequently, in order to improve the performance, a viewing angle compensation plate is required. As such a compensation plate, a plate having the biaxial structure, described below, is effective. Polarizing Plate Protective Film B of the present invention is a retardation film which exhibit such functions.

In the polarizing plate of the present invention, in order to provide a film with retardation to enhance display characteristics, it is preferable that a cellulose ester film is at least laterally stretched to control its retardation.

In the present invention, it is preferable that the above cellulose ester film is oriented so that a retardation film, which exhibits in-plane retardation Ro as defined below of 20-100 nm at 23° C. and 55% RH, and thickness direction retardation Rt as defined below of 100-300 nm at 23° C. and 55% RH, is prepared.

$$Ro=(nx-ny) \times d$$

$$Rt=\{(nx+ny)/2-nz\} \times d$$

wherein nx, ny, and nz represent refractive indexes in x, y, and z directions, respectively, which are the principal axes of a refractive index ellipsoid, nx and ny each represents a refractive index in the in-plane direction of the film, and nz represents a refractive index in the thickness direction, while nx>ny, and d represents the film thickness (in nm).

It is possible to measure retardation values Ro and Rt, employing an automatic double refractometer. For example, measurements may be performed at a wavelength of 590 nm at 23° C. and 55% RH, employing KOBRA-21ADH (produced by Oji Keisokukiki Co., Ltd.).

An example of the stretching process (also referred to as the tenter process) of the present invention will now be explained using FIG. 2.

Figure 2:
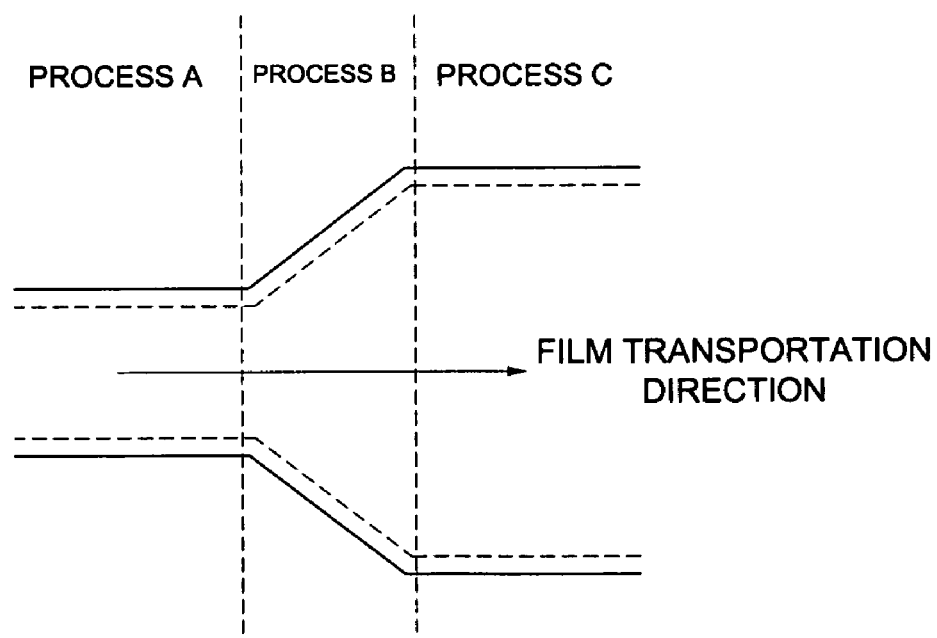
FIG. 2 is a schematic view showing one example of the tenter process employed in the present invention.

Process A of FIG. 2 is the process where a film conveyed from transporting process D0 (not illustrated) is held by clipping both edges. In Process B, the film is stretched in the lateral direction (perpendicular to the film transportation direction) with the stretching angle illustrated in FIG. 1. In Process C, stretching is completed and the film is transported to the next production process while being clipped.

A slitter which trims the edge of the lateral direction of the film is preferably provided (i) between just after the web is peeled and before Process B; and/or (ii) just after Process C. Specifically preferably, a slitter is provided just before Process A. When a stretching was carried out under the same condition, a stretched film which is slit before Process B showed an improved orientation angle distribution of slow axes than a stretched film without slitting.

This may be because an undesirable stretching in the film transportation direction is suppressed between the peeling process and Process B where the film still contains much solvent.

In the tenter process, a different temperature domain may be purposely provided in the film to improve the orientation angle distribution. Also a neutral domain is preferably provided between two different temperature domains to prevent interference.

The stretching process may be divided into several steps. Biaxial stretching in both film transportation direction and the lateral direction is also preferable. Biaxial stretching may be carried out simultaneously or in series of steps. In stepped stretching, stretching may be carried out alternately in different directions or stepwise in one direction. Stretching alternately in different directions may also be added to the sequence of stepped stretching in one direction. Namely, the following stretching steps are also employable.

(i) Stretching in the film transportation direction—stretching in the lateral direction—stretching in the film transportation direction—stretching in the film transportation direction; and (ii) Stretching in the lateral direction—stretching in the lateral direction—stretching in the film transportation direction—stretching in the film transportation direction.

The simultaneous biaxial stretching includes stretching in one direction while relaxing the tension in the other direction whereby the film shrinks in that direction. Preferable stretching ratios in the simultaneous biaxial stretching are: 1.05-1.5 times in the lateral direction and 0.8-1.3 times in the film transportation direction; more preferably 1.1-1.5 times in the lateral direction and 0.8-0.99 times in the film transportation direction; and specifically preferably 1.1-1.4 times in the lateral direction and 0.9-0.99 times in the film transportation direction.

The term "stretching direction" used in the present invention usually represents the direction in which stretching tension is applied, however, when a web is biaxially stretched in a plurality of steps, the "stretching direction" may mean the direction in which the final stretching ratio of the web becomes larger (which is usually the slow axis direction). Specifically, when dimensional variation ratio of the film is discussed, the stretching direction mainly refers to the latter meaning.

It is well known that, when a web is stretched in the lateral direction of the web, the dispersion of orientations of slow axes (hereafter referred to as a orientation angle dispersion) becomes larger. In order to conduct stretching in the lateral direction of a web while the ratio of Rt to Ro is kept constant and the orientation angle dispersion is kept small, relationships among web temperatures of processes A, B and C exist, namely, the following relationships are preferably satisfied: $Ta \leq (Tb-10)$, or $Tc \leq Tb$, and more preferably the both relationships are simultaneously satisfied: $Ta \leq (Tb-10)$ and $Tc \leq Tb$, wherein Ta, Tb and Tc represents temperatures in Celsius at each end of Processes A, B and C, respectively.

In order to decrease the above mentioned orientation angle dispersion, the temperature increasing rate of the web in Process B is preferably 0.5-10° C./s.

In order to reduce the dimensional variation ratio after treated under a condition of 80° C. and 90% RH, the stretching duration in Process B is preferably shorter, however, a lower limitation of the stretching duration may be prescribed to maintain uniformity of the web. The temperature of Process B is preferably 40-180° C., and more preferably 100-160° C.

In the tenter process, the coefficient of heat transfer may be constant or may be changed. The heat transfer coefficient is preferably in the range of $41.9 \times 10^3 - 419 \times 10^3$ J/m² h, more preferably $41.9 \times 10^3 - 209.5 \times 10^3$ J/m² h, and further more preferably $41.9 \times 10^3 - 126 \times 10^3$ J/m² hr.

In order to decrease the above mentioned orientation angle dispersion, the stretching rate in the lateral direction in Process B may be constant or may be changed. The stretching rate is preferably in the range of 50-500%/minute, more preferably 100-400%/minute, and most preferably 200-300%/minute.

In the tenter process, the distribution of environmental temperature in the lateral direction of the film is preferably smaller to improve uniformity of a film. The distribution of environmental temperature in the lateral direction in the tenter process is preferably within ±5° C., more preferably within ±2° C., and most preferably within ±1° C. By decreasing the distribution of environmental temperature, the temperature distribution in the lateral direction of a web may also be decreased.

In Process C, the width of a film held by a tenter is preferably reduced. Specifically, the width is preferably reduced to 95 to 99.5% of the width in the former process.

After a film is treated in the tenter process, a subsequent-drying process (hereafter referred to as Process D1) is preferably provided. The film is preferably subjected to a heat treatment in the temperature range of 50 to 140° C., more preferably, 80 to 140° C., and most preferably 110 to 130° C.

In Process D1, the distribution of environmental temperature in the lateral direction of the film is preferably smaller to improve uniformity of the film. The distribution of environmental temperature in the lateral direction is preferably within ±5° C., more preferably within ±2° C., and most preferably within ±1° C.

Although the tension applied to the film while the film is being transported is affected by several factors, for example: the property of a dope, the amount of residual solvent at the peeling process and Process D0, and the temperature of Process D1, the film tension is preferably 80-200 N/m, more preferably 140-200 N/m, and most preferably 140-160 N/m.

In order to reduce further stretching in the film transportation direction of the film in Process D1, a tension cut roll (an additional roll which reduces the tension of the film while the film is conveyed) is preferably provided. After drying is completed, the edge of the film is preferably trimmed using a slitter before the film is winded in a roll, whereby a superior roll formation is obtained.

(Polarizing Plates)

The polarizing plate of the present invention and the liquid crystal display device of the present invention, employing the same will now be described.

<Polarizers>

A polarizer, which is a main component of a polarizing plate, is the element which only transmits light having a polarization plane in the definite direction. The representative polarizer, which is currently known, is a polyvinyl alcohol based polarizing film, which include two types, one which is prepared by dying a polyvinyl alcohol based film with iodine and the other which is prepared by dying the same with dichroic dyes.

In the present invention, it is particularly preferable to employ a 5-20μ thick polarizer incorporating ethylene-modified polyvinyl alcohol.

Further, it is preferable that the above polarizer is cast employing ethylene-modified polyvinyl alcohol at an ethylene unit content of 1-4 mol %, a degree of polymerization of 2,000-4,000 and a saponification ratio of 99.0-99.99 mol %, and is prepared employing an ethylene-modified polyvinyl alcohol film at a hot-water cutting temperature of 66-73° C. Further, in order to decrease color spots, it is more preferable that the difference of the hot water cutting temperature between two points 5 cm apart in the TD direction is at most 1° C. Still further, in order to decrease color spots, it is still more preferable that the difference of the hot water cutting temperature between two points 1 cm apart in the TD direction is at most 0.5° C. Further, in order to decrease color spots, it is particularly preferable that the film thickness prior to stretching is 10-50 μm.

Employed as the ethylene-modified polyvinyl alcohol (being the ethylene-modified PVA) may be those which are prepared in such a manner that ethylene-vinyl ester based polymers, prepared by copolymerizing ethylene and vinyl ester based monomers, are saponified in which vinyl ester units are employed as vinyl alcohol units. Examples of the above vinyl ester based monomers include vinyl formate, vinyl acetate, vinyl propionate, vinyl valerate, vinyl laurate, vinyl stearate, vinyl benzoate, vinyl pivaliate, and versatic acid vinyl esters. Of these, it is preferable to employ vinyl acetate.

The content (being the copolymerized amount of ethylene) ethylene units in the ethylene-modified PVA is commonly 1-4 mol %, is preferably 1.5-3 mol %, but is more preferably 2-3 mol %. When the content of the ethylene units is less than 1 mol %, the polarizing performance, the durability enhancing effects, and color spot decreasing effects of the resulting polarizing film are undesirably degraded. On the other hand, when it exceeds 4 mol %, affinity of the ethylene-modified PVA to water is reduced, whereby the uniformity the film surface is undesirably degraded to tend to cause the formation of color spots of the polarizing film.

Further, during copolymerization of ethylene with vinyl ester based monomers, if desired, it is possible to copolymerize copolymerizable monomers in the range (at a ratio of preferably at most 15 mol %, but more preferably at most 5 mol %) in which the effects of the present invention is adversely affected.

Examples of such copolymerizable monomers with vinyl ester based monomers include olefins having 3-30 carbon atoms such as propylene, 1-butene, or isobutene; acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; methacrylic acid and salts thereof; methacrylic acid esters such as methyl methacrylate, ethyl methacrylate, n-propyl methacrylate, i-propyl methacrylate, n-butyl acrylate, i-butyl acrylate, t-butyl acrylate, 2-ethylhexyl methacrylate, dodecyl methacrylate, or octadecyl methacrylate; acrylamide derivatives such as acrylamide, N-methylacrylamide, N-ethylacrylamide, N,N-dimethylacrylamide, diacetoneacrylamide, acrylamide propane sulfinic acid and salts thereof, acrylamidopropyldimethylanine and salts thereof, N-methylol acrylamide and derivatives thereof; methacrylamide derivatives such as methacrylamide, N-methylmethacrylamide, N-ethylmethacrylamide, methacrylamidopropane sulfonic acid and salts thereof, methacrylamidopropyldimethylamine and salts thereof, or N-methylol methacrylamide and derivatives thereof; N-vinylamides such as N-vinylformamide, N-vinylacetamide, or n-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; nitrites such as acrylonitrile or methacrylonitrile; halogenated vinyls such as vinyl chloride, vinylidene chloride, vinyl fluoride, or vinylidene fluoride; allyl compounds such as allyl acetate or allyl chloride; maleic acid, and salts and esters thereof; itaconic acid, and salts and esters thereof; vinylsilyl compounds such as vinylmethoxysilane; and N-vinylamides such as isopropenyl acetate, N-vinylformamide, N-vinylacetamide, or N-vinylpyrrolidone.

The degree of polymerization of ethylene-modified PVA composing the polarizer and of PVA of the polarizing film is commonly 2,000-4,000, is preferably 2,200-3,500, but is more preferably 2,500-3,000 in terms of polarizing performance and durability. When the degree of polymerization of ethylene-modified PVA is at most 2,000, the polarizing performance and durability of the polarizing film are undesirably degraded. On the other hand, the degree of polymerization of at most 4,000 is preferred since color spots of the polarizer are hardly formed.

The degree of polymerization of the ethylene-modified PVA refers to the weight average degree of polymerization. This weight average degree of polymerization is a value obtained by performing GPC measurement at 40° C. employing hexafluoroisopropanol (HFIP) added with 20 millimol/liter of sodium trifluoroactate in the moving phase employing monodispersed PMMA as a standard product.

In view of polarization performance and durability of a polarizing film, the ratio of saponification of the ethylene-modified PVA constituting the polarizer is preferably 99.0-99.99 mol %, is more preferably 99.9-99.99 mol %, but is most preferably 99.95-99.99 mol %.

Employed as methods to produce a ethylene-modified film may be employed, other than a film casting method based on a melt extrusion system employing water-containing ethylene-modified PVA, for example, an extrusion casting method employing an ethylene-modified PVA solution prepared by dissolving ethylene-modified PVA in solvents, a wet system casting method (ejected into poor solvents), a gel casting method (after an ethylene-modified PVA solution is temporality cooled and gelled, solvents are removed via extraction and an ethylene-modified PVA film is prepared), as well as methods of combinations of these. Of these, in view of preparation of excellent ethylene-modified PVA film, preferred are the extrusion casting method and the melt extrusion method. The resulting ethylene-modified PVA film is, if necessary, dried and thermally treated.

Cited as solvents to dissolve the ethylene-modified PVA employed during production of ethylene-modified PVA film may, for example, be dimethylsulfoxide, dimethylformamide, dimethylacetamide, N-methylpyrrolidone, ethylene glycol, glycerin, propylene glycol, triethylene glycol, tetraethylene glycol, trimethylolpropane, ethylenediamine, diethylenetriamine, and water. These may be employed individually or in combination of at least two types. Of these, suitably employed is dimethylsulfoxide and water, or a mixed solvent of glycerin and water.

The ratio of ethylene-modified PVA, incorporated in an ethylene-modified PVA solution or water-containing ethylene-modified PVA employed during production of the ethylene-modified film, varies depending on the degree of polymerization of the ethylene-modified PVA, but is commonly 20-70% by weight, is preferably 25-60% by weight, but is more preferably appropriately 30-55% by weight, but is most preferably 35-50 by weight. When the ratio of the ethylene-modified PVA exceeds 70% by weight, viscosity of the ethylene-modified PVA solution or the water-containing ethylene-modified PVA becomes excessively high, whereby it becomes difficult to prepare a film without foreign matter and defects due to difficult filtration and defoaming. On the other hand, when the ratio of the ethylene-modified PVA is at most 20% by weight, the viscosity of the ethylene-modified PVA solution or the water-containing ethylene-modified PVA becomes excessively low, whereby it becomes difficult to prepare a PVA film at the targeted thickness. Further, if desired, plasticizers, surface active agents, and dichroic dyes may be incorporated in the above ethylene-modified PVA solution or water-containing ethylene-modified PVA.

During production of the ethylene-modified PVA film, it is preferable to incorporate polyhydric alcohols as a plasticizer. Examples of polyhydric alcohols include ethylene glycol, glycerin, propylene glycol, diethylene glycol, diglycerin, triethylene glycol, tetraethylene glycol, and trimethylolpropane. These may be employed individually or in combinations of at least two types. Of these, in view of orientation enhancement effects, diglycerin, ethylene glycol, and glycerin are preferable.

The added amount of polyhydric alcohols is preferably 1-30 parts by weight with respect to 100 parts by weight of the ethylene-modified PVA, is more preferably 3-25 parts by weight, but is most preferably 5-20 parts by weight. When the added amount is at most 1 part by weight, dying properties and orientation properties are occasionally degraded, while when it exceeds 30 parts by weight, the ethylene-modified film becomes excessively flexible, whereby handling properties tend to be degraded.

During production of the ethylene-modified PVA film, it is preferable to incorporate surface active agents. The types of surface active agents are not particularly limited, but nonionic or cationic surface active agents are preferred. Examples of suitable anionic surface active agents include carboxylic acid types such as potassium laurate, sulfuric acid ester types such as octyl sulfate, and sulfonic acid types such as dodecylbenznene sulfonate. Examples of suitable nonionic surface active agents include alkyl ether types such as polyoxyethylene oleyl ether; alkyl phenyl ether types such as polyoxyethylene octyl phenyl ether; alkyl ester types such as polyoxyethylenelaurate; alkylamine types such as polyoxyethylene lauryl aminoether; alkylamide types such as polyoxyethylene lauric acid amide; polypropylene glycol ether types such as polyoxyethylene polyoxypropylene ether; alkanol amide types such as oleic acid diethanolamide; and allyl phenyl ether types such as polyoxyalkylene phenyl ether. These surface active agents may be employed individually or in combinations of at least two types.

The added amount of surface active agents is preferably 0.01-1 part by weight with respect to 100 parts by weight of the ethylene-modified PVA, is more preferably 0.02-0.5 part by weight, but is most preferably 0.05-0.3 part by weight. When the added amount is at most 0.01 part by weight, effects to improve film casting properties and peeling properties are hardly exhibited, while when it exceeds 1 part by weight, surface active agents are dissolved out onto the surface of the ethylene-modified PVA film to result in blocking, whereby handling properties tend to be degraded.

The hot-water cutting temperature of the ethylene-modified PVA film is preferably 66-73° C., is more preferably 68-73° C., but is most preferably 70-73° C. When the hot-water cutting temperature of the ethylene-modified PVA film is at most 66° C., a state occurs in which a film, which starts dissolution, is stretched whereby the polarization performance becomes insufficient due to reduced tendency of molecular orientation. On the other hand, when the hot-water cutting temperature is at least 73° C., the film tends not to be stretched, whereby the polarization performance of the polarizing film is undesirably degraded. When the ethylene-modified PVA film is dried and thermally treated, it is possible to control the hot-water cutting temperature of the film by varying the temperature and time of the above treatments.

The thickness of the ethylene-modified PVA film employed to prepare a polarizer is preferably 10-50 μm, but is more preferably 20-40 μm. When the thickness is at most 10 μm, uniform stretching is hardly performed due to excessively low film strength, whereby color spottings of the polarizing film tend to be generated. On the other hand, when the thickness exceeds 50 μm, during production of a polarizing film via uniaxial orientation of the ethylene-modified PVA film, the thickness tends to vary due to neck-in at the ends, whereby color spottings of the polarizing film tend to be undesirably enhanced.

Further, to produce a polarizing film employing an ethylene-modified PVA film, for example, the ethylene-modified PVA film may be dyed, uniaxially stretched, fixed and dried, if desired, thermally treated. The order of the dying, uniaxial stretching, and fixing is not particularly limited. Further, the uniaxial stretching may be repeated at least twice.

Dying may be performed at any time such as prior to uniaxial stretching, during uniaxial stretching, or after uniaxial stretching. Employed as dyes for dying are dichroic dyes such as iodine-potassium iodide; Direct Black 17, 19, and 154; Direct Brown 44, 106, 195, 210, and 223; Direct Red 2, 23, 28, 31, 37, 39, 79, 81, 240, 242, and 247; Direct Blue 1, 15, 22, 78, 90, 98, 151, 168, 202, 236, 249, and 270; Direct Violet 9, 12, 51, and 98; Direct Green 1 and 85; Direct Yellow 8, 12, 44, 86, and 87; and Direct Orange 26, 39, 106, and 107. These may be employed individually or in combinations of at least two types. Dying is commonly performed by immersing a PVA film into a solution incorporating the above dyes. Alternatively, the above dyes may be blended into a PVA film during casting. The above dying conditions and methods are not particularly limited.

It is possible to conduct uniaxial stretching employing either a wet stretching method or a dry heat stretching method, and in heated water (a solution incorporating the above dyes or the fixing bath, described below, may be employed) or in an atmosphere employing the ethylene-modified PVA film after water absorption. The temperature during stretching is not particularly limited. When the ethylene-modified PVA film is stretched in heated water (being wet system stretching), the stretching temperature is preferably 30-90° C., while in the case of dry heat stretching, it is preferably 50-180° C. The stretching factor (the total stretching factor in the case of multistage uniaxial stretching) is preferably at least 4 in terms of polarization performance of a polarizing film, but is most preferably at least 5. The upper limit of the stretching factor is not particularly limited. However, the stretching factor is preferably at least 8, since uniform stretching is readily performed. The film thickness after stretching is preferably 2-20 μm, is more preferably 5-20 μm, but is most preferably 5-15 μm.

To strengthen adsorption of the above dyes onto the ethylene-modified PVA film, a fixing treatment is frequently conducted. Commonly, boric acid and/or boron compounds are added to a treatment bath employed for the fixing treatment. Alternatively, if desired, iodine compounds may be incorporated in the treatment bath.

Drying of a prepared polarizer is preferably performed between 30-150° C., but is more preferably performed between 50-150° C.

An optically transparent protective layer, exhibiting desired mechanical strength, is adhered to one or both sides or side of the polarizer, prepared as above, whereby a polarizing plate is prepared. Listed as adhesives for the above adhesion may be PVA based and urethane based adhesives. Of these, the PVA based adhesives are preferable.

The polarizing plate, at a thickness of 80-160 μm of the present invention, is constituted in such a manner that a polarizer is sandwiched between Polarizing Plate Protective Film A at a thickness of 30-60 μm and Polarizing Plate Protective Film B at a thickness of 30-60 μm, the latter of which also functions as a retardation plate. The feature of the above polarizing plate is that stiffness (ST) at 23° C. and 55% RH is in the range of 20-80 g. Stiffness, as descried herein, refers to the average value of the stiffness in the absorption axis direction and the stiffness in the transmission axis. When the stiffness is at most 20 g, air bubbles tend to be included during adhesion of the polarizing plate onto the liquid crystal cell and positional shifting also tends to occur. In order to exhibit the effects of the present invention, the stiffness of the polarizing plate is required to be in the range of 20-80 g. Further, the range represented by Formula 1 is more preferred, but the range represented by Formula 2 is most preferred.

Stiffness (g)>fa ×thickness (μm) of the polarizing plate +50 g    Formula 1

Stiffness (g)>fa ×thickness (μm) of the polarizing plate +40 g    Formula 2 wherein fa represents a constant value of 0.7 g/μm.

It is possible to prepare polarizing plates employing conventional methods. A polarizing plate is commonly prepared as follows. The rear surface of a cellulose film, which is Polarizing Plate Protective Film A or Polarizing Plate Protective Film B of the present invention, is subjected to alkali saponification, and each of the saponified cellulose ester films is adhered onto the both sides of the polarizer which is prepared via immersion into the above iodine solution and stretching. The thickness of the polarizing plate, prepared as above, is required to be in the range of 80-160 μm to exhibit the effects of the present invention. The thickness is more preferably in the range of 85-150 μm, but is most preferably in the range of 90-140 μm.

When the thickness of the polarizing plate is less than 80 μm, the polarizing plate is excessively thin, being incapable of maintaining the range of stiffness of the present invention, whereby the effects of the present invention are degraded. On the other hand, when it exceeds 160 μm, the thickness and weight are not sufficiently decreased, whereby leakage of light and curling occasionally result.

Since the polarizer is uniaxially (commonly longitudinally) stretched, during its standing at high temperature and high humidity, it contracts in the stretching direction (commonly the longitudinal direction) and elongates in the lateral direction. Specifically, contraction of the polarizing film in the stretching direction is greater. Commonly, adhesion is performed so that the stretching direction of the polarizer and the casting direction (being the MD direction) of the Polarizing Plate Protective Film A are identical. Consequently, when the thickness of the polarizing plate protective film is decreased, it is particularly important to decrease its elongation and contraction ratio in the casting direction. The cellulose ester film of the present invention exhibits excellent dimensional stability, whereby it is appropriately employed as a polarizing plate protective film.

Further, it is possible to constitute a polarizing plate in such a manner that a protective film is adhered onto one side of the polarizing plate and a separate film is adhered to the other side. The protective film and the separate film are employed to protect the polarizing plate during shipment of the polarizing plate and inspection of the products. In such a case, the protective film is adhered to protect the surface of the polarizing plate and is employed on the opposite side to which another polarizing plate is adhered. The separate film is employed to cover the adhesion layer which is adhered to the liquid crystal plate and employed on the side to which the polarizing plate is adhered to the liquid crystal cell.

(Display Devices)

By mounting the polarizing plate of the present invention on a display device, it is possible to prepare the display device of the present invention, which exhibits various types of excellent visibility. The polarizing plate of the present invention is preferably employed in a reflection type, transmission type, or translucent type LCD, as well as in various driving system LCDs such as a TN type, an STN type, an OCB type, an HAN type, a VA type (including a PVA type and an MVA type), or an IPS type. Specifically, it is preferable to employ it in a VA mode (vertically aligned mode) liquid crystal display device which exhibits excellent visibility. Further, in a large screen liquid crystal display device of at least 30 type, to which the polarizing plate of the present invention is applied, color uniformity and waviness are improved, whereby effects are exhibited in which eyes do not tire even after watching the screen over a long period of time.

EXAMPLES

The present invention will now be described with reference to examples, however the present invention is not limited thereto.

Example 1

<<Preparation of Polarizing Plate Protective Film A>>

Table 1 shows employed plasticizers and UV absorbers.

UV Absorber 1 in Table 1 was synthesized via the following synthesis formula.

<Synthesis of UV Absorber 1>

Based on the method described below, 2(2'-hydroxy-5'-t-butyl-phenyl)-5-(2'-methacryloyloxy)ethyloxycarbonyl-2H-benzotriazole (being Exemplified Compound NUV-1) was synthesized.

Dissolved in 160 ml of water was 20.0 g of 3-nitro-4-amino-beonzoic acid and 43 ml of concentrated hydrochloric acid was added. After adding at 0° C. 8.0 g of sodium nitrite dissolved in 20 ml of water, stirring was conducted at 0° C. for two hours. The resulting solution was dripped at 0° C. into a solution prepared by dissolving 17.3 g of 4-t-butylphenol in a mixture of 50 ml of water and 100 ml of ethanol, while maintaining the pH of the mixture to be alkaline employing potassium carbonate. The resulting solution was stirred at 0° C. for one hour and at room temperature for an additional one hour. The reaction solution was acidified by the addition of hydrochloric acid. Subsequently, the formed precipitates were collected via filtration and sufficiently washed with water.

The filtered precipitates were dissolved in 500 ml of a 1 mol/L aqueous NaOH solution, and after adding 35 g of zinc powder, 110 g of a 40% aqueous NaOH solution was dripped. After the dripping, stirring was carried out for about two hours, followed by filtration and washing. The filtrate was neutralized by the addition of chloric acid. The formed precipitates were collected via filtration, washed, and dried. Thereafter, recrystallization was conducted employing a solvent mixture of ethyl acetate and acetone, whereby 2(2'-hydroxy-5'-t-butyl-phenyl)-5-(2'-methacryloyloxy)ethyloxycarbonyl-2H-benzotriazole was prepared.

Subsequently, 10.0 g of 2(2'-hydroxy-5'-t-butyl-phenyl)-5-(2'-methacryloyloxy)ethyloxycarbonyl-2H-benzotriazole, 0.1 g of hydroquinone, 4.6 g of 2-hydoxyethyl methacrylate, and 0.5 g of p-toluenesulfonic acid were added to 100 ml of toluene, and the resulting mixture underwent heat-refluxing for 10 hours in a reaction vessel fitted with an ester pipe. The reaction solution was poured into water, and the deposited crystals were collected via filtration, washed with water, dried, and recrystallized employing ethyl acetate, whereby Exemplified Compound MUV-19, 2(2'-hydroxy-5'-t-butyl-phenyl)-5-(2'-methacryloyloxy)ethyloxycarbonyl-2H-benzotriazole, was prepared.

Subsequently, a copolymer (UV Absorber 1) of 2(2'-hydroxy-5'-t-butyl-phenyl)-5-(2'-methacryloyloxy)ethyloxycarbonyl-2H-benzotriazole and methyl methacrylate was synthesized based on the following method.

Added to 80 ml of tetrahydrofuran was 4.0 g of 2(2'-hydroxy-5'-t-butyl-phenyl)-5-(2'-methacryloyloxy)ethyloxycarbonyl-2H-benzotriazole and 6.0 g of methyl methacrylate, and subsequently 1.14 g of azoisobutylonitrile. Under a nitrogen atmosphere, heat refluxing was conducted for 9 hours. After distilling out tetrahydrofuran, the distillate was re-dissolved in tetrahydrofuran and dripped into excessive methanol. The deposited precipitates were collected via filtration and dried under vacuum at 40° C., whereby 9.1 g of UV Absorber 1, which was a grayish powder, was prepared. The resulting copolymer was confirmed to be one at a number average molecular weight of 4,500 via GPC analysis, employing standard polystyrene as a standard. Based on its NMR spectra and UV spectra, it was confirmed to be a copolymer of 2(2'-hydroxy-5'-t-butyl-phenyl)-5-(2'-methacryloyloxy)ethyloxycarbonyl-2H-benzotriazole and methyl methacrylate. The above copolymer was composed of 2(2'-hydroxy-5'-t-butyl-phenyl)-5-(2'-methacryloyloxy)ethyloxycarbonyl-2H-benzotriazole and methyl methacrylate at a ratio of approximately 40 to 60.

TABLE 1

| | Plasticizer |
|---|---|
| A | Aromatic Terminal Ester Sample No. 1 |
| B | Aromatic Terminal Ester Sample No. 2 |
| C | trimethylolpropane tribenzoate |
| D | triphenyl phosphate |
| E | ethylphthalyl glycolate |
| | UV Absorbers |
| A | UV Absorber 1 |
| B | TINUVIN 326 (produced by Ciba Specialty Chemicals Inc.) |
| C | TINUVIN 109 (produced by Ciba Specialty Chemicals Inc.) |
| D | TINUVIN 171 (produced by Ciba Specialty Chemicals Inc.) |

<Minute Particle Dispersion>

| | |
|---|---|
| Minute particles (AEROSIL R972V, produced by Nippon Aerosil Co., Ltd.) | 11 parts by weight |
| Ethanol | 89 parts by weight |

The above components were mixed for 50 minutes employing a dissolver and subsequently dispersed employing a Manton-Gaulin homogenizer.

<Minute Particle Addition Liquid Composition>

Cellulose Ester U was added to a dissolution tank to which methylene chloride was charged and completely dissolved while heated. The resulting solution was filtered employing AZUMI FILTER No. 244, produced by Azumi Filter Paper Co., Ltd. After filtration, while vigorously stirring the cellulose ester solution, a minute particle liquid composition was gradually added. Further, dispersion was performed employing an attritor so that the diameter of the secondary particles reached the specified value. The resulting dispersion was filtered employing FINE MET NF, produced by Nihon Seisen Co., Ltd., whereby a minute particle addition liquid composition was prepared.

| | |
|---|---|
| Methylene chloride | 99 parts by weight |
| Cellulose Ester U (cellulose triacetate at a degree of acetyl group substitution of 2.9) | 4 parts by weight |
| Minute particle dispersion | 11 parts by weight |

The primary dope, exhibiting the following composition, was prepared. Initially charged into a pressurized dissolutions tank was methylene chloride and ethanol. While stirring, cellulose ester was charged into the pressurized dissolution tank incorporating solvents. The resulting mixture was heated and completely dissolved while stirring. Further, plasticizers and UV absorbers were added and completely dissolved. The resulting solution was filtered employing AZUMI FILTER No. 244, produced by Azumi Filter Paper Co., Ltd., whereby a primary dope was prepared.

Added to an in-line mixer (being a static type in-pipe mixer, HI-MIXER, SWJ, produced by Toray Industries, Inc.) were 100 parts by weight of the primary dope and 2 parts by weight of Minute Particle Addition Liquid Composition 2, and the resulting mixture was vigorously blended. Subsequently, the resulting mixture was uniformly extruded onto a 2 m wide stainless steel band support. On the stainless steel band support, solvents were evaporated so that the residual solvents reached 110%. The resulting web was then peeled from the stainless steel band support. During peeling, tension was applied so that the machine direction (MD) stretching factor reached 1.1 and subsequently, by holding both edges of the web employing a tenter, stretching was conducted so that the stretching factor in the traverse direction (TD) reached 1.1. The residual solvents at the initiation of stretching was 30%. After stretching, the resulting width was maintained over several seconds. Subsequently, after releasing the tension in the traverse direction, width maintaining was freed. Further, the web was conveyed to a 3rd drying zone and dried for 30 minutes, whereby 1.5 m wide Cellulose Ester Film 301 at a thickness of 40 μm, exhibiting 1 cm wide and 8 μm high knurling at the edges, which corresponded to Polarizing Plate Protective Film A, was prepared.

<Composition of Dope U-1>

| | |
|---|---|
| Methylene chloride | 440 parts by weight |
| Ethanol | 40 parts by weight |
| Cellulose Ester U (being cellulose of triacetate at a degree of acetyl group substitution of 2.9) | 100 parts by weight |
| Plasticizer (A) | 5.5 parts by weight |
| Plasticizer (C) | 5.5 parts by weight |
| UV Absorber (A) | 3 parts by weight |

Each of Cellulose Ester Films 302-310, and 401-403, which corresponded to Polarizing Plate Protective Film A, was prepared in the same manner as above, except that each dope (cellullose ester, plasticizers, and UV absorbers) was changed as described in Table 2, and the type of dope and the thickness were changed as described in Table 3.

TABLE 2

| Dope | Cellulose Ester | Plasticizer | | | UV Absorber | |
|---|---|---|---|---|---|---|
| U-1 | U(100 kg) | A(5.5 kg) | C(5.5 kg) | A(3.0 kg) | — | — |
| U-2 | U(100 kg) | B(5.5 kg) | C(5.5 kg) | A(3.0 kg) | — | — |

TABLE 2-continued

| Dope | Cellulose Ester | Plasticizer | | UV Absorber | | |
|---|---|---|---|---|---|---|
| U-3 | U(100 kg) | A(11.0 kg) | — | A(3.0 kg) | — | — |
| U-4 | U(100 kg) | B(11.0 kg) | — | A(3.0 kg) | — | — |
| U-5 | U(100 kg) | C(5.5 kg) | E(5.5 kg) | A(3.0 kg) | — | — |
| U-6 | U(100 kg) | D(9.5 kg) | E(2.2 kg) | B(0.4 kg) | C(0.7 kg) | D(0.6 kg) |

TABLE 3

| Cellulose Ester Film No. | Dope | Thickness (μm) |
|---|---|---|
| 301 | U-1 | 40 |
| 302 | U-2 | 40 |
| 303 | U-3 | 40 |
| 304 | U-4 | 40 |
| 305 | U-5 | 40 |
| 306 | U-5 | 40 |
| 307 | U-1 | 60 |
| 308 | U-2 | 60 |
| 309 | U-1 | 50 |
| 310 | U-1 | 30 |
| 401 | U-6 | 40 |
| 402 | U-6 | 80 |
| 403 | U-6 | 25 |

<<Preparation of Polarizing Plate Protective Film B>>

Employed as cellulose esters were those shown in Table 4, in which the degree of substitution and the type of substituent were changed.

TABLE 4

| Cellulose Ester | Acetyl Group | Propionyl Group | Total Degree of Substitution |
|---|---|---|---|
| A | 1.3 | 0.8 | 2.1 |
| B | 1.2 | 0.9 | 2.1 |
| C | 1.6 | 0.8 | 2.4 |
| D | 1.5 | 0.9 | 2.4 |
| E | 1.4 | 1.0 | 2.4 |
| F | 1.0 | 1.4 | 2.4 |
| G | 1.7 | 0.8 | 2.5 |
| H | 1.6 | 0.9 | 2.5 |
| I | 1.5 | 1.0 | 2.5 |
| J | 1.1 | 1.4 | 2.5 |
| K | 1.7 | 0.9 | 2.6 |
| L | 1.6 | 1.0 | 2.6 |
| M | 2.1 | — | 2.1 |
| N | 2.4 | — | 2.4 |
| O | 2.5 | — | 2.5 |
| P | 2.6 | — | 2.6 |
| Q | 1.7 | 1 | 2.7 |
| R | 1.2 | 0.8 | 2 |
| S | 2.7 | — | 2.7 |
| T | 2.0 | — | 2 |

<Minute Particle Dispersion>

| Minute particles (AEROSIL R972V, produced by Nippon Aerosil Co., Ltd.) | 11 parts by weight |
|---|---|
| Ethanol | 89 parts by weight |

The above components were mixed while stirring for 50 minutes and the resulting mixture was dispersed employing a MANTON-GAULIN homogenizer.

<Minute Particle Addition Liquid Composition>

Cellulose Ester A was charged into a dissolution tank incorporating methylene chloride, and completely dissolved while heated. Subsequently, the resulting solution was filtered employing AZUMI FILTER PAPER No. 244, produced by Azumi Filter Paper Co., Ltd. While vigorously stirring, the above minute particle dispersion was gradually added to the cellulose ester solution which had been filtered. Further, dispersion was conducted via an attritor so that the diameter of the secondary particles reached the specified value. The resulting dispersion was filtered employing FINE MET NF, produced by Nippon Seisen Co., Ltd., whereby a minute particle addition liquid composition was prepared.

| Methylene chloride | 99 parts by weight |
|---|---|
| Cellulose Ester A | 4 parts by weight |
| Minute particle dispersion | 11 parts by weight |

A dope having the composition described below was prepared. Initially, charged into a pressurized dissolution tank were methylene chloride and ethanol. Subsequently, while stirring, cellulose ester was charged into the pressurized dissolution tank incorporating the above solvents. While stirring, the resulting mixture was completely dissolved while heated. Further, plasticizers and UV absorbers were added and dissolved. The resulting solution was filtered employing AZUMI FILTER PAPER No. 244, produced by Azumi Filter Paper Co., Ltd., whereby a primary dope was prepared.

Added to an in-line mixer (being a static type in-pipe mixer, HI-MIXER, SWJ, produced by Toray Industries, Inc.) were 100 parts by weight of the primary dope and 5 parts by weight of minute particle addition liquid composition, and the resulting mixture was vigorously mixed. Subsequently, the resulting mixture was uniformly extruded onto a 2 m wide stainless steel band support. On the stainless steel band support, solvents were evaporated so that the residual solvents reached 110%. The resulting web was then peeled from the stainless steel band support. During peeling, tension was applied so that the machine direction (MD) stretching factor reached 1.1 and subsequently, by holding both edges of the web employing a tenter, stretching was conducted so that the stretching factor in the traverse direction (TD) reached 1.3. The residual solvents at the initiation of stretching was 30%. After stretching, the resulting width was maintained over several seconds. Subsequently, after releasing the tension in the traverse direction, width maintaining was freed. Further, the web was conveyed to a 3rd drying zone and dried for 30 minutes, whereby a 1.5 m wide Cellulose Ester Film 101 at a thickness of 40 μm, exhibiting 1 cm wide and 8 μm high knurling at both edges, which corresponded to Polarizing Plate Protective Film B was prepared.

<Composition of Dope A>

| | | |
|---|---|---|
| Methylene chloride | 390 | parts by weight |
| Ethanol | 80 | parts by weight |
| Cellulose Ester A | 100 | parts by weight |
| Plasticizer (A) | 5.5 | parts by weight |
| Plasticizer (B) | 5.5 | parts by weight |

Each of Cellulose Ester Films 102-124, and 201-207, which corresponded to Polarizing Plate Protective Film B, was prepared in the same manner as above, except that each dope (cellulose ester, plasticizers, and UV absorbers) was changed as described in Table 5, and the type of dope and the thickness were changed as described in Table 6.

Prepared Cellulose Ester Films 101-124, and 201-207 were retardation films which exhibited in-plane retardation value Ro in the range of 40-50 nm, and thickness direction retardation value Rt in the range of 110-140 nm.

$$Ro = (nx - ny) \times d$$

$$Rt = \{(nx + ny)/2 - nz\} \times d$$

wherein nx, ny, and nz each represents refractive indexes in the x, y, or z direction of the principal axis of an ellipsoid; nx and ny each also represents a refractive index of the in-plane direction of the film, and nz represent a refractive index of the thickness direction of the film; further, $nx \geq ny$; and d represents film thickness (nm).

Retraction values, Ro and Rt were determined at a wavelength of 590 nm under 23° C. and 55% RH, employing KOBRA-21ADH (produced by Oji Scientific Instruments).

TABLE 5

| Dope | Cellulose Ester | Plasticizer | |
|---|---|---|---|
| A | A(100 kg) | A(5.5 kg) | C(5.5 kg) |
| B | B(100 kg) | B(5.5 kg) | C(5.5 kg) |
| C | C(100 kg) | A(5.5 kg) | C(5.5 kg) |
| D | D(100 kg) | B(5.5 kg) | C(5.5 kg) |
| E | E(100 kg) | A(11.0 kg) | — |
| F | F(100 kg) | B(11.0 kg) | — |
| G | G(100 kg) | A(5.5 kg) | C(5.5 kg) |
| H | H(100 kg) | B(5.5 kg) | C(5.5 kg) |
| I | I(100 kg) | A(11.0 kg) | — |
| J | J(100 kg) | B(11.0 kg) | — |
| K | K(100 kg) | A(5.5 kg) | C(5.5 kg) |
| L | L(100 kg) | B(5.5 kg) | C(5.5 kg) |
| H-2 | H(100 kg) | D(9.5 kg) | E(2.2 kg) |
| K-2 | K(100 kg) | D(9.5 kg) | E(2.2 kg) |
| M | M(100 kg) | A(5.5 kg) | C(5.5 kg) |
| N | N(100 kg) | B(5.5 kg) | C(5.5 kg) |
| O | O(100 kg) | A(5.5 kg) | C(5.5 kg) |
| P | P(100 kg) | B(5.5 kg) | C(5.5 kg) |
| Q | Q(100 kg) | D(9.5 kg) | E(2.2 kg) |
| R | R(100 kg) | D(9.5 kg) | E(2.2 kg) |
| S | S(100 kg) | D(9.5 kg) | E(2.2 kg) |
| T | T(100 kg) | D(9.5 kg) | E(2.2 kg) |
| O-2 | O(100 kg) | D(9.5 kg) | E(2.2 kg) |

TABLE 6

| Cellulose Ester Film No. | Dope | Film Thickness (μm) |
|---|---|---|
| 101 | A | 40 |
| 102 | B | 40 |
| 103 | C | 40 |
| 104 | D | 40 |
| 105 | E | 40 |
| 106 | F | 40 |
| 107 | G | 40 |
| 108 | H | 40 |
| 109 | I | 40 |
| 110 | J | 40 |
| 111 | K | 40 |
| 112 | L | 40 |
| 113 | H-2 | 40 |
| 114 | K-2 | 40 |
| 115 | H | 60 |
| 116 | K | 60 |
| 117 | H | 50 |
| 118 | K | 50 |
| 119 | H | 30 |
| 120 | K | 30 |
| 121 | M | 40 |
| 122 | N | 40 |
| 123 | O | 40 |
| 124 | P | 40 |
| 201 | Q | 40 |
| 202 | R | 40 |
| 203 | S | 40 |
| 204 | T | 40 |
| 205 | O-2 | 40 |
| 206 | Q | 80 |
| 207 | H-2 | 25 |

<<Preparation of Polarizing Plates>>

Initially, Polarizer A, employing the ethylene-modified film, described below, and Polarizer B, employing a PVA film, were prepared.

<Polarizer A: Ethylene-Modified PVA Film>

One hundred parts by weight of ethylene-modified PVA at a content of ethylene units of 2.1 mol %, a saponification ratio of 99.92 mol %, and a degree of polymerization of 3,000, were impregnated into 10 parts by weight of glycerin and 200 parts by weight of water. The resulting mixture was melt-kneaded and degassed, and subsequently extruded onto the surface of a metal roller from a T die, and cast into a film. The thickness of the ethylene-modified PVA film prepared via drying and a heat treatment was 40 μm, while the average value of the hot water-cutting temperature was 70° C.

The ethylene-modified PVA film, prepared as above, was subjected to a continuous process in the order of pre-swelling, dying, uniaxial stretching, fixing, drying, and a thermal treatment. Namely, the above ethylene-modified PVA film was pre-swelled upon being immersed into water at 30° C. for 60 seconds, and then immersed for two minutes into an aqueous solution incorporating a 40 g/liter boric acid, 0.4 g/l iodine, and 60 g/liter potassium iodide at 35° C. Subsequently, uniaxial stretching at a factor of 6 was conducted in a 4% aqueous boric acid solution at 55° C., and fixing was conducted via immersion in an aqueous solution incorporating 60 g/l potassium iodide, 40 g/l boric acid, and 10 g/l zinc chloride at 30° C. for 5 minutes. Thereafter, the resulting ethylene-modified PVA film was removed, dried by heated air flow at 40° C. under definite length, and further thermally treated at 100° C. for 5 minutes. The average thickness of the prepared polarizing film was 13 μm, while in regard to the polarizing performance, transmittance was 43.0%, the degree of polarization was 99.5%, and the dichroic ratio was 40.1.

<Polarizer: PVA Film>

A 120 μm thick polyvinyl alcohol film was uniaxially stretched (at 110° C. and a stretching factor of 5). The stretched film was immersed into an aqueous solution consisting of 0.075 g of iodine, 5 g of potassium iodide, and 100 g of water for 60 seconds, and subsequently immersed into an aqueous solution at 68° C. consisting of 6 g of potassium iodide, 7.5 g of boric acid, and 100 g of water. The resulting film was washed and dried, whereby a polarizer was prepared.

<Preparation of Polarizing Plate>

Subsequently, based on the following Processes 1-5 and combinations shown in Table 7, Polarizing Plates 501-540 of the present invention and 601-609 of the comparative example were prepared in the following manner. Each of Cellulose Ester Films 101-124 and 201-207, which corresponded to the above Polarizing Plate Protective Film B, was adhered onto the above Polarizer A or B, and each of Cellulose Ester Films 301-310 and 401-403 which corresponded to the above Polarizing Plate Protective Film A was adhered onto the rear side of each of the polarizer.

Process 1: A cellulose ester film was immersed into a 2 mol/L sodium hydroxide solution at 60° C. for 90 seconds then washed with water, whereby a cellulose ester film which underwent saponification on the side adhered to a polarizer was prepared.

Process 2: The above polarizing film was immersed for 1-2 seconds in a vessel of a polyvinyl alcohol adhesive at 2% by weight of solids.

Process 3: The excessive adhesive adhered to the polarizing film in Process 2 was wiped off and the polarizing film was arranged on the cellulose ester film processed in Process 1.

Process 4: The cellulose ester film laminated in Process 3, the polarizer, and the cellulose ester on the rear side were allowed to adhere at a conveying rate of about 2 m/minute under a pressure of 20-30 N/cm$^2$.

Process 5: In a drier at 80° C., each of the samples prepared by allowing the polarizer prepared in Process 4, each of Cellulose Ester Films 101-124 and 201-207, and each of Rear Side Cellulose ester Films 301-310 and 401-403 to adhere was dried for two minutes, whereby Polarizing Plates 501-540 and 601-609 were prepared.

TABLE 7

| Polarizing Plate/ Liquid Crystal Display Device | Cellulose Ester Film No. Polarizing Plate Protective Film B | Polarizing Plate Protective Film A | *1 | Polarizing Plate Thickness (μm) | Stiffness (g) | Leakage of Light | Bubble | *2 | Visibility | Remarks |
|---|---|---|---|---|---|---|---|---|---|---|
| 501 | 101 | 301 | A | 100 | 30 | B | B | B | B | Inv. |
| 502 | 102 | 301 | A | 100 | 31 | B | B | B | B | Inv. |
| 503 | 103 | 302 | A | 100 | 35 | A | A | B | A | Inv. |
| 504 | 104 | 301 | A | 100 | 35 | A | A | B | A | Inv. |
| 505 | 105 | 301 | A | 100 | 37 | A | A | B | A | Inv. |
| 506 | 106 | 301 | A | 100 | 36 | A | A | B | A | Inv. |
| 507 | 107 | 301 | A | 100 | 35 | A | A | B | A | Inv. |
| 508 | 108 | 302 | A | 100 | 35 | A | A | B | A | Inv. |
| 509 | 109 | 301 | A | 100 | 36 | A | A | B | A | Inv. |
| 510 | 110 | 301 | A | 100 | 37 | A | A | B | A | Inv. |
| 511 | 111 | 304 | A | 100 | 35 | A | A | B | A | Inv. |
| 512 | 112 | 301 | A | 100 | 36 | A | A | B | A | Inv. |
| 513 | 113 | 303 | A | 100 | 36 | A | A | B | A | Inv. |
| 514 | 114 | 301 | A | 100 | 38 | A | A | B | A | Inv. |
| 515 | 108 | 305 | A | 100 | 38 | A | A | B | A | Inv. |
| 516 | 111 | 305 | A | 100 | 37 | A | A | B | A | Inv. |
| 517 | 113 | 305 | A | 100 | 36 | A | A | B | A | Inv. |
| 518 | 114 | 305 | A | 100 | 37 | A | A | B | A | Inv. |
| 519 | 108 | 301 | B | 100 | 33 | B | B | B | B | Inv. |
| 520 | 111 | 301 | B | 100 | 33 | B | B | B | B | Inv. |
| 521 | 108 | 308 | A | 120 | 49 | B | B | B | B | Inv. |
| 522 | 111 | 307 | A | 120 | 47 | B | B | B | B | Inv. |
| 523 | 115 | 302 | A | 120 | 48 | B | B | B | B | Inv. |
| 524 | 116 | 301 | A | 120 | 48 | B | B | B | B | Inv. |
| 525 | 115 | 307 | A | 140 | 75 | B | A | A | B | Inv. |
| 526 | 116 | 307 | A | 140 | 72 | B | A | A | B | Inv. |
| 527 | 108 | 309 | A | 110 | 42 | B | B | B | B | Inv. |
| 528 | 111 | 309 | A | 110 | 40 | B | B | B | B | Inv. |
| 529 | 117 | 302 | A | 110 | 43 | B | B | B | B | Inv. |
| 530 | 118 | 301 | A | 110 | 41 | B | B | B | B | Inv. |
| 531 | 117 | 309 | A | 120 | 47 | B | A | A | B | Inv. |
| 532 | 118 | 309 | A | 120 | 49 | B | A | A | B | Inv. |
| 533 | 119 | 301 | A | 90 | 23 | B | B | B | B | Inv. |
| 534 | 120 | 301 | A | 90 | 22 | B | B | B | B | Inv. |
| 535 | 108 | 310 | A | 90 | 24 | B | B | B | B | Inv. |
| 536 | 111 | 310 | A | 90 | 25 | B | B | B | B | Inv. |
| 537 | 121 | 301 | A | 100 | 31 | B | B | B | B | Inv. |
| 538 | 122 | 301 | A | 100 | 30 | B | B | B | B | Inv. |
| 539 | 123 | 301 | A | 100 | 32 | B | B | B | B | Inv. |
| 540 | 124 | 301 | A | 100 | 30 | B | B | B | B | Inv. |
| 601 | 201 | 401 | B | 100 | 18 | D | C | C | C | Comp. |
| 602 | 202 | 401 | B | 100 | 18 | C | C | C | C | Comp. |
| 603 | 113 | 402 | B | 140 | 48 | C | B | C | B | Comp. |
| 604 | 203 | 401 | B | 100 | 16 | D | C | C | C | Comp. |
| 605 | 204 | 401 | B | 100 | 18 | C | C | B | C | Comp. |
| 606 | 205 | 402 | B | 140 | 48 | C | B | C | B | Comp. |

TABLE 7-continued

| Polarizing Plate/ Liquid Crystal Display Device | Cellulose Ester Film No. Polarizing Plate Protective Film B | Polarizing Plate Protective Film A | *1 | Polarizing Plate Thickness (μm) | Stiffness (g) | Leakage of Light | Bubble | *2 | Visibility | Remarks |
|---|---|---|---|---|---|---|---|---|---|---|
| 607 | 206 | 402 | B | 180 | 86 | D | B | B | C | Comp. |
| 608 | 206 | 401 | B | 140 | 48 | C | B | D | D | Comp. |
| 609 | 207 | 403 | B | 70 | 5 | B | D | D | D | Comp. |

Inv.: Present Invention,
Comp.: Comparative Example,
*1: Polarizer,
*2: Positional Shifting <<Preparation of Liquid Crystal Display Devices>>

A liquid crystal panel was prepared as described below, and characteristics as a polarizing plate and a liquid crystal display device were evaluated.

The polarizing plate of the image plane, previously adhered to Type 20 DISPLAY KLV-20AP2, produced by SONY CORP., was peeled off and each of Polarizing Plates 501-540 and 601-609, prepared as above, was adhered to the glass surface of the liquid crystal cell.

During the above operation, adhesion was conducted so that each of above Cellulose Ester Films 101-124 and 201-207 was on the liquid crystal cell side and each absorption axis was directed to the same direction as that of the previously adhered polarizing plate, whereby Liquid Crystal Display Devices 501-540 and 601-609 were produced. Further, the employed polarizing plate was prepared employing the edge portion cut from a long-length cellulose ester film, which tended to result in fluctuation of the performance.

<<Evaluation>>

Stiffness, light leakage of light, generation of bubbles during adhesion to the liquid cell, positional shifting, and visibility of the liquid crystal display of each polarizing plate, prepared as above, were evaluated. Table 7 shows the results.

(Measurement of Stiffness)

A polarizing plate was cut to a 35 mm wide and 105 mm long sheet. Subsequently, a loop was prepared with a 100 mm long portion of the plate by allowing both edges to adhere employing a 5 mm wide double-sided adhesive tape. The portion with both edge adhered was positioned as the bottom and fixed onto a stand. A load was then applied to the top of the loop so that the loop was pulled down vertically. When the loop was pulled down by 10 mm, the load (in g) was recorded employing a load cell, and the recorded value was designated as stiffness. During the measurements, the ambience was maintained at 23° C. and 55% RH.

(Leakage of Light)

In order to inspect degradation due to heat, each liquid crystal display device, prepared as above, was stored at 60° C. for 30 hours and the ambience was subsequently returned to 23° C. and 55% RH. Thereafter, the power was turned on and the backlight was lit. After two hours, light leakage during black display was evaluated based on the following criteria:
A: leakage of light was not noted
B: weak leakage of light was noted at 1-2 locations
D: strong leakage of light was noted at 1-2 locations
D: strong leakage of light was noted at 3 or more locations
Leakage of light of B or better is commercially viable.

(Air Bubbles)

The polarizing plate, prepared as above, was adhered to the glass surface of a liquid crystal cell employing an air adsorption type polarizing plate adhesion apparatus. During the above operation, ease of air bubble inclusion was evaluated based on the following criteria. After adhesion, an autoclave (pressurized defoaming) treatment was conducted under conditions of 45° C., 0.45 MPa, and 15 minutes. Air bubbles were evaluated based on the following criteria:
A: no air bubbles were noted
B: air bubbles were noted at the edges but after the autoclave treatment, air bubbles were hardly noted
C: 1-3 air bubbles were noted and after the autoclave treatment, air bubbles still remained
D: at least 4 air bubbles were noted and after the autoclave treatment, air bubbles still remained When the evaluation is B or better, the formation of air bubbles is commercially viable.

(Positional Shifting)

The polarizing plate, prepared as above, was adhered to the glass surface of a liquid crystal cell, employing an air adsorption type polarizing plate adhesion apparatus. During the above operation, positional shifting of the polarizing plate with respect to the liquid cell was determined in terms of angle shifting. The above determination was conducted employing 100 sheets of one type polarizing plate, and the results were evaluated based on the following criteria:
A: all 100 sheets were within 0.1 degree
B: 95 sheets were within 0.2 degree
C: 85 sheets were within 0.2 degree
D: 75 sheets were within 0.2 degree Positional shifting within 0.2 degree is commercially viable.

(Evaluation of Visibility)

Each of the liquid crystal display apparatuses, prepared as above, was allowed to stand at 60° C. and 90% RH for 100 hours. Thereafter, the ambience was returned to 23° C. and 55% RH. When the surfaces of the display devices were observed, it was noted that those employing the polarizing plate of the present invention exhibited excellent flatness, while comparative display devices exhibited wavy unevenness, whereby eyes tended to get tired when viewed over a long period of time.
A: no wavy unevenness was noted on the surface
B: slight wavy unevenness was noted on the surface
C: fine wavy unevenness was noted somewhat on the surface
D: fine wavy unevenness was clearly noted on the surface Above Table 7 also shows the evaluation results of the polarizing plates and Liquid Crystal Display Devices 501-540 and 601-609. Based on these results, it was confirmed that the polarizing plates and Liquid Crystal Display Devices 501-540, which were constituted employing the polarizing plate protective film of the present invention, resulting in the stiffness in the range specified in the present invention, minimized leakage of light, air bubble formation during adhesion to the liquid crystal cell, and positional shifting, and also exhibited excellent visibility.

Example 2

(Preparation of Optical Film with Antireflection Layer)

An optical film with an antireflection layer was prepared based on the following steps, employing Cellulose Ester Film 301 which was Polarizing Plate Protective Film A prepared as above.

The refractive index of each layer which constituted an antireflection layer was determined employing the following method.

(Refractive Index)

The refractive index of each refractive index layer was determined based on measurement results which were obtained in such a manner that the spectral reflectance of a sample, which was prepared by individually applying each of the layers onto the hard coat film, prepared as described below, was determined employing a spectrophotometer. After roughening the rear side surface of the sample to be measured, light reflection on the rear surface was minimized by performing a light absorption treatment employing a black spray, and reflectance in the visible region (400-700 nm) was determined with the condition of 5 degree-positive reflection, employing Type U-4000 (produced by Hitachi, Ltd.) as a spectrophotometer.

(Diameter of Minute Metal Oxide Particles)

The diameter of employed minute metal oxide particles was determined as follows. Each of the 100 minute particles was subjected to electron microscope observation (SEM), and the diameter of the sphere which circumscribed each particle was designated as the particle diameter and their average was obtained.

<<Formation of Hard Coat Layer>>

A hard coat layer liquid coating composition was prepared by filtering, via a polypropylene filter with a pore diameter of 0.4 aim, the hard coat layer liquid coating composition described below. The prepared coating composition was applied onto Cellulose Ester Film 301, prepared as above, which corresponded to Polarizing Palter Protective Film A, employing a micro-gravure coater, and dried at 90° C. Thereafter, the coating was cured at an exposure of 0.1 J/cm$^2$ under an illuminance of 100 mW/cm$^2$ in the exposed portion employing a UV lamp, whereby a hard coat film was prepared by forming a hard coat layer at a dried layer thickness of 7 µm.

(Hard Cost Layer Liquid Coating Composition)

The following materials were mixed while stirring to prepare a hard coat layer liquid coating composition.

| | |
|---|---|
| Acryl monomer, KAYARAD DPHA (dipentaerythritol hexaacrylate, produced by Nippon Kayaku Co., Ltd.) | 220 parts by weight |

-continued

| | |
|---|---|
| IRUGACURE 184 (produced by Ciba Specialty Chemicals Inc.) | 20 parts by weight |
| Propylene glycol monomethyl ether | 110 parts by weight |
| Ethyl acetate | 110 parts by weight |

<<Preparation of Optical Film with Antireflection Layer>>

An antireflection layer was prepared by applying, in the following order, the high refractive index layer and the low refractive index layer as described below onto the hard coat film prepared as above, whereby an optical film with a antireflection layer was prepared.

<<Formation of Antireflection Layer: High Refractive Index Layer>>

The following high refractive index layer coating composition was applied onto the hard coat film employing an extrusion coater to result in a cured layer thickness of 78 nm. The coating was dried at 80° C. for one minute, cured via exposure to ultraviolet radiation of 0.1 J/cm$^2$, and further thermally cured at 100° C. for one minute, whereby a high refractive index layer was prepared.

The refractive index of the resulting high refractive index layer was 1.62.

<High Refractive Index Coating Composition>

| | |
|---|---|
| Minute metal oxide isopropyl alcohol composition (ITO particles at a diameter of 5 nm, at 20% solids) | 55 parts by weight |
| Metal compound: Ti (OBu)$_4$ (tetra-n-butoxytitanium | 1.3 parts by weight |
| Ionizing radiation curing type resin: dipentaerythritol acrylate hexaacrylate) | 3.2 parts by weight |
| Photopolymerization initiator: IRUGACURE 184 (produced by Ciba Specialty Chemicals Inc.) | 0.8 part by weight |
| 10% straight chain dimethylsilicone-EO block copolymer propylene glycol monomethyl ether liquid composition (FZ-2207, produced by Nippon Unicar Co., Ltd.) | 1.5 parts by weight |
| Propylene glycol monomethyl ether | 120 parts by weight |
| Isopropyl alcohol | 240 parts by weight |
| Methyl ethyl ketone | 40 parts by weight |

<<Formation of Antireflection Layer: Low Refractive Index Layer>>

The following low refractive index layer coating composition was applied onto the above high refractive index layer employing an extrusion coater. The coating was dried at 100° C. for one minute, cured via exposure to ultraviolet radiation of 0.1 J/cm$^2$, wound onto a heat resistant plastic core to reach a length of 2,500 m, and thermally treated at 80° C. for three days, whereby Antireflection Layer-Provided Optical Film 701 was prepared.

The thickness and refractive index of the resulting low refractive index layer were 95 nm and 1.37, respectively.

(Preparation of Low Refractive Index Layer Coating Composition)

<Preparation of Tetraethoxysilane Hydrolysis Product A>

Hydrolysis Product A was prepared in such a manner that 289 g of tetraethoxysilane and 553 g of ethanol were blended, and the resulting mixture, along with 157 g of a 0.15% aqueous acetic acid solution, was stirred for 30 hours in a water bath at 25° C.

| | |
|---|---|
| Ethoxysilane Hydrolysis Product A | 110 parts by weight |
| Minute silica based hollow particles (P-2 described below) | 30 parts by weight |
| KMB503 (Coupling agent, produced by Shin-Etsu Chemical Co., Ltd.) | 4 parts by weight |
| 10% straight chain dimethylsilicone-EO block copolymer (FZ-2207, produced by Nippon Unicar Co., Ltd.) propylene glycol monomethyl ether liquid composition | 3 parts by weight |
| Propylene glycol monomethyl ether | 400 parts by weight |
| Isopropyl alcohol | 400 parts by weight |

<Preparation of Minute Silica Based Hollow Particle P-2>

A mixture of 100 g of a silica sol at an average particle diameter of 5 nm and a $SiO_2$ concentration of 20% by weight and 1,900 g of pure water was heated to 80° C. The pH of this mother reaction liquor was 10.5. Simultaneously added to the mother liquor were 9,000 g of a 0.98% aqueous sodium silicate solution as $SiO_2$ and 9,000 g of a 1.02% aqueous sodium aluminate solution as $Al_2O_3$. During the above addition, temperature of the reaction liquor was maintained at 80° C. The pH of the reaction liquor increased to 12.5 immediately after the above addition and subsequently remained nearly the same. After completion of the addition, the reaction liquor was cooled to room temperature and washed via an ultrafiltration membrane, whereby a $SiO_2 \cdot Al_2O_3$ nucleus particle dispersion at a solid concentration of 20% by weight was prepared (Process (a)).

Added to 1,700 g of pure water was 500 g of the above nucleus particle dispersion and the resulting mixture was heated to 98° C. While maintaining the above temperature, 3,000 g of silicic acid liquor (at a $SiO_2$ concentration of 3.5% by weight), which was prepared by removing alkali of an aqueous sodium silicate solution employing cation exchange resins, was added, whereby a nucleus particle dispersion, which formed the first silica covering layer, was prepared (Process (b)).

Subsequently, 1,125 g of pure water was added to 500 g of the nucleus particle dispersion, which formed the first silica covering layer, resulting in a solid concentration of 13% by weight via ultrafiltration membrane washing. Further, an aluminum removal treatment was performed by reducing the pH to 1.0 via dropwise addition of concentrated hydrochloric acid (at 35.5%). Subsequently, aluminum salts, which were dissolved employing the ultrafiltration membrane, were separated by adding 10 L of an aqueous hydrochloric acid solution at a pH of 3 and 5 L of pure water, whereby a porous $SiO_2 \cdot Al_2O_3$ particle dispersion, in which some of the constituting components of the nucleus particles which formed the first silica covering layer were removed, were prepared (Process (c)). After heating, to 35° C., a mixture of 1,500 g of the above porous particle dispersion, 500 g of pure water, 1,750 g of ethanol, 626 g of 28% ammonia water, and 104 g of ethyl silicate ($SiO_2$ at 28% by weight) was added, and a second silica covering layer was formed by covering the surface of the porous particles formed in the first silica covering layer with the hydrolysis polycondensation product of ethyl silicate. Subsequently, minute silica based hollow particles (P-2) at a solid concentration of 20% in which the solvent was replaced with ethanol was prepared employing an ultrafiltration membrane.

The thickness of the first silica covering layer of the above minute silica based particles was 2 nm, the average particle diameter was 47 nm, $Mox/SiO_2$ (mol ratio) was 0.0017, and the refractive index was 1.28. The average particle diameter was determined employing a dynamic light scattering method.

Polarizing Plate 701 at a thickness of 100 μm was prepared in the same manner as described in Example 1, employing the resulting Antireflection Layer-Provided Optical Film 701, as well as Cellulose Ester Film 101 and Polarizer 1 prepared in Example 1. Subsequently, Liquid Crystal Display Device 701 was prepared in the same manner as described in Example 1 so that the antireflection layer of Antireflection Layer-Provided Optical Film 701 was arranged on the front side.

The prepared polarizing plate and liquid crystal display device were evaluated in the same manner as described in Example 1 for leakage of light, bubble formation, positional +shifting, and visibility. As a result, it was noted that Example 1 was reproduced and Polarizing Plate 701 and Liquid Crystal Display Device 701 each exhibited excellent characteristics. Further, by preparing an antireflection layer-provided optical film employing Polarizing Plate protective Film A, it was found that reflection of the surroundings to the image area was markedly minimized and abrasion resistance was enhanced.

What is claimed is:

1. A polarizing plate comprising a polarizer and polarizing plate protective films A and B, each comprising a cellulose ester, provided on both surfaces of the polarizer, wherein:
   (i) a thickness of each of the polarizing plate protective films A and B is 30 to 60 μm;
   (ii) retardation value Ro of the polarizing plate protective film B is 20 to 100 nm;
   (iii) retardation value Rt of the polarizing plate protective film B is 10 to 300 nm;
   (iv) a thickness of the polarizing plate is 80 to 160 μm;
   (v) a stiffness of the polarizing plate under a condition of 23° C. and 55% RH is 20 to 80 g;
   (vi) the polarizing plate protective film A or B further comprising a polyester plasticizer containing an aromatic group represented by Formula (I):

B-(G-A)n-G-B     Formula (1)

wherein B represents a benzene monocarboxylic acid residue; G represents an alkylene glycol residue having 2-12 carbon atoms, an aryl glycol residue having 6-12 carbon atoms, or an oxyalkylene glycol residue having 4-12 carbon atoms; A represents an alkylene dicarboxylic acid residue having 4-12 carbon atoms or an aryldicarboxylic acid residue having 6-12 carbon atoms; and n represents an integer of 1 or more;
   (vii) the polarizing plate protective film A has a hard coating layer having a thickness of 0.1-20 μm; and further
   (viii) the polarizing plate protective films A and B each has a stretching ratio from 1.05 to 1.5 in the lateral direction and from 0.8 to 1.3 in the longitudinal direction, wherein Ro and Rt are defined by the following equations:

$Ro = (nx - ny) \times d$ $Rt = ((nx + ny)/2 - nz) \times d$ wherein nx, ny, and nz represent refractive indexes in x, y, and z directions, respectively, x, y, and z representing three principal axes of a refractive index ellipsoid; nx and ny each represent an in-plane refractive index, while nx>ny; nz represents a refractive index in a thickness direction; and d represents a thickness (in nm) of polarizing plate protective film B.

2. The polarizing plate of claim 1, wherein polarizing plate protective film B comprises a cellulose ester having a total acyl substitution degree of 2.10 to 2.65.

3. The polarizing plate of claim 2, wherein the cellulose ester has the total acyl substitution degree of 2.10 to 2.65 and a propionyl substitution degree of 0.7 to 1.5.

4. The polarizing plate of claim 1, wherein the polarizer comprises ethylene-modified polyvinyl alcohol and the layer thickness of the polarizer is 5-20 μm.

5. A display comprising the polarizing plate of claim 1.

6. The display device of claim 5, wherein the display device is a vertically aligned mode liquid crystal display device.

* * * * *